(12) United States Patent
Dunning et al.

(10) Patent No.: US 7,837,751 B2
(45) Date of Patent: *Nov. 23, 2010

(54) TWO-STAGE SEPARATOR APPARATUS FOR YARD DEBRIS

(75) Inventors: Charles Everett Dunning, Neenah, WI (US); Richard Bernard Saathoff, Onalaska, WI (US)

(73) Assignee: BestRake, LLC, Neenah, WI (US)

( * ) Notice: Subject to any disclaimer, the term of this patent is extended or adjusted under 35 U.S.C. 154(b) by 802 days.

This patent is subject to a terminal disclaimer.

(21) Appl. No.: 11/648,982

(22) Filed: Jan. 3, 2007

(65) Prior Publication Data

US 2007/0107405 A1 May 17, 2007

Related U.S. Application Data

(60) Division of application No. 11/145,289, filed on Jun. 3, 2005, now Pat. No. 7,354,466, which is a division of application No. 10/846,029, filed on May 14, 2004, now Pat. No. 6,904,742, which is a continuation-in-part of application No. 10/724,316, filed on Nov. 26, 2003, now Pat. No. 7,114,317, which is a division of application No. 10/045,123, filed on Nov. 9, 2001, now Pat. No. 6,658,833.

(60) Provisional application No. 60/247,456, filed on Nov. 9, 2000.

(51) Int. Cl.
*A01D 34/70* (2006.01)
*A01D 43/00* (2006.01)
*A01D 43/063* (2006.01)

(52) U.S. Cl. ............ 55/385.1; 55/399; 55/459.3; 55/385.3; 95/269; 95/271; 15/340.4; 15/346; 15/340.3; 15/83; 56/302.2; 56/202; 56/13.1; 56/13.2; 56/16.9; 56/344; 56/12.9; 56/13.5; 56/14.3

(58) Field of Classification Search ............ 55/385.1, 55/399, 459.3, 385.3; 95/269, 271; 15/340.4, 15/346, 83, 340.3; 56/302.2, 202, 13.1, 13.2, 56/16.9, 344, 12.9, 13.5, 14.3, DIG. 8, DIG. 12

See application file for complete search history.

(56) References Cited

U.S. PATENT DOCUMENTS

| 1,055,792 A | 3/1913 | Plock |
| 1,207,795 A | 12/1916 | Riekenberg |
| 1,329,392 A | 2/1920 | Ford |
| 2,039,115 A | 4/1936 | Reif |
| 2,298,747 A | 10/1942 | Agar |

(Continued)

OTHER PUBLICATIONS

Bear Cat Company promotional brochure (30M1112JR) obtained from dealer in Dec. 2005, p. 19, illustrating the Bear Vac Pro Model 75011.

(Continued)

*Primary Examiner*—Duane Smith
*Assistant Examiner*—Minh-Chau T Pham

(57) ABSTRACT

An apparatus for collection and reduction of yard debris combining a frontally facing vacuum pick up with a chipper-shredder-blower unit to induce airflow for entraining debris collected at the vacuum pick up; reduce the entrained debris to a more manageable volume; impel the reduced debris to a two-stage free-flow-separator device for removing the debris from the air in which it is entrained; and deposit the debris in a detachable accumulator for subsequent dumping.

73 Claims, 17 Drawing Sheets

U.S. PATENT DOCUMENTS

| | | |
|---|---|---|
| 2,407,430 A | 9/1946 | MacRae |
| 2,505,576 A | 4/1950 | Reitan |
| 2,525,090 A | 10/1950 | Bott |
| 2,538,643 A | 1/1951 | Gregory |
| 2,542,635 A | 2/1951 | Davis et al. |
| 2,662,650 A | 12/1953 | Russell |
| 2,669,078 A | 2/1954 | Gregory |
| 2,700,863 A | 2/1955 | Etem |
| 2,846,024 A | 8/1958 | Bremi |
| 2,923,423 A | 2/1960 | Maney |
| 2,964,896 A | 12/1960 | Finocchiaro |
| 2,989,833 A | 6/1961 | De Fino |
| 2,990,019 A | 6/1961 | Finn |
| 3,035,724 A | 5/1962 | Clark |
| 3,094,830 A | 6/1963 | Leblanc |
| 3,184,777 A | 5/1965 | Norden |
| 3,406,424 A | 10/1968 | Rush |
| 3,475,887 A | 11/1969 | Price |
| 3,512,345 A | 5/1970 | Smith |
| 3,545,187 A | 12/1970 | Whitney |
| 3,564,823 A | 2/1971 | Rhoads |
| 3,664,099 A | 5/1972 | Chouinard |
| 3,688,479 A | 9/1972 | Martinson et al. |
| 3,744,653 A | 7/1973 | Jensen |
| 3,783,592 A | 1/1974 | Schraut |
| 3,822,533 A | 7/1974 | Oranje |
| 3,872,654 A | 3/1975 | Brundage |
| 3,908,221 A | 9/1975 | Wolfe |
| 3,921,373 A | 11/1975 | Rubin |
| 3,953,184 A | 4/1976 | Stockford |
| 3,987,606 A | 10/1976 | Evans |
| 3,988,133 A | 10/1976 | Schady |
| 3,995,415 A | 12/1976 | Hoffmann |
| 3,999,316 A | 12/1976 | Palmer |
| 4,064,679 A | 12/1977 | Spinner |
| 4,117,983 A | 10/1978 | Browning |
| 4,149,861 A | 4/1979 | Sogo et al. |
| 4,221,018 A | 9/1980 | Hajdu |
| 4,250,695 A | 2/1981 | Comer |
| 4,268,288 A | 5/1981 | Coombs |
| 4,277,220 A | 7/1981 | Wiley |
| 4,426,830 A | 1/1984 | Tackett |
| 4,532,755 A | 8/1985 | Schemelin et al. |
| 4,589,249 A | 5/1986 | Walker et al. |
| 4,600,410 A | 7/1986 | Baillie |
| 4,601,631 A | 7/1986 | Van Raaij |
| 4,819,417 A | 4/1989 | Bryant et al. |
| 4,835,951 A | 6/1989 | Walker |
| 4,868,948 A | 9/1989 | Arnold |
| 4,924,664 A | 5/1990 | Hicks |
| 5,231,827 A | 8/1993 | Connolly et al. |
| 5,287,684 A | 2/1994 | Beroth |
| 5,295,779 A | 3/1994 | Mihalich et al. |
| 5,340,035 A | 8/1994 | Ford |
| 5,381,970 A | 1/1995 | Bold et al. |
| 5,435,118 A | 7/1995 | Cobile |
| 5,540,038 A | 7/1996 | Bold et al. |
| 5,642,864 A | 7/1997 | Middlesworth |
| 5,685,134 A | 11/1997 | Thornburg |
| 5,707,017 A | 1/1998 | Paolucci |
| 5,778,648 A | 7/1998 | Parkes et al. |
| 5,799,365 A | 9/1998 | Firdaus |
| 5,848,521 A | 12/1998 | Kobayashi |
| 5,875,620 A | 3/1999 | Goeke |
| 5,911,671 A | 6/1999 | Heitstuman |
| D413,125 S | 8/1999 | Vachon |
| 5,931,396 A | 8/1999 | Firdaus |
| 5,983,613 A | 11/1999 | Winter |
| 6,029,312 A | 2/2000 | Whitney |
| 6,089,006 A | 7/2000 | Langford |
| 6,105,350 A | 8/2000 | Vachon |
| 6,182,383 B1 | 2/2001 | Reed |
| 6,226,970 B1 | 5/2001 | Busboom |
| 6,347,593 B1 | 2/2002 | Moran |
| 6,449,800 B1 | 9/2002 | Gotham |
| 6,658,833 B2 * | 12/2003 | Dunning et al. ............... 56/202 |
| 6,705,068 B2 | 3/2004 | Iida |
| 7,114,317 B2 * | 10/2006 | Dunning et al. ............... 56/202 |
| 7,329,297 B2 * | 2/2008 | Dunning et al. ............ 55/385.1 |
| 7,354,466 B2 * | 4/2008 | Dunning et al. ............ 55/385.1 |

OTHER PUBLICATIONS

Crary Bear Cat Owner Operator's Manual for Bear Vac Pro Models 75011 and 75111 (Manual P/N 14032-00, Rev. Mar. 2002) Downloaded from internet website: http://www.bearcatproducts.com).

Crary Bear Cat Parts Catalog for Bear Vac Pro Models 75011 and 75111 (Part # 14031-00, Rev. Mar. 2002) Downloaded from http://www.bearcatproducts.com.

MacKissic, Inc. promotional information and parts breakdown for Dethatchers downloaded from internet website: www.mackissic.com/partsbreakdown2.htm.

MacKissic, Inc. promotional information and parts breakdown for Vacuum Chipper Bagger downloaded from internet website: http://www.mackissic.com/manualmighty/vcb257vcb25806-07-04.pdf.

* cited by examiner

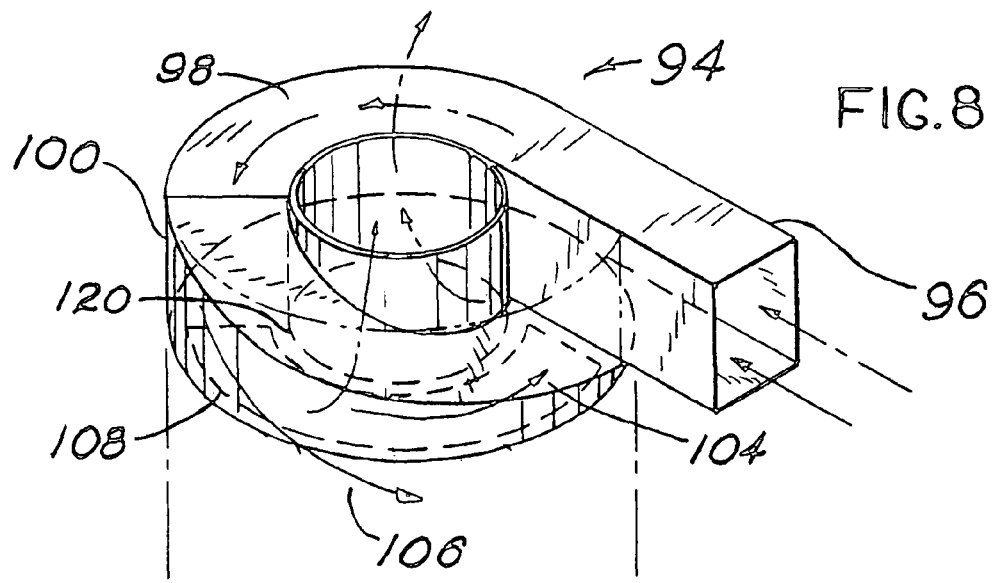
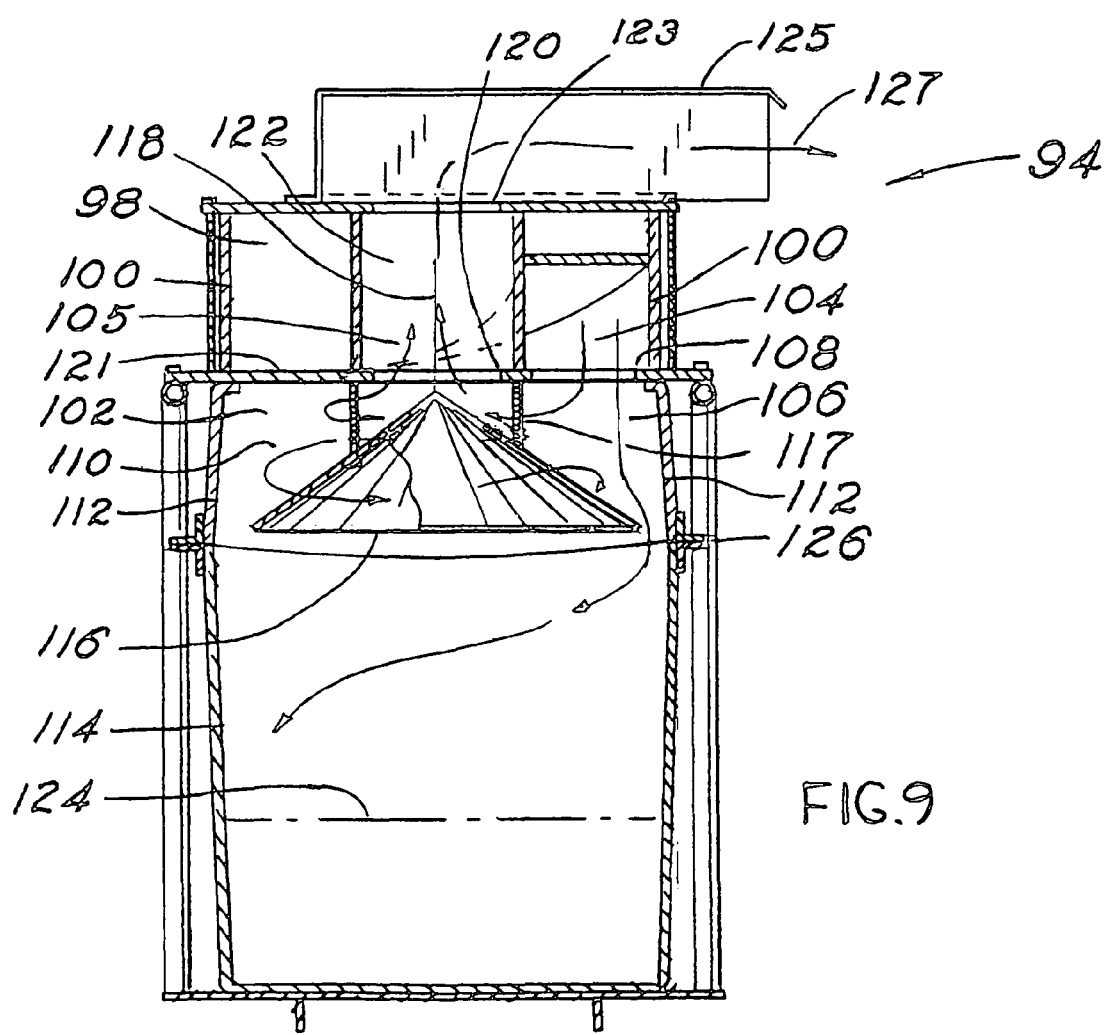

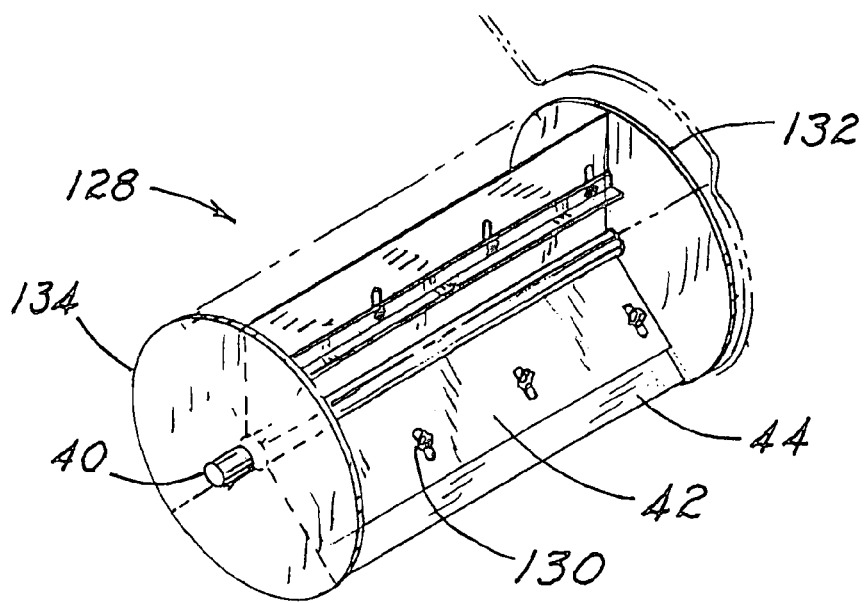
FIG.10
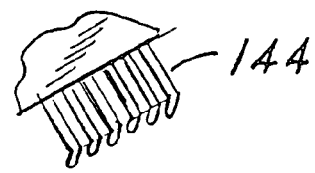
FIG.12
FIG.11
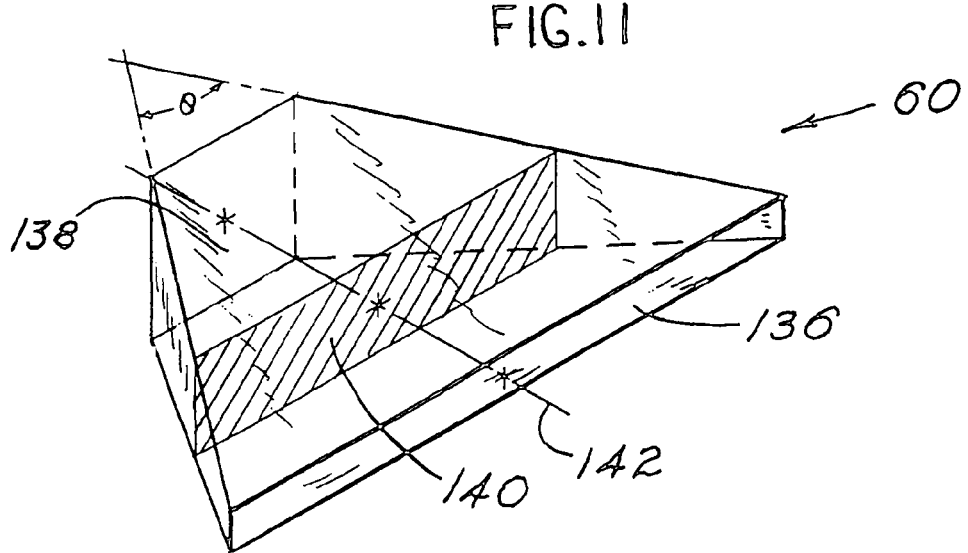

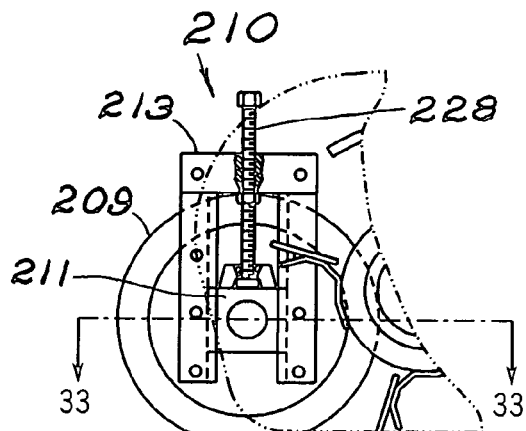
FIG. 32
FIG. 34
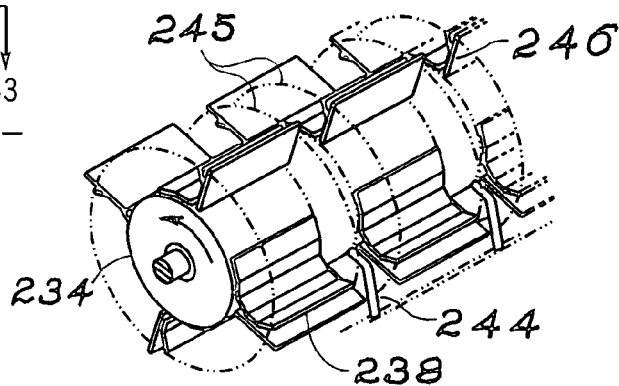
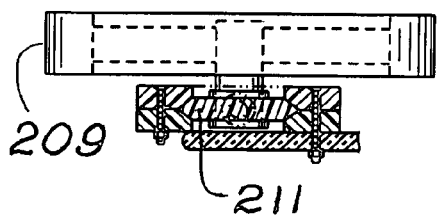
FIG. 33
FIG. 35
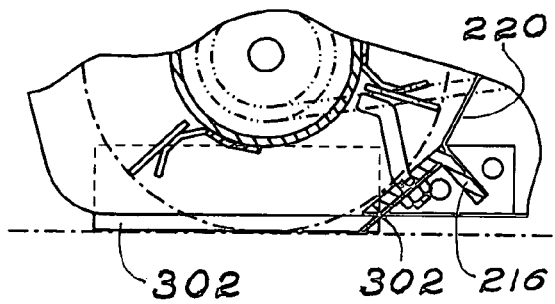
FIG. 37
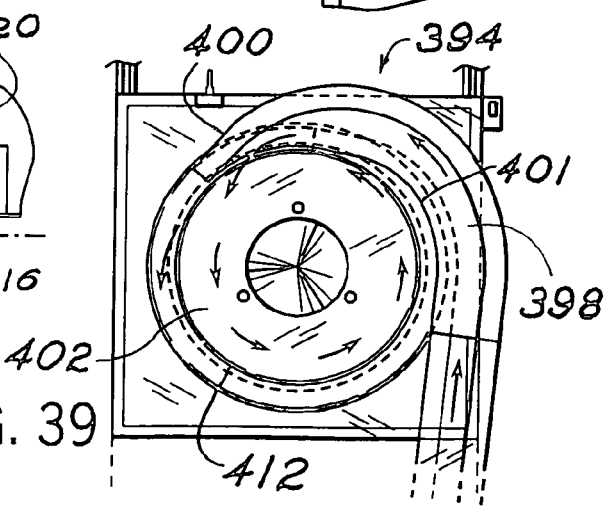
FIG. 39

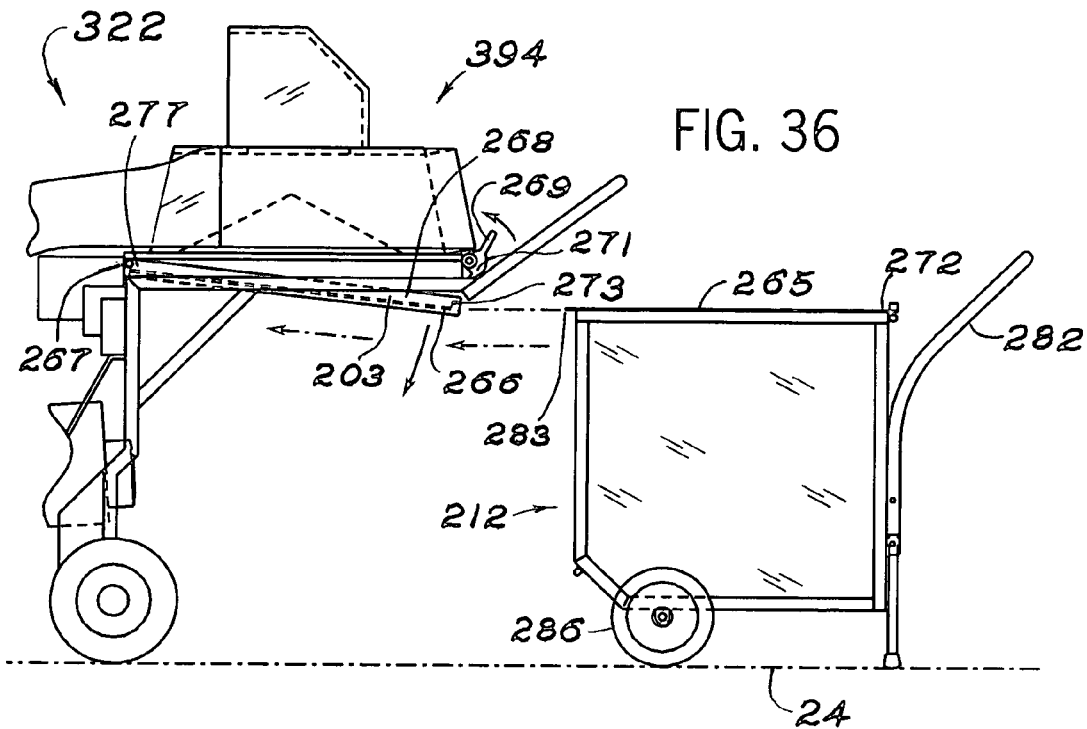
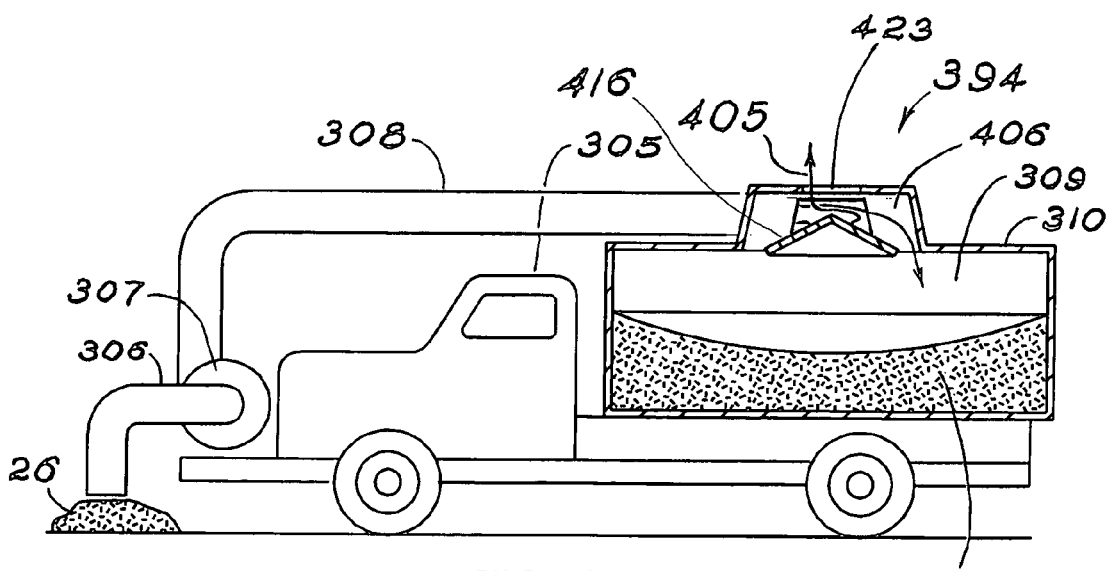

TWO-STAGE SEPARATOR APPARATUS FOR YARD DEBRIS

RELATED US APPLICATIONS

This application is a division of, and claims priority to, U.S. application Ser. No. 11/145,289, filed Jun. 3, 2005, now U.S. Pat. No. 7,354,466 which is a division of application Ser. No. 10/846,029, filed May 14, 2004, now U.S. Pat. No. 6,904,742 which is a continuation-in-part of and claims priority to, U.S. application Ser. No. 10/724,316, filed Nov. 26, 2003, now U.S. Pat. No. 7,114,317; which is a division of Ser. No. 10/045,123, filed Nov. 9, 2001, now U.S. Pat. No. 6,658,833, which claims benefit of provisional application Ser. No. 60/247,456, filed Nov. 9, 2000. Application Ser. No. 11/649,105 entitled HIGH-EFFICIENCY SEPARATOR APPARATUS FOR YARD DEBRIS filed of even date herewith is also a division of co-pending U.S. application Ser. No. 11/145,289. In addition, related co-pending application Ser. No. 11/453,579, filed Jun. 15, 2006 is a continuation-in-part of and claims priority to application Ser. No. 11/145,289.

FIELD OF THE INVENTION

This invention relates to an apparatus for collection and reduction of yard debris in thick layers and deep piles.

BACKGROUND

Homeowners, commercial-property owners, and companies who provide care for lawns have an ongoing challenge of how to remove leaves, grass clippings, and other debris from lawns, gardens and paved surfaces, particularly when the debris accumulates to a depth of over an inch. Several companies now manufacture and sell combination vacuum-chipper-shredder machines intended for this purpose. Some U.S. patents illustrating the range of these machines are as follows: U.S. Pat. Nos. 5,931,396 and 5,799,365, both assigned to MTD Products; 5,381,970 and 5,231,827, both assigned to Garden Way Incorporated; and 5,642,864, assigned to Simplicity Manufacturing, Inc. However, the dilemma with many prior-art units is that while they are reasonably adapted to vacuum a thin layer of debris from the ground, they do not function well when there is a thick layer of leaves or other debris. When there is a covering of several inches of leaves, the collector duct merely pushes a stack of leaves ahead of the unit instead of drawing the leaves into the machine. If the collector duct is raised to be able to take leaves from the top of the overlayer, it is no longer so effective in collecting the leaves and other debris close to the ground. Accordingly, while the available machines are somewhat effective in removing the thin layers of debris, the task of collecting thick layers of debris, particularly deep piles of leaves, remains quite problematic. Typical prior art machines, such as those shown in U.S. Pat. Nos. 5,799,365 and 5,231,827, have a vacuum pick-up opening wherein the plane of the opening is parallel to the ground, while the device shown in U.S. Pat. No. 5,642,864 has its opening disposed at an angle of about 45 degrees with respect to the ground. Such devices are poorly adapted to the tasks for which machine assistance is needed most.

Many existing machines depend primarily on flow of air to lift and entrain the leaves and other debris for transport through chipper shredder devices, and then to blow the reduced debris into accumulation units. To separate the debris from the air in which it is entrained, the machines rely on some form of filtration, with either fabric bags or screens. However, as leaf fragments and other debris collect on the filter, resistance to the flow of air increases, diminishing the air flow rate, and thereby, reducing the effectiveness of the vacuum pick-up opening.

OBJECT OF THE INVENTION

It is an object of the present invention to provide a machine which effectively removes deep piles of leaves and other debris. In preferred embodiments, the thin layer of residual debris which might otherwise be left for later removal in another step is cleanly removed at the same time.

Another object of the invention is to provide a unit combining a front-facing vacuum-assisted opening with a rotor which serves to impel heavy leaves and debris toward a vacuum slot while creating air flow close to the surface to be cleaned in a direction which is generally parallel to that surface for picking up finer debris.

Another object of the invention is to provide a rotor-vacuum combination which both frontally engages piles of leaves and other debris and also brushes the leaves and other debris from the surface to be cleaned while entraining the debris in an air stream whence the debris may be reduced in size.

Another object of the invention is to provide a means for separating the air stream with entrained debris into a solids-depleted stream and a solids-enriched stream for collection and disposition of the debris.

It is another object of the present invention to remove deep piles of leaves and other debris.

Another object of the invention is to provide a means of breaking twigs into shorter fragments to alleviate plugging of collector-unit airflow systems by longer twigs frequently co-mixed with leaves and other lawn debris.

Another object of the invention is to provide a reduced-height air-solids separator to permit greater operator visibility toward the front of a collector machine during operation.

Yet another object of the present invention is to provide a debris-accumulation container achieving greater ease of dumping collected debris.

Another object of the invention is to provide a unit which engages and lifts lawn thatch, entrains it in an air stream, and then separates the thatch from the air stream and retains the thatch in an accumulation container for convenient disposal.

Another object of the invention is to provide an improved air-solids separator which can be adapted to a debris-collecting motor vehicle or towable vehicle.

SUMMARY OF THE INVENTION

These objects are provided by an apparatus for collection and reduction of yard debris comprising a combination of a frontally facing rotor-assisted vacuum pick up, a chipper-shredder-blower unit which (i) induces an airflow for entraining the debris collected at said pick up; (ii) reduces the debris entrained in the airflow to a more manageable volume and (iii) impels the reduced debris to a free-flow-separator device for removing the debris from the air in which it is entrained.

More particularly, this invention relates to an apparatus for collecting yard debris comprising: a frame having a shredder blower unit mounted thereupon; a collector-rotor mounted on the frame comprising impeller elements adapted to: (i) engage a surface, (ii) collect yard debris thereupon, and (iii) impel the yard debris toward the shredder blower unit; an air-solids separator mounted on the frame operatively connected to the shredder blower unit for separating the yard debris into a debris-enriched stream and a debris-depleted stream by action of body forces thereupon; and an accumulation chamber adapted to receive the debris-enriched stream from the air-solids separator; wherein the collector rotor means is configured for substantially untrammeled engagement with yard debris having a depth of at least about two (2) inches.

In another aspect this invention relates to an apparatus for collecting yard debris comprising: a frame; a shredder blower unit mounted on the frame; a collector rotor mounted on the frame comprising impeller elements adapted to: (i) engage a surface, collect yard debris thereupon, and (ii) impel said the debris toward the shredder blower unit; an air-solids separator mounted on the frame operatively connected to the shredder blower unit for separating the yard debris into a debris-enriched stream and a debris-depleted stream; and an accumulation chamber adapted to receive the debris-enriched stream from the air-solids separator; wherein the collector rotor is configured for substantially untrammeled engagement with yard debris having a depth of at least about two (2) inches.

In still another aspect this invention relates to an apparatus for collecting yard debris comprising: (A) a frame; (B) a shredder blower unit mounted on the frame; (C) a collector rotor mounted on the frame comprising impeller elements adapted to: (i) engage a surface, collect yard debris thereupon, and (ii) impel the yard debris toward the shredder blower unit; (D) an air-solids separator means mounted on the frame operatively connected to the shredder blower unit for separating the yard debris into a debris-enriched stream and a debris-depleted stream by action of body forces thereupon; and (E) an accumulation chamber adapted to receive the debris-enriched stream from the air-solids separator.

Yet another aspect of this invention relates to an apparatus for collecting and reducing yard debris comprising: (A) a frame adapted for movement in a principal direction upon a surface; (B) a first duct mounted on the frame having an entrance and an exit; (C) a collector-rotor assembly comprising: a collector-rotor body disposed at the entrance to the first duct having a substantially horizontal axis of rotation generally normal to the principal direction; and a plurality of impeller elements mounted upon the collector-rotor body, wherein the impeller elements extend radially from the collector-rotor body by at least about one quarter of an inch and are adapted to: (i) sweep over the surface, (ii) collect yard debris thereupon, and (iii) impel the yard debris toward the duct entrance, wherein the collector-rotor assembly and the first duct are configured for substantially untrammeled frontal engagement with yard debris having a depth of at least about two (2) inches; (D) a second duct mounted upon the frame having an entrance and an exit; (E) a shredder blower unit, disposed between the exit to the first duct and the entrance to the second duct, adapted to: (i) provide suction at the entrance of the first duct; (ii) induce a flow of air through the first and second ducts; and (iii) reduce yard debris entrained in the flow of air as it passes through the shredder blower unit; (F) an air-solids separator disposed at the exit to the second duct for separating the reduced yard debris in the flow of air induced by the shredder blower into a debris-enriched stream and a debris-depleted stream; (G) an accumulation chamber mounted on the frame adapted to receive the debris-enriched stream from the air-solids separator; and (H) a power source mounted on the frame adapted to provide power to the shredder blower unit and the collector rotor.

In a preferred embodiment of the invention the impeller elements extend radially at least about an inch from the collector-rotor body.

In another preferred embodiment the collector-rotor assembly comprises a substantially gas-impervious impediment to unrestricted flow of air into the first duct and extends substantially athwart the entrance to the first duct.

A preferred collector-rotor assembly comprises three impeller elements generally equispaced around the collector-rotor body.

A more preferred collector-rotor assembly further comprises fillets extending between adjacent impeller elements for limiting carriage of yard debris around the collector-rotor assembly; wherein the fillets partially define generally concentric interrupted annular cavity spaces between adjacent impeller elements.

In a more preferred embodiment of this invention, a housing serves to limit the flow of air between the housing and the collector-rotor assembly without substantially impeding air flow along the surface under the collector-rotor assembly and into the entrance of the first duct; wherein this housing: (i) is disposed above the collector-rotor assembly, (ii) is an arcuate portion of a generally cylindrical shell spanning an upper portion of the collector-rotor assembly concentric to the axis of rotation of the collector-rotor body, and (iii) engages each of the impeller element tips in flow-limiting proximity seriatim.

In another preferred embodiment, vertically extending seals are carried on the frame adjacent to the ends of the collector-rotor assembly for limiting axial flow of airflow into the rotor assembly.

In another embodiment, vertically extending seals carried on the ends of the collector-rotor assembly limit axial flow of airflow into the rotor assembly.

In a preferred embodiment, the housing means defines a frontal opening extending from the surface vertically to a height of at least four inches and a suction opening under the rotor extending rearwardly from the front of the apparatus at least to a line below the axis of rotation of the collector-rotor body.

In another preferred embodiment, the impeller elements mounted on the collector-rotor body are configured to allow intermittent rearward rushes of air under the forward side of the rotating rotor body into the entrance to the first duct, and pulsed forward rushes of air under the first duct and into the first duct entrance, thereby alternatingly collecting principally bulky yard debris from the forward side of the rotor body during the rearward rushes of air and enhancing collection of residual debris from the surface during the pulsed forward rushes of air.

A preferred embodiment of the invention further comprises an air-slot defined within the housing between the upper lip of the housing and the entrance to the first duct for allowing flow of air in a direction opposed to the direction of rotation of the collector-rotor body and into the first duct and therein stripping leaves and debris from the rotating rotor assembly.

In another embodiment, the entrance to the first duct generally spans the length of the collector-rotor body, and the duct converges rearwardly such that the convergence angle throughout the duct is generally less than 100 degrees.

In one embodiment, the shredder blower unit comprises a rotatable shaft having shredder elements mounted thereupon, wherein the axis of rotation of the shaft is parallel to the principal direction.

In a preferred embodiment of the invention, the air-solids separator comprises: (A) a first passage for accepting the flow of air bearing entrained reduced yard debris from the second duct; (B) a separation chamber adapted to receive the flow of air from the first passage; (C) a second passage adapted to exhaust the debris-depleted stream from the separation chamber into the atmosphere; and (D) a baffle for: (i) generally inhibiting secondary flow from the accumulation chamber;

and (ii) impeding re-entrainment of fine particulates in the debris-depleted stream as it is discharged to the atmosphere; wherein the baffle is disposed to permit passage of entrained reduced yard debris into the accumulation chamber while impeding passage of fine particulates of reduced yard debris in air exhausted from the separation chamber through the second passage.

In a more preferred embodiment, the air-solids separator separates the reduced yard debris in the airflow induced by the shredder blower into a debris-enriched stream and a debris-depleted stream by action of body forces thereupon, wherein the separator comprises: (A) a separation chamber; (B) a first declivously extending curvilinear passage for conducting the flow of air bearing the entrained reduced yard debris from the second duct into the separation chamber, wherein the separation chamber adjoins the declivously extending curvilinear passage and is adapted to receive and direct the flow of air bearing debris from the declivously extending curvilinear passage in a direction generally tangential to the perimeter of the separation chamber; (C) a generally centrally located upwardly extending second passage for exhausting the debris-depleted stream from the separation chamber into the atmosphere; (D) a baffle extending generally outwardly from a central point below the entrance to the second passage, wherein the baffle is disposed generally below the exit from the declivously extending curvilinear first passage; and (E) an opening around the baffle into the accumulation chamber; wherein the baffle is disposed to permit passage of entrained reduced yard debris in the debris-enriched stream into the accumulation chamber while impeding secondary flows of air containing finely reduced debris fragments from re-entering the separation chamber.

In an embodiment, the shredder blower unit further comprises a chipper knife adapted to chip branches.

In another embodiment, the power source further comprises a means for supplying power to wheels mounted on the frame, thereby powering forward movement of the apparatus.

In one embodiment, the air-solids separator means further comprises an enclosure having at least one filtering element, and the airflow passes through the filtering element, leaving the yard debris retained in the enclosure.

Another aspect of the invention relates to an apparatus for collecting yard debris comprising: (A) a frame adapted for movement in a principal direction upon a surface; (B) a duct mounted on the frame having an entrance and an exit; (C) a collector-rotor assembly comprising: a substantially impervious collector-rotor body disposed and extending substantially athwart the entrance to the duct and having a substantially horizontal axis of rotation generally normal to the first direction; and a plurality of impeller elements mounted upon the collector-rotor body, extending radially from the collector-rotor body by at least about one quarter of an inch, and having approximately equal radial extensions from the axis of rotation of the collector-rotor assembly, wherein the impeller elements are adapted to: (i) sweep over the surface, (ii) collect yard debris thereupon, and (iii) impel the yard debris into the duct entrance; (D) a housing disposed adjacent the entrance to the duct for limiting the flow of air between the housing and the collector-rotor assembly without substantially impeding air flow along the surface under the collector-rotor assembly and into the entrance of the duct, wherein the housing: (i) is disposed above the collector-rotor assembly; (ii) engages each of the impeller element tips in flow-limiting proximity seriatim; and (iii) is configured to permit substantially untrammeled frontal engagement of the collector-rotor assembly with yard debris having a depth of at least about two (2) inches; (E) an air-movement device connected to the exit of the duct and adapted to: (i) provide suction at the entrance of the duct, and (ii) induce a flow of air through the duct; and (F) a power source mounted upon the frame adapted to provide power to the air-movement device and the collector rotor.

In a preferred embodiment of the invention, the tips of the impellers further comprise pliable blades that are yieldable to hard objects encountered on the surface, but are sufficiently stiff to sweep debris from the undulating surface.

In a more preferred embodiment, the tips of the impellers comprise radially extending raker teeth adapted to engage and impel debris objects on the surface toward the duct entrance.

In a further embodiment, the housing comprises an arcuate portion of a generally cylindrical shell spanning an upper portion of the collector-rotor assembly generally concentric to the axis of rotation of the collector-rotor body, and which is disposed in flow-limiting proximity to at least one tip of one of the impeller elements during at least about one fourth of the time of each revolution of the collector-rotor assembly.

In an embodiment, the duct is disposed such that a space at least ½ inch thick is preserved between the bottom of the duct and the surface, permitting forward air flow toward the duct entrance.

In a preferred embodiment, the cross-sectional area of the channel through the duct measured normal to the center flow line of the airflow through the duct remains generally constant along the center flow line.

In a further embodiment, the collector-rotor assembly and the entrance of the duct are disposed along the advancing front of a lawnmower having a cutting path of a defined width.

In a preferred embodiment, the collector-rotor assembly impels the yard debris into the mowing chamber within the mowing enclosure of the lawnmower.

In a more preferred embodiment, the air-movement means achieves an airflow volume of at least about twenty cubic feet per minute per inch of collector-rotor assembly length.

In another preferred embodiment the present invention relates to an apparatus for separating entrained lawn debris from a transporting air stream by action of body forces thereupon comprising: (A) an apparatus for delivering a stream of air bearing entrained lawn debris; (B) a first passage having an entrance and exit, having the entrance adapted to receive the stream of air bearing entrained lawn debris, and the passage adapted for conducting the flow of air bearing entrained lawn debris from the entrance to the exit; (C) a separation chamber having a generally cylindrical outer wall section, with the separation chamber: (i) connected to the exit from the first passage; and (ii) adapted to: (a) receive and direct the stream of air bearing entrained lawn debris from the first passage in a direction primarily tangential to the generally cylindrical outer wall section of the separation chamber, and (b) separate the stream of air bearing entrained lawn debris into an outerly located debris-enriched stream and an innerly located debris-depleted stream; (D) an upper bulkhead to the separation chamber having defined therein, a generally centrally located second passage having an entrance and an exit, with the generally centrally located second passage adapted for: (i) receiving the innerly located debris-depleted stream from the separation chamber through the entrance, and (ii) conducting the innerly located debris-depleted stream to the exit and discharging it into the atmosphere; (E) the bulkhead of said separation chamber further: (i) extending generally horizontally from the second passage generally outwardly to the substantially cylindrical outer wall, and (ii) being disposed at generally the same height as the entrance to the second passage; (F) a baffle extending generally outwardly from a central point below the entrance to the second passage, wherein the baffle is disposed generally below the exit of the first passage, and the outer periphery of the baffle is spaced inwardly from the generally cylindrical outer wall section; and (G) an opening around the baffle into the interior of an accumulation chamber below the baffle; wherein the baffle is disposed to permit passage of entrained yard debris into the accumulation chamber while impeding passage of fine particulates of reduced yard debris from the accumulation chamber into the debris-depleted stream discharged from the separation chamber through the second passage.

Preferably, the plane of the said baffle periphery is disposed below the lowermost portion of the upper bulkhead by a distance of less than about 0.6 times the inside diameter of the separation chamber.

In another preferred embodiment, the baffle periphery is disposed below the lowermost portion of the entrance to the second passage by a distance of less than about 0.6 times the inside diameter of the separation chamber.

In one embodiment the upper bulkhead of the separation chamber further comprises a substantially planar surface generally normal to the axis of the substantially cylindrical outer wall and has an opening comprising the entrance of the second passage.

In another embodiment, the upper bulkhead of the separation chamber further comprises a generally semi-toroidal surface and has an opening comprising the entrance of the second passage.

Preferably, the upper bulkhead has as its substantially only interruptions, openings comprising the exit of the first passage and the entrance of the second passage.

In a more preferred embodiment, the first passage extends declivously from its entrance toward its exit and directs the stream of air bearing entrained lawn debris into the separation chamber.

Preferably, (A) the first passage is curvilinear in a plane generally perpendicular to the axis of the generally cylindrical outer wall section, (B) the outer wall of the curvilinear passage is disposed approximately coincident with the generally cylindrical outer wall section of the separation chamber, and (C) the generally cylindrical outer wall section of the separation chamber is disposed at least about three inches outward from the perimeter of the entrance to the second passage.

In a preferred embodiment, the generally cylindrical outer wall section of the separation chamber is disposed at least about five inches outwardly from the perimeter of the entrance to the second passage.

In a preferred embodiment, the baffle further comprises an upright cone having its apex pointing toward the entrance of the second passage.

Preferably, the cone periphery and the outer wall section of the separation chamber are generally circular.

In a preferred embodiment, the opening around the periphery further comprises an annular opening between the periphery of the baffle and the outer wall section of the separation chamber.

Preferably, the vertical distance from the apex of the cone to the plane of the entrance of the second passage is less than about 0.6 times the diameter of the entrance to the second passage.

In one embodiment, the accumulation chamber is approximately cylindrical and has a slidable opening in a plane at an angle of about 75 degrees to about 90 degrees to the axis of the cylinder.

In a preferred embodiment, the stream of air bearing entrained lawn debris swirls around the separation chamber with a tangential perimeter velocity of at least about 2000 feet per minute, causing the entrained reduced lawn debris to move toward the generally cylindrical outer wall of the separation chamber by action of body forces thereupon.

Preferably, the radial distance from the baffle periphery to the outer wall of the separation chamber is less than about one fourth of the inside diameter of the separation chamber, measured in approximately the same plane as the plane of the baffle periphery.

In another embodiment, the accumulation chamber further comprises a flexible bag-like container, such as a paper bag or a plastic bag.

In still another embodiment, the device for delivering a stream of air bearing entrained lawn debris further comprises a lawnmower having a discharge duct connected to the entrance of the first passage.

In another aspect, this invention relates to a free-flow apparatus for separating entrained lawn debris from a transporting air stream by action of body forces thereupon comprising: (A) an apparatus for delivering a stream of air bearing entrained lawn debris; (B) a first passage having an entrance and exit, with the entrance adapted to receive the stream of air bearing entrained lawn debris, and the passage adapted for conducting the stream of air bearing entrained lawn debris from the entrance to the exit; (C) a separation chamber having a generally frusto-conical outer wall section, with the separation chamber: (a) connected to the exit from the first passage; and (b) adapted to: (i) receive and direct the stream of air bearing entrained lawn debris from the first passage in a direction primarily tangential to the frusto-conical outer wall section of the separation chamber, and (ii) separate the stream of air bearing entrained lawn debris into an outerly located debris-enriched stream and an innerly located debris-depleted stream; (D) a generally centrally located second passage having an entrance and an exit, and being adapted for (i) receiving the innerly located debris-depleted stream from the separation chamber through the entrance, and (ii) conducting the innerly located debris-depleted stream to the exit and discharging it into the atmosphere; (E) an upper bulkhead to the separation chamber having defined therein a generally centrally located second passage having an entrance and an exit, with the upper bulkhead extending from the second passage generally outwardly to the generally frusto-conical outer wall section; (F) a baffle extending generally outwardly from a central point below the entrance to the second passage, and disposed generally below the exit of the first passage, wherein the outer periphery of the baffle is disposed inwardly from the generally frusto-conical outer wall section, and below the uppermost portion of the first passage by a distance of less than 1.2 times the inside diameter of the separation chamber proximate the baffle; and (G) an opening around the baffle into the interior of an accumulation chamber below the baffle; wherein the baffle is disposed to permit passage of entrained yard debris into the accumulation chamber while impeding passage of fine particulates of reduced yard debris from the accumulation chamber into the air discharged from the separation chamber through the second passage.

In a preferred embodiment, (A) the first passage is curvilinear in a plane generally perpendicular to the axis of the generally cylindrical outer wall, (B) the outer wall of the curvilinear passage is disposed generally coincident with the generally frusto-conical outer wall section of said separation chamber, (C) the bulkhead is disposed at generally the same height as the entrance to the second passage, and (D) the generally frusto-conical outer wall section of the separation chamber is disposed at least about three inches radially outward from the perimeter of the entrance to the second passage.

Preferably, the first passage comprises substantially the only passage for conducting air flow into the separation chamber, and the second passage comprises substantially the only passage for conducting the innerly located debris-depleted stream out of the separation chamber.

In a preferred embodiment, the device for delivering a stream of air bearing entrained reduced lawn debris further comprises a shredder blower.

In another aspect, this invention relates to a free-flow apparatus for separating entrained lawn debris from a transporting air stream by action of body forces thereupon comprising: (A) an apparatus for delivering a stream of air bearing entrained lawn debris; (B) a primary-separation duct having an entrance and exit, wherein the entrance is adapted to receive the stream of air bearing entrained lawn debris, the duct is adapted for conducting the stream of air bearing entrained lawn debris from the entrance to the exit; and the primary-separation duct has a generally curvilinear outer surface spanning an arc of at least about $$\text{arc cosine}(RI/RO)$$

circumferentially along its length, having the primary-separation duct adapted to direct the stream of air bearing entrained lawn debris to flow generally circumferentially along its length and initiate separation of the stream of air bearing entrained lawn debris into an outerly located debris-enriched stream and an innerly located debris-depleted stream, wherein $RI$=radius of curvature for the generally curvilinear inner surface of the primary-separation duct, and $RO$=radius of curvature for the generally curvilinear outer surface;

(C) a secondary-separation chamber connected to the exit from the primary-separation duct and having a generally annular outer wall defining a primary axis generally co-incident with the center of curvature of the generally annular outer wall, the functions of the secondary-separation chamber further comprising (i) receiving and directing the streams of air bearing entrained lawn debris from the primary-separation duct in a direction generally tangential to the generally annular outer wall of the secondary-separation chamber, (ii) directing the outerly located debris-enhanced stream from the primary-separation duct to flow adjacent to the outer wall of the secondary-separation chamber, (iii) directing the innerly located debris-depleted stream from the primary-separation duct to flow radially inward of the debris-enriched stream, and (iv) further separating the streams of air bearing entrained lawn debris into an upwardly and inwardly directed debris-depleted stream and a downwardly and outwardly directed debris-enriched stream; (D) a generally centrally located passage having an entrance and an exit, and being adapted for: (i) receiving the upwardly and inwardly directed debris-depleted stream from the secondary-separation chamber through the entrance, and (ii) conducting this stream to the exit and discharging it into the atmosphere; (E) a baffle extending generally outwardly from a central point below the entrance to the passage, having the outer periphery of the baffle spaced inwardly from the generally annular outer wall; and (F) an opening around the baffle into the interior of an accumulation chamber below the baffle; wherein the baffle is disposed to permit passage of entrained yard debris in the downwardly and outwardly directed debris-enriched stream into the accumulation chamber while impeding passage of fine particulates of reduced yard debris from the accumulation chamber into air discharged from the separation chamber through the passage.

Preferably, the baffle periphery is disposed below the uppermost portion of the primary-separation duct by a distance of less than 1.2 times the inside diameter of the secondary-separation chamber having a generally annular outer wall, with this inside diameter being measured in the plane of the baffle periphery.

More preferably, the baffle periphery plane is disposed below the uppermost portion of the entrance to the passage by a distance of less than about 0.6 times the inside diameter of the secondary-separation chamber having a generally annular outer wall, with this inside diameter being measured in the plane of the baffle periphery.

In one embodiment, the axis of curvature of the primary-separation duct is disposed generally coincident with the primary axis.

Still another aspect of this invention relates to a free-flow apparatus for separating entrained lawn debris from a transporting air stream by action of body forces thereupon comprising: (A) an apparatus for delivering a stream of air bearing entrained lawn debris; (B) a separation chamber having an upper bulkhead and an outer wall; (C) a first passage having an entrance and exit, having the entrance adapted to receive the stream of air bearing entrained lawn debris, and being adapted for conducting the stream of air bearing entrained lawn debris from the entrance to the separation chamber and directing the stream of air bearing entrained lawn debris into the separation chamber in a direction primarily tangential to the outer wall of the separation chamber; wherein the separation chamber is adapted to separate the stream of air bearing entrained lawn debris into an outerly located debris-enriched stream and an innerly located debris-depleted stream; (D) a generally centrally located second passage having an entrance and an exit, wherein the generally centrally located second passage is adapted for: (i) receiving the innerly located debris-depleted stream from the separation chamber through the entrance, and (ii) conducting the innerly located debris-depleted stream to the exit and discharging it into the atmosphere; (E) a baffle extending generally outwardly from a central point below the entrance to the second passage; having the outer periphery of the baffle spaced inwardly from the outer wall; and (F) an opening around the baffle into the interior of an accumulation chamber below the baffle, having the baffle disposed to permit passage of the innerly located debris-depleted stream into the second passage while impeding passage of fine particulates of reduced yard debris from the accumulation chamber into the air discharged from the separation chamber through the second passage; wherein the overall height of the apparatus from the uppermost portion of the apparatus to the plane of the outer periphery of the baffle is less than about 1.2 times the inside diameter of the separation chamber proximate the baffle periphery.

Preferably, the connection of the exit of the first passage into the separation chamber is disposed below the upper bulkhead.

In a preferred embodiment, the first passage is curvilinear in a plane generally perpendicular to the axis of the outer wall and has its concave surface generally concentric about the axis.

Yet another aspect of this invention relates to a free-flow apparatus for separating entrained lawn debris from a transporting air stream by action of body forces thereupon, comprising: (A) an apparatus for delivering a stream of air bearing entrained lawn debris having a flow rate of at least about 300 cubic feet per minute; (B) a primary-separation duct having an entrance and exit, with the entrance adapted to receive the stream of air bearing entrained lawn debris, and the duct adapted for conducting the stream of air bearing entrained lawn debris from the entrance to the exit; wherein the primary-separation duct (i) has a generally curvilinear outer surface spanning an arc of at least about $$\text{arc cosine RI/RO}$$

circumferentially along its length and has a radius of curvature of its generally curvilinear outer surface less than about 36", (ii) measures at least about 4" perpendicular to its plane of curvature and at least about 2" in the radial direction, and (iii) is adapted to direct the stream of air bearing entrained lawn debris to flow generally circumferentially along its length and initiate separation of the stream of air bearing entrained lawn debris into an outerly located debris-enriched stream and an innerly located debris-depleted stream, wherein RI=radius of curvature of the generally curvilinear inner surface of the primary-separation duct, and RO=radius of curvature of the generally curvilinear outer surface;

(C) a secondary-separation chamber less than about 36" in diameter and connected to the exit from the primary-separation duct and having a generally annular outer wall defining a primary axis generally co-incident with the center of curvature of the generally annular outer wall, the secondary-separation chamber further comprising a shape for (i) receiving and directing the streams of air bearing entrained lawn debris from the primary-separation duct in a direction generally tangential to the generally annular outer wall of the secondary-separation chamber, (ii) directing the outerly located debris-enhanced stream from the primary-separation duct to flow along the outer wall of the secondary-separation chamber; (iii) directing the innerly located debris-depleted stream from the primary-separation duct to flow radially inward of the debris-enriched stream; and (iv) further separating the streams of air bearing entrained lawn debris into an upwardly and inwardly directed debris-depleted stream and a downwardly and outwardly directed debris-enriched stream; (D) a generally centrally located passage at least 4" in diameter and having an entrance and an exit, and having the perimeter of the entrance located at least 2" radially inward from the generally annular outer wall of the secondary-separation chamber, wherein the generally centrally located passage is adapted for: (i) receiving the upwardly and inwardly directed debris-depleted stream from the secondary-separation chamber through the entrance, and (ii) conducting the upwardly and inwardly directed debris-depleted stream to the exit and discharging it into the atmosphere; (E) a baffle extending generally outwardly from a central point below the entrance to the passage, having the outer periphery of the baffle spaced at least 1" inwardly from the generally annular outer wall, and having the outer periphery disposed less than 15" below the entrance to the passage; and (F) an opening around the baffle into the interior of an accumulation chamber below the baffle; wherein the baffle is disposed to permit passage of entrained yard debris in the downwardly and outwardly directed debris-enriched stream into the accumulation chamber while impeding passage of fine particulates of reduced yard debris from the accumulation chamber into air discharged from the separation chamber through the passage.

A preferred embodiment of this invention relates to an apparatus for collecting and reducing twig-containing yard debris comprising: (A) a frame adapted to be advanced over a surface; (B) a duct mounted on the frame having a duct entrance and a duct exit; (C) a twig-arrestor mounted on the frame; (D) a collector-rotor assembly comprising: (i) a rotating collector-rotor body rotatably mounted on the frame adjacent: the surface, the twig-arrestor means, and the duct entrance; (ii) a plurality of impeller elements mounted upon the collector-rotor body extending radially from the collector-rotor body by at least about one half inch and defining crenels and merlons having at least one circumferential alignment of crenels, the impeller elements being adapted to: engage yard debris disposed on the surface, impel the yard debris toward the duct entrance and transport twigs encountered on the surface against the twig-arrestor; the twig-arrestor protruding into the circumferential alignment of crenels and, in combination with the impeller elements mounted upon the rotating collector-rotor body, constituting a device for fracturing twigs transported against the twig-arrestor by the impeller elements by impact therewith, (E) a blower unit operatively connected to the duct and adapted to induce a flow of air through the duct and provide suction at the duct entrance; (F) a source for providing power to the blower unit; and (G) a source for providing power to the collector-rotor assembly.

Another embodiment of this invention relates to an apparatus for collecting and reducing twig-containing yard debris comprising: (A) a frame adapted to be advanced over a surface; (B) a duct mounted on the frame having a duct entrance and a duct exit; (C) a collector-rotor assembly comprising: (i) a rotating collector-rotor body rotatably mounted on the frame adjacent the surface and the duct entrance, having a length generally spanning the duct entrance; and (ii) a plurality of impeller elements mounted upon, and distributed along the length of, the rotating collector-rotor body, the impeller elements extending radially from the collector-rotor body by at least about one half inch, and being adapted to engage yard debris disposed on the surface and impel the yard debris toward the duct entrance, and transport twigs encountered on the surface about the axis of the collector-rotor body; the cylindrical volume swept amongst the impellers and generally coinciding with the length of the collector-rotor body defining rotor-occluded volume (ROV); (D) a member for fracturing twigs being transported about the axis of the collector-rotor body by the impeller elements, the member being mounted on the frame and protruding into the rotor-occluded volume; (E) a blower unit operatively connected to the duct, adapted to induce a flow of air through the duct and provide suction at the duct entrance; (F) a source for providing power to the blower unit; and (G) a source for providing power to the collector-rotor assembly.

Yet another embodiment of this invention relates to an apparatus for collecting and reducing twig-containing yard debris comprising: (A) a frame adapted to be advanced over a surface; (B) a duct mounted on the frame and having a duct entrance and a duct exit; (C) a twig-breaking device including a twig arrestor disposed adjacent the duct entrance and a plurality of impeller elements movably mounted on the frame, the impeller elements defining crenels therebetween and being adapted to: (i) engage yard debris disposed on the surface, and (ii) impel the yard debris encountered on the surface against the twig arrestor; (D) the twig arrestor comprising at least one fracturing member: (i) protruding into the crenels; and (ii) adapted to break twigs being transported against the fracturing member by engagement therewith; (E) a blower unit operatively connected to the duct adapted to induce a flow of air through the duct and provide suction at the duct entrance; (F) a source for providing power to the blower unit; and (G) a source for providing power to the impeller elements.

An apparatus for collecting and reducing twig-containing yard debris comprising: (A) a frame adapted to be advanced over a surface; (B) a duct mounted on the frame having a duct entrance and a duct exit; (C) a collector-reducer assembly comprising: (i) a rotating collector-rotor assembly rotatably mounted on the frame adjacent the surface and disposed at the duct entrance, comprising: a rotating collector-rotor body; a plurality of impeller elements mounted upon the rotating collector-rotor body, the impeller elements extending radially therefrom and being adapted to engage and impel yard debris disposed on the surface toward the duct entrance, and transport twigs encountered on the surface about the axis of rotation of the rotating collector-rotor body; (ii) a twig-fracturing member for breaking twigs, the twig-fracturing member being mounted on the frame adjacent the rotating collector-rotor body and adapted to, upon rotation of the rotating collector-rotor assembly, pass between the plurality of impeller elements so as to engage and fracture twigs being transported about the axis of rotation of the rotating collector-rotor body by the impeller elements; (D) a blower unit operatively connected to the duct, adapted to induce a flow of air through the duct and provide suction at the duct entrance; (E) a source for providing power to the blower unit; and (F) a source for providing power to the rotating collector-rotor assembly.

In another embodiment of the invention, the impeller elements comprise polymeric lath elements.

In another embodiment of the invention, the impeller elements comprise metallic lath elements.

In still another embodiment of the invention, the impeller elements comprise pivotably mounted flail elements.

In a further embodiment, the pivotably mounted flail elements have T-shaped cross-sections.

In still another embodiment, the pivotably mounted flail elements comprise circumferentially extending breaker bars and longitudinally extending blocker plates.

In another embodiment, the pivotably mounted flail elements comprise iron-based flail elements adapted to: (A) engage twigs in deep yard debris, (B) transport the twigs about the axis of rotation of the rotating collector-rotor body, (C) urge the twigs against the twig-fracturing member, (D) break the twigs into twig fragments, and (E) impel the twig fragments toward the duct entrance.

In another embodiment, the pivotably mounted flail elements further comprise bushings encompassing a flail pivot shaft and adapted for reducing interference of adjacent flails with each other.

In another embodiment, the pivotably mounted flail elements extend at least to the surface.

In another embodiment, the pivotably mounted flail elements extend below the surface.

In another embodiment, the impeller elements comprise members projecting radially from the rotating collector-rotor body and extending axially along a portion of the length of the rotating collector-rotor body.

In another embodiment, the members are generally planar.

In another embodiment, the members are generally helical.

In still another embodiment, the members are generally helical and adapted to urge yard waste away from the ends of the rotating collector-rotor assembly toward the central portion of the rotor.

In another embodiment, the impellers on the rotating collector-rotor assembly comprise radially extending pegs.

In another embodiment, the impellers on the rotating collector-rotor assembly comprise both axially extending plates and radially extending pegs.

In another embodiment, the impellers on the rotating collector-rotor assembly comprise radially extending pegs of at least two differing lengths defining merlons and crenels between the merlons.

In another embodiment, the rotating collector-rotor assembly rotates such that debris is swept under the axis of rotation of the rotating collector-rotor body as the apparatus is advanced over the surface.

In another embodiment, the flow of air is exhausted and directed against the surface forward of the collector/reducer assembly.

In another embodiment, the collector-rotor assembly is encompassed by a housing comprising side support plates, a rear seal plate, and an upper housing.

In another embodiment, flexible seal strips restricting peripheral airflow into the housing are attached to the side support plates and the rear seal plate.

In another embodiment, flexible seal strips restricting peripheral airflow into the housing are attached to the side support plates and to the twig arrestor mounted on the frame.

In another embodiment, a single power source provides power to the blower unit and the rotating collector-rotor assembly.

In another embodiment, the fracturing member protrudes radially into the rotor-occluded volume at least about one half inch.

In another embodiment, at least one of the crenels is at least about one inch deep, measured in the radial direction.

In another embodiment, at least one of the fracturing members protrudes into the crenel at least about $3/4$ inch, measured radially from the tips of adjacent merlons.

In another embodiment, the fracturing member is at least about $1/8$ inch in diameter.

In another embodiment, the fracturing members are spaced apart from each other no more than about one foot.

In another embodiment, the merlons are plates having thicknesses of at least about $1/16$ inch measured circumferentially.

Another embodiment comprises a rotary brush located at the duct entrance.

Another embodiment further comprises a counterrotating brush located at the duct entrance.

Another embodiment further comprises adjustable-height wheels adjacent the rotating collector-rotor assembly adapted for supporting the rotating collector-rotor assembly at adjustable heights above the surface whereby the degree of engagement of the impeller elements with the surface may be controlled.

In another embodiment, the rotating collector-rotor assembly is rotatably attached at the entrance of the duct which is mounted on the frame, and the duct has sufficient rigidity to operationally support the rotating collector-rotor assembly while the rotating collector-rotor assembly engages the surface and debris.

Another embodiment comprises yieldable rotor blade tips attached to the impellers.

Another embodiment comprises raking tips attached to the impeller elements.

In another embodiment, the blower unit is a chipper shredder.

In another embodiment, the shredder rotor of the chipper shredder is mounted on the crankshaft of an internal-combustion engine.

In another embodiment, the blower is a shredder blower.

In another embodiment, the axis of the engine crankshaft is oriented generally parallel to the direction of motion as the apparatus is advanced over the surface.

Another embodiment further comprises an adjustable duct-closure device for restricting airflow through the duct.

In another embodiment, the adjustable duct-closure device is a pivotable damper.

In another embodiment, the adjustable duct-closure device is a sliding-gate device.

As another embodiment, the twig-fracturing member is a rod.

In another embodiment, the twig-fracturing member is a block.

In still another embodiment, the twig-fracturing member is a block.

In yet another embodiment, the twig-fracturing member is metallic.

In another embodiment, the twig-fracturing member is polymeric.

In another preferred embodiment of the present invention, an apparatus for collecting yard debris on a surface comprises: (A) a frame; (B) a blower unit mounted on the frame and adapted to induce entraining air flow; (C) a collector-rotor assembly comprising a collector-rotor body rotatably mounted on the frame and impeller elements mounted upon the collector-rotor body adapted to: (i) engage the surface and yard debris thereupon, and (ii) impel the yard debris toward the entraining air flow; (D) a duct for conducting the yard debris in entraining air flow to the blower; (E) an air-solids separator operatively connected to the blower unit for separating the yard debris into a debris-enriched stream and a debris-depleted stream; (F) a detachable accumulation container adapted to receive the debris-enriched stream from the air-solids separator; and (G) the detachable accumulation container having at least one attached wheel adapted to support the accumulation chamber upon detachment of the accumulation chamber from the frame.

In still another embodiment of the invention, an apparatus for collecting yard debris on a surface comprises: (A) a chassis frame; (B) a blower unit mounted on the chassis frame and adapted to induce entraining air flow; (C) a collector-rotor rotatably mounted on the chassis frame adapted to: (i) engage the surface and yard debris thereupon, and (ii) impel the yard debris toward the blower unit; (D) a conduit for conducting yard debris in the entraining air flow from the collector-rotor to the blower unit; (E) an air-solids separator operatively connected to the blower unit for separating the entraining air flow into a debris-enriched stream and a debris-depleted stream; (F) a detachable accumulator adapted to receive the debris-enriched stream from the air-solids separator; and (G) the detachable accumulator having at least one attached roller adapted to support the accumulator upon detachment of the accumulator from the frame.

In another embodiment, the roller attached to the detachable accumulator does not bear against the surface when the detachable accumulator is not detached from the apparatus.

In another embodiment, the roller device attached to the detachable accumulator is spaced from the surface when the detachable accumulator is not detached from the apparatus.

In yet another embodiment, the roller device attached to the detachable accumulator comprises at least two attached wheels adapted to support the accumulator upon detachment of the accumulator from the frame.

In another embodiment, the apparatus for collecting yard debris further comprises a ramp for raising the detachable accumulator from the surface as the detachable accumulator is being attached to the apparatus.

In still another embodiment, the apparatus for collecting yard debris further comprises a ramp for raising the detachable accumulator from the surface as the detachable accumulator is being pushed forward into attachment with the apparatus.

In another embodiment, the detachable accumulator has a polyhedral shape.

In yet another embodiment, the detachable accumulator has a generally hexahedral shape.

In another embodiment, the detachable accumulator has a generally heptahedral shape.

In still another embodiment, the detachable accumulator is adapted to be detachably sealed to the air-solids separator.

In yet another embodiment, the detachable accumulator and the air-solids separator have matching tongue-and-groove surfaces enabling the detachable accumulator to be slidably sealed to and supported by the air-solids separator.

In another embodiment, the entrance ends of grooves on the air-solids separator are downwardly flared to facilitate engagement of the tongue rails on the accumulator with the grooves.

In another embodiment, the apparatus further comprises a fastener adapted for securing the detachable accumulator in functional engagement with the air-solids separator.

In still another embodiment, the apparatus comprises a mechanical-advantage fastener adapted for securing the detachable accumulator in functional engagement with the air-solids separator.

In yet another embodiment, the detachable accumulator can be releasably latched to the air-solids separator.

In another embodiment, the separator separates entrained yard debris into a debris-enriched stream and a debris-depleted stream by action of body forces thereupon.

In another embodiment, the separator has sidewalls inclined upwardly and inwardly at from about 5 degrees to about 25 degrees from the vertical.

In another embodiment, the debris-depleted stream from the air-solids separator is exhausted into the atmosphere frontwardly.

In another embodiment, the debris-depleted stream from the air-solids separator is exhausted into the atmosphere sidewardly.

In another embodiment, the debris-depleted stream exhausted from the air-solids separator is directed against the surface forward of the collector-rotor.

In another embodiment, the detachable accumulator has a perimetral frame detachably sealed to an accumulator-support frame pivotably mounted to the air-solids separator.

In yet another embodiment, the accumulator-support frame pivotably mounted to the air-solids separator can be sealingly latched to the air-solids separator.

In still another embodiment, the detachable accumulator has a perimetral frame detachably sealed to an accumulator-support frame pivotably mounted to the chassis frame.

In another embodiment, the detachable accumulator and the accumulator-support frame have matching tongue-and-groove attachment surfaces enabling the detachable accumulator to be slidably sealed to and supported by the accumulator-support frame.

In another embodiment, a maneuvering handle is attached to the detachable accumulator.

In another embodiment, the apparatus comprises at least one auxiliary handle attached to the detachable accumulator for lifting the detachable accumulator.

In another embodiment, the accumulator has one or more transparent panels affording observation of the debris level within the accumulator.

In another embodiment, the accumulator has one or more translucent panels affording observation of the debris level within the accumulator.

In another embodiment, the accumulator has one or more adjustable legs adapted for supporting one end of the accumulator.

In another embodiment, the apparatus has a duct connecting the blower unit to the air-solids separator.

Another aspect of the invention relates to an apparatus for collecting yard debris on a surface in which the apparatus comprises: (A) a frame; (B) a blower unit mounted on the frame adapted to induce entraining air flow adjacent the surface and collect the yard debris in the entraining air flow; (C) a flow conduit for conducting the yard debris in entraining air flow to the blower; (D) an air-solids separator operatively connected to the blower unit for separating the yard debris in the entraining air flow into a debris-enriched stream and a debris-depleted stream; and (E) a detachable accumulator adapted to receive the debris-enriched stream from the air-solids separator; with the detachable accumulator having a polyhedral shape and being adapted to be detachably sealed to the air-solids separator.

In another aspect, this invention relates to a free-flow apparatus for separating entrained yard debris from a transporting air stream by action of body forces thereupon comprising: (A) a curvilinear primary separation duct having an outer wall, an interior wall, an entrance for accepting a stream of air bearing entrained yard debris, and an exit; (B) a secondary separation chamber having a roof and a substantially frusto-conical outer peripheral wall with an opening therethrough, the outer wall of the curvilinear primary separation duct being generally tangential to the frusto-conical outer peripheral wall of the secondary separation chamber in one location adjacent the opening, the interior wall of the curvilinear primary separation duct defining an acute angle with the frusto-conical outer peripheral wall at a location generally opposed to the one location adjacent the opening in which the outer wall of the curvilinear primary separation duct is generally tangential to the frusto-conical outer peripheral wall of the secondary separation chamber; (C) the secondary separation chamber being adapted to receive the stream of air bearing entrained yard debris from the exit of the curvilinear primary separation duct; (D) the secondary separation chamber being partially encompassed horizontally by the curvilinear primary separation duct; (E) the secondary separation chamber being adapted to separate the stream of air bearing entrained yard debris into an exteriorly located debris-enriched stream and an interiorly located debris-depleted stream by action of body forces thereupon; (F) an accumulation chamber located below the secondary separation chamber for receiving the exteriorly located debris-enriched stream; (G) a baffle centrally disposed between the secondary separation chamber and the accumulation chamber for inhibiting secondary flow from the accumulation chamber into the secondary separation chamber and impeding re-entrainment of fine particulates from the accumulation chamber into the debris-depleted stream; and (H) the roof of the secondary separation chamber having defined therein a substantially centrally located passage adapted to exhaust the interiorly located debris-depleted stream to the atmosphere.

In another embodiment, the outer peripheral wall of the secondary separation chamber flares downwardly and outwardly.

In another embodiment, the outer peripheral wall of the secondary separation chamber is generally vertical.

In still another embodiment, the opening through the outer peripheral wall of the secondary separation chamber has a generally trapezoidal configuration.

In yet another embodiment, the outer peripheral wall of the secondary separation chamber flares downwardly and outwardly at from about 5° to about 25° from the vertical.

In another embodiment, the outer wall of the primary separation duct is inclined downwardly and outwardly at from about 5° to about 25° from the vertical.

In still another embodiment, the outer peripheral wall of the secondary separation chamber flares downwardly and outwardly and the outer wall of the primary separation duct is inclined downwardly and outwardly at from about 5° to about 25° from the axis of the frusto-conical portion of the secondary separation chamber.

In yet another embodiment, the stream of air bearing entrained yard debris flows through the primary-separation duct into the secondary-separation-chamber through the opening defined in the outer peripheral wall of the secondary separation chamber.

In another embodiment, the height of the uppermost extent of the primary-separation duct above the uppermost extent of the secondary-separation-chamber is no more than 50% of the height of the secondary-separation-chamber.

In still another embodiment, the centrally located passage through the roof through which air is exhausted from the secondary separation chamber directs air discharged therefrom forwardly.

In yet another embodiment, the debris-depleted stream from the secondary separation chamber is exhausted into the atmosphere frontwardly.

In another embodiment, the debris-depleted stream from the secondary separation chamber is exhausted into the atmosphere sidewardly.

In another embodiment, the secondary separation chamber is thermoformed.

In still another embodiment, the primary separation duct further comprises an adjustable duct-closure device for minimizing airflow through the primary separation duct.

In yet another embodiment, the adjustable duct-closure device is a pivotable damper.

In another embodiment, the adjustable duct-closure device is a sliding-gate device.

In another embodiment, the accumulation chamber is mounted on a motor vehicle.

In still another embodiment, the accumulation chamber is towably mounted on wheels.

In another preferred embodiment, the present invention relates to a free-flow apparatus for separating entrained yard debris from a transporting air stream by action of body forces thereupon comprising: (A) a device for delivering a stream of air bearing entrained yard debris; (B) a vessel having an outer vessel wall and an opening therethrough, a roof, and a bottom; (C) a duct having an outer duct wall, an interior duct wall, a duct entrance, and a duct exit, the duct being disposed generally horizontally about an upper portion of the vessel; (D) a portion of the outer duct wall of the duct adjacent the duct exit being generally tangential to the outer vessel wall of the vessel in one location adjacent the opening, and a portion of the interior duct wall of the duct adjacent the duct exit defining an acute angle with the outer vessel wall at a location generally opposed to the one location adjacent the opening; (E) the duct being adapted to: (i) receive the stream of air bearing entrained yard debris through the duct entrance, (ii) conduct the stream of air bearing entrained yard debris from the duct entrance to the duct exit, and (iii) direct the stream of air bearing entrained yard debris into the vessel in a direction generally tangential to the outer vessel wall; (F) the roof having defined therein a substantially centrally located passage with a passage entrance and a passage exit; (G) a baffle extending generally outwardly from a point below the passage entrance, the baffle separating the vessel into an upperly located separation chamber and a lowerly located accumulation chamber, the outer periphery of the baffle being spaced inwardly from the outer vessel wall; (H) the separation chamber being adapted to separate the stream of air bearing entrained yard debris into an outerly located debris-enriched stream and an innerly located debris-depleted stream; (I) the substantially centrally located passage being adapted for: (i) receiving the innerly located debris-depleted stream from the separation chamber through the passage entrance, and (ii) discharging the innerly located debris-depleted stream into the atmosphere; and (J) the baffle being disposed to impede movement of fine particulates from the accumulation chamber into the innerly located debris-depleted stream.

In another embodiment, the duct is disposed generally horizontally with an upper portion of the vessel.

In still another embodiment, the duct is curvilinear and partially encompasses an upper portion of the vessel horizontally.

In yet another embodiment, a portion of the outer vessel wall of the separation chamber is frusto-conical and flares downwardly and outwardly.

Another aspect of the invention relates to an apparatus for separating entrained yard debris from a transporting air stream by action of body forces thereupon comprising: (A) a duct having an outer wall, an interior wall, a duct entrance for accepting a stream of air bearing entrained yard debris and a duct exit; (B) a separation chamber having a roof and a substantially frusto-conical outer peripheral wall with an opening therethrough, the outer wall of the duct being generally tangential to the frusto-conical outer peripheral wall of the separation chamber in one location adjacent the opening, the interior wall of the duct defining an acute angle with the frusto-conical outer peripheral wall at a location generally opposed to the one location adjacent the opening in which the outer wall of the duct is generally tangential to the frusto-conical outer peripheral wall of the separation chamber; (C) the separation chamber being adapted to receive the stream of air bearing entrained yard debris from the duct exit; (D) the separation chamber being partially encompassed horizontally by the duct; (E) the separation chamber being adapted to separate the stream of air bearing entrained yard debris into an exteriorly located debris-enriched stream and an interiorly located debris-depleted stream by action of body forces thereupon; (F) an accumulation chamber located below the separation chamber for receiving the exteriorly located debris-enriched stream; (G) a baffle centrally disposed between the separation chamber and the accumulation chamber for inhibiting secondary flow from the accumulation chamber into the separation chamber and impeding re-entrainment of fine particulates from the accumulation chamber into the debris-depleted stream; and (H) the roof of the separation chamber having defined therein a substantially centrally located passage adapted to exhaust the interiorly located debris-depleted stream to the atmosphere.

In another embodiment, the means for delivering a stream of air bearing entrained yard debris further comprises: (A) a frame adapted to be advanced over a surface; (B) a conduit mounted on the frame and having a conduit entrance and a conduit exit; (C) a blower unit operatively connected to the conduit exit and adapted to induce a flow of air through the conduit and provide suction at the conduit entrance; the conduit exit being operatively connected to the duct entrance.

In still another embodiment, the substantially centrally located passage through the roof through which air is exhausted from the separation chamber directs the debris-depleted stream exhausted therefrom toward the conduit entrance.

In still another embodiment, the debris-depleted stream from the separation chamber is exhausted toward the conduit entrance.

In another aspect, this invention relates to an apparatus for lifting and collecting lawn thatch comprising: (A) a frame adapted for movement in a principal direction upon a surface; (B) a duct mounted on the frame having a duct entrance and a duct exit; (C) a collector-rotor assembly comprising: a collector-rotor body disposed at the duct entrance having a substantially horizontal axis of rotation generally normal to the first direction; and a plurality of yieldable dethatching elements mounted upon the collector-rotor body, the dethatching elements being adapted to: (i) sweep over the surface, (ii) penetrate, engage and lift thatch thereupon, and (iii) impel the lifted thatch toward the duct entrance, the yieldable dethatching elements extending radially from the collector-rotor body by at least about one half of an inch; the collector-rotor assembly and the duct being configured for substantially untrammeled frontal engagement with yard debris having a depth of at least about two (2) inches; (D) a conduit having a conduit entrance and a conduit exit; (E) a blower unit, disposed between the duct exit and the conduit entrance, adapted to: (i) provide suction at the duct entrance entraining the lifted thatch; and (ii) induce a flow of the entrained lifted thatch through the duct and the conduit; (F) an air-solids separator operatively connected to the conduit exit for separating the entrained lifted thatch into a thatch-enriched stream and a thatch-depleted stream; (G) an accumulator operatively connected to the air-solids separator and adapted to receive the thatch-enriched stream from the air-solids separator; (H) a power source operatively connected to the blower unit and adapted to provide power to the blower unit; (I) a power source operatively connected to the collector-rotor assembly adapted to provide power to the collector-rotor assembly; and (J) a mechanism for adjusting the degree of engagement of the yieldable dethatching elements with the surface.

A preferred embodiment of this invention relates to an apparatus for lifting and collecting lawn thatch comprising: (A) a frame; (B) a first duct mounted on the frame having a first-duct entrance and a first-duct exit; (C) a second duct having a second-duct entrance and a second-duct exit, with the second-duct entrance operatively connected to the first-duct exit; (D) a rotating collector-rotor assembly comprising a collector-rotor body rotatably mounted on the frame having yieldable dethatching elements mounted thereupon adapted to: (i) sweep over a surface, (ii) penetrate, engage and lift thatch from among standing shafts of grass on the surface, and (iii) impel the lifted thatch toward the first-duct entrance; (E) a blower unit operatively connected to the first and second ducts and adapted to: (i) induce air flow adjacent the first-duct entrance entraining the lifted thatch; and (ii) induce a flow of the entrained lifted thatch through the first and second ducts; (F) an air-solids separator operatively connected to the second-duct exit and adapted for separating the entrained lifted thatch into a thatch-enriched stream and a thatch-depleted stream; (G) an accumulator adapted to receive the thatch-enriched stream from the air-solids separator; (H) a power source operatively connected to the blower unit and adapted to provide power to the blower unit; and (I) a power source operatively connected to the rotating collector-rotor body and adapted to provide power to the rotating collector-rotor body.

In another embodiment, the tips of the yieldable dethatching elements comprise elements for engaging an irregular surface, including pliable blades being yieldable to hard objects encountered on the surface, but being sufficiently stiff to sweep debris from irregularities present in the surface.

In another embodiment, the tips of the yieldable dethatching elements comprise rows of radially extending raker teeth adapted to engage and impel debris objects on the surface toward the duct entrance.

In still another embodiment, the yieldable dethatching elements comprise flexible polymeric lath elements.

In yet another embodiment, the yieldable dethatching elements comprise flexible metallic lath elements.

In another embodiment, the yieldable dethatching elements comprise pivotably mounted flail elements.

In another embodiment, the apparatus further comprises an arrestor wherein the pivotably mounted flail elements are iron-based, and the flail elements are adapted to: (A) engage twigs in deep yard debris, (B) transport them about the axis of rotation of the rotating collector-rotor, (C) force the twigs against the arrestor, (D) break the twigs into twig fragments, and (E) impel the twig fragments toward the duct entrance.

In still another embodiment, the yieldable dethatching elements comprise coil-connected dethatching tines.

In still another embodiment, the yieldable dethatching elements comprise coil-connected raking tines.

In another embodiment, the collector-rotor comprises axially extending plate members.

In still another embodiment, the apparatus further comprises yieldable rotor blade tips attached to rigid impeller elements.

In yet another embodiment, the apparatus comprises raking tips attached to rigid impeller elements.

In another embodiment, the blower is disposed between the first-duct exit and the second-duct entrance.

In another preferred embodiment, the present invention relates to a flail for rotatable mounting on a shaft on a rotatably mounted collector rotor comprising: (A) a transversely extending bushing having a generally cylindrical journal therethrough; (B) a flail body member joined to the bushing comprising a generally planar striker plate extending outwardly from the bushing member and lying in a plane generally perpendicular to the axis of the journal; (C) a blocker plate joined to the flail body member extending outwardly and lying in a plane generally parallel to the axis of the journal; and (D) the total transverse width presented by the blocker plate being less than the transverse length of the bushing, and the outward length of the striker plate exceeding the outward length of the blocker plate.

In another preferred embodiment, the present invention relates to an adaptor kit for mounting on a vehicle comprising: (A) a positionable suction head; (B) a conduit operatively connected to the positionable suction head and having a conduit exit; (C) a device for generating a flow of air inwardly through the suction head while collecting a stream of entrained yard debris; (D) a separation chamber having an outer chamber wall, a roof, and an opening for receiving the stream of entrained yard debris, the roof having defined therethrough a substantially centrally located passage; (E) a duct having a duct entrance, an outer duct wall, and a duct exit connected to the opening, the duct being adapted for: (i) accepting the stream of entrained yard debris from the conduit, (ii) conducting the stream of entrained lawn debris from the duct entrance to the opening in the separation chamber, and (iii) directing the stream of entrained lawn debris into the separation chamber in a direction primarily tangential to the outer chamber wall; (F) the separation chamber being adapted to separate the stream of entrained lawn debris into an outerly located debris-enriched stream and an innerly located debris-depleted stream; (G) the substantially centrally located passage being adapted to exhaust the debris-depleted stream from the separation chamber into the atmosphere; (H) an accumulation chamber mountable on a vehicle for receiving the debris-enriched stream; and (I) a baffle located between the separation chamber and the accumulation chamber for inhibiting secondary flow from the accumulation chamber into the separation chamber and impeding re-entrainment of fine particulates from the accumulation chamber into the debris-depleted stream, the separation chamber having an opening around the baffle into the accumulation chamber permitting passage of the outerly located debris-enriched stream from the separation chamber into the accumulation chamber.

In a further embodiment, the duct is disposed generally horizontally with the separation chamber.

In another embodiment, the duct is at least partially curvilinear and partially encompasses the separation chamber horizontally.

In still another embodiment, the device for generating a flow of air inwardly through the suction head comprises a blower fan.

In yet another embodiment, the blower fan is operatively connected to the conduit exit and the duct entrance.

In another embodiment, the device for generating a flow of air is a chipper shredder.

In still another embodiment, the device for generating a flow of air is a shredder blower.

In yet another embodiment, the vehicle is a motor vehicle.

In another embodiment, the vehicle is a collection truck.

In still another embodiment, the vehicle is a towable collection apparatus adapted to be towed behind a motor vehicle.

In yet another embodiment, the towable collection apparatus further comprises a utility trailer.

In another embodiment, the accumulation chamber is detachable from the device for generating a flow of air inwardly through the suction hood.

Another aspect of the invention relates to a towable collection apparatus adapted to be towed behind a motor vehicle comprising: (A) a towable accumulation chamber; (B) a positionable suction head; (C) a flexible transport hose operatively connected to the positionable suction head and having a hose exit; (D) a device for inducing a flow of air inwardly through the suction head while collecting a stream of entrained lawn debris; (E) a separation chamber having an outer chamber wall, a roof, and an opening for receiving the stream of entrained lawn debris, the roof having defined therethrough a substantially centrally located passage with a passage entrance and a passage exit; (F) a duct having a duct entrance, an outer duct wall, and a duct exit connected to the opening, the duct being adapted for: (i) accepting the stream of entrained yard debris from the flexible transport hose, (ii) conducting the stream of entrained lawn debris from the duct entrance to the opening in the separation chamber, and (iii) directing the stream of entrained lawn debris into the separation chamber in a direction primarily tangential to the outer chamber wall; (G) the separation chamber being adapted to separate the stream of entrained lawn debris into an outerly located debris-enriched stream and an innerly located debris-depleted stream; (H) the substantially centrally located passage adapted to exhaust the debris-depleted stream from the separation chamber into the atmosphere; and (I) a baffle located between the separation chamber and the towable accumulation chamber for inhibiting secondary flow from the towable accumulation chamber into the separation chamber and impeding re-entrainment of fine particulates from the towable accumulation chamber into the debris-depleted stream, the separation chamber having an opening around the baffle into the towable accumulation chamber permitting passage of the outerly located debris-enriched stream from the separation chamber into the towable accumulation chamber.

In another aspect, this invention relates to an apparatus for collecting yard debris disposed on a surface comprising: (A) a chassis frame; (B) a blower unit mounted on the chassis frame and adapted to (i) induce air flow adjacent a surface, and (ii) entrain yard debris disposed on the surface in an entraining air stream; (C) a conduit having a conduit entrance and adapted for conducting the yard debris in the entraining air stream from the surface to the blower unit; (D) an air-solids separator operatively connected to the blower unit for separating the entraining air flow into a debris-enriched stream and a debris-depleted stream; (E) an accumulator adapted to receive the debris-enriched stream from the air-solids separator; and (F) a passage having a passage entrance and a passage exit, wherein: (i) the passage entrance is operatively connected to and adapted to receive the debris-depleted stream from the air solids separator, (ii) the passage is adapted to conduct the debris-depleted stream along its length, and (iii) the passage exit is adapted to direct the debris-depleted stream toward the conduit entrance.

In another embodiment, the passage exit is adapted to direct the debris-depleted stream to a location proximate the conduit entrance.

BRIEF DESCRIPTION OF THE DRAWINGS

FIG. 2 is a side view of the apparatus of FIG. 1 with a portion of the apparatus shown in cross section view along the lines of 2-2 of FIG. 1.

FIG. 8 is a perspective view of the primary separation loop shown in FIG. 1.

FIG. 9 is a cross sectional view of the separator and hopper as viewed along lines 9-9 in FIG. 2.

FIG. 10 is a perspective isolated view of the collector rotor shown in FIG. 1.

FIG. 11 is a schematic perspective view of the collector duct shown in FIG. 2, including notation for design parameters.

FIG. 12 is a schematic view of raking tips that can be used with the collector rotor shown in FIG. 10.

FIG. 32 is a partial phantom side view illustrating the height-adjusting mechanism for the adjustable-height wheels.

FIG. 33 is a partial cross-section view along the lines of 33-33 in FIG. 32, illustrating the sliding support blocks on which the adjustable-height wheels are mounted.

FIG. 34 is a perspective view illustrating the twig-breaker sweeps with crenels, merlons, and crenel furrows.

FIG. 35 is a partial side view illustrating the downwardly flaring mouth of the receiver groove, which functions as a ramp for engaging and raising the leading edge of the accumulator as the accumulator is pushed forward.

FIG. 36 is a partial side view illustrating another embodiment in which the accumulator-support frame pivots downward to receive the tongue rails on the accumulator.

FIG. 37 is a partial side view illustrating flexible seal strips for restricting peripheral inflow of air into the collector.

FIG. 38 is a partial cross-section view illustrating a reduced-height separator mounted on a debris-collecting truck.

FIG. 39 is a partial top view illustrating tangential approach of the primary-separation duct to the secondary-separation chamber of the reduced-height separator.

DESCRIPTION OF THE PREFERRED EMBODIMENT

Figure 1:
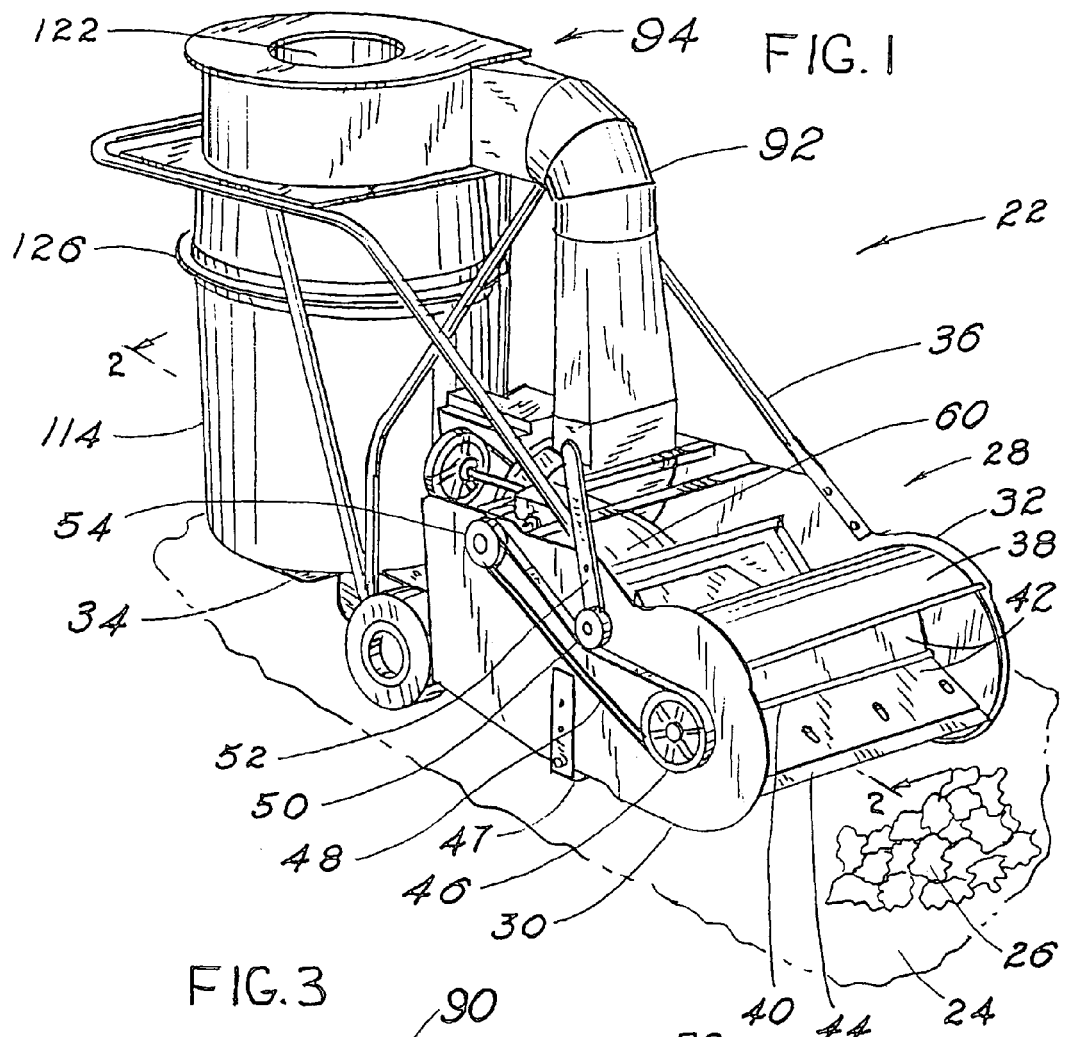
FIG. 1 is a perspective view of a typical apparatus made in accordance with the present invention and showing certain principal features of the apparatus.

In FIG. 1, deep collector 22 rests on surface 24 bearing deep yard debris 26 comprising primarily leaves, twigs, clippings and other materials such as usually accumulate on lawns, sidewalks and patios in the vicinity of trees in the autumn. Frame 28 of deep collector 22 comprises right side support plate 30, left side support plate 32, base-plate 34, and control handle structure 36. Upper housing 38 spans from right side support plate 30 to left side support plate 32. Rotor shaft 40 journaled between left and right side support plates 30 and 32 carries a plurality of rotor blades 42, each of which is preferably substantially gas impervious and bears a rotor tip which, in FIG. 1, may be a substantially gas impervious flexible rotor blade tip such as that indicated at 44. Rotor pulley 46 mounted on rotor shaft 40 engages drive belt 48, which also engages idler pulley 50 mounted on lever arm 52 pivotably mounted on right side support plate 30. Drive pulley 54 is connected to motive means 146 for powering deep collector 22. By pivoting lever arm 52 clockwise, idler pulley 50 tightens drive belt 48, drawing it into firm engagement with rotor pulley 46 and drive pulley 54, rotating rotor shaft 40 bearing rotor blades 42 and flexible rotor blade tips 44, which engage surface 24 upon rotation of rotor shaft 40. A shaft with rollers 47 can be raised and lowered on the side support plates 30 and 32 to conversely lower and raise the rotor blade tips 44 relative to surface 24.

Figure 3:
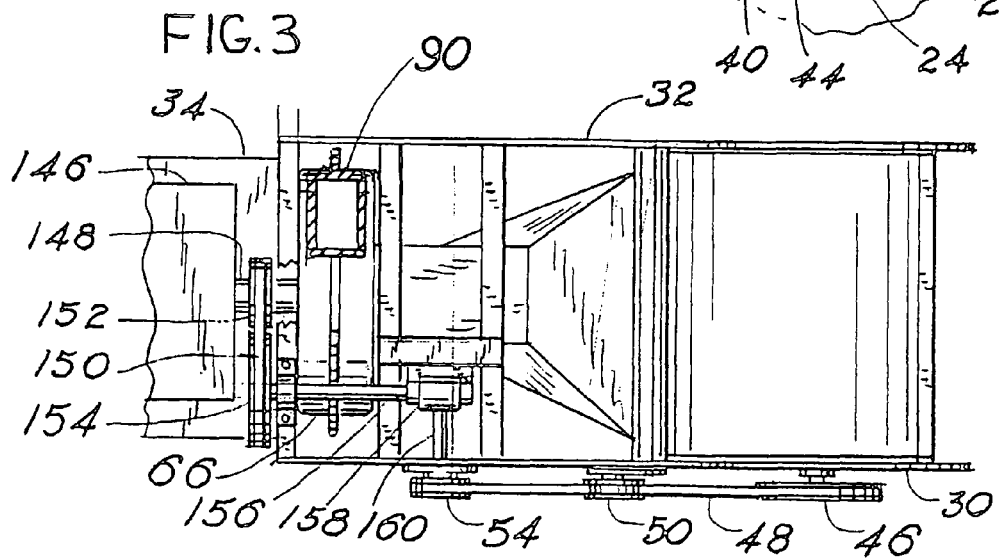
FIG. 3 is a top view of a portion of the apparatus of FIG. 1 with the transfer duct 92 removed at cross-section view along the lines of 3-3 in FIG. 2 to show elements of power supply to the chipper shredder and the collector rotor.

FIG. 3 shows details of power delivery to chipper-shredder unit 66 and drive pulley 54. Conventional engine 146 disposed on base plate 34 has engine crankshaft 148 extending into chipper-shredder unit 66, chipper shredder rotor 74 being mounted on said engine crankshaft. Engine drive belt 150 engages engine drive pulley 152 disposed on engine crankshaft 148 and second pulley 154 disposed on first power shaft 156. Reducing-angle drive 158 disposed at the intersection of first power shaft 156 and second power shaft 160 transmits power to drive pulley 54.

As shown in FIG. 2, as rotor blades 42 are driven counter-clockwise, flexible rotor tips 44 proximately engage upper housing 38 impeding substantial passage of air between upper housing 38 and rotor blades 42. As the arc of upper housing 38 is at least a significant fraction of the included angle between adjacent rotor blades 42, a substantial seal to passage of air is provided above rotor shaft 40 throughout much or all of the rotation cycle of said rotor shaft. In preferred embodiments, rotor shaft 40 is at least about 2" above surface 24, facilitating engagement of rotor blade tips 44 with deep yard debris 26 having a depth considerably greater than 2". In more preferred embodiments, upper lip 58 on upper housing 38 will be at least about 4" inches above surface 24 permitting engagement with yard debris 26 having a depth of that order of magnitude. In more preferred embodiments, upper lip 58 of upper housing 38 will be disposed at least about 8" inches above surface 24, more preferably at least about 12". Yard debris 26 engaged between adjacent rotor blade tips 44 is thereby impelled rearwardly toward collector duct 60 defined between upper collector shell 62 and lower collector shell 64. Suction is supplied to collector duct 60 by chipper-shredder unit 66 which may be of any conventional construction such as that shown in U.S. Pat. No. 5,931,396. For typical yard debris having a depth of several inches, we have obtained good results with units providing at least about 20, preferably over 40, cubic feet per minute (cfm) of air flow per inch of width of the suction intake. While it is desirable to have considerable shredding action to reduce the volume of the debris collected, even the minimal amount of shredding provided by a sufficiently powerful fan can be adequate for effectively collecting leaves.

Figure 4:
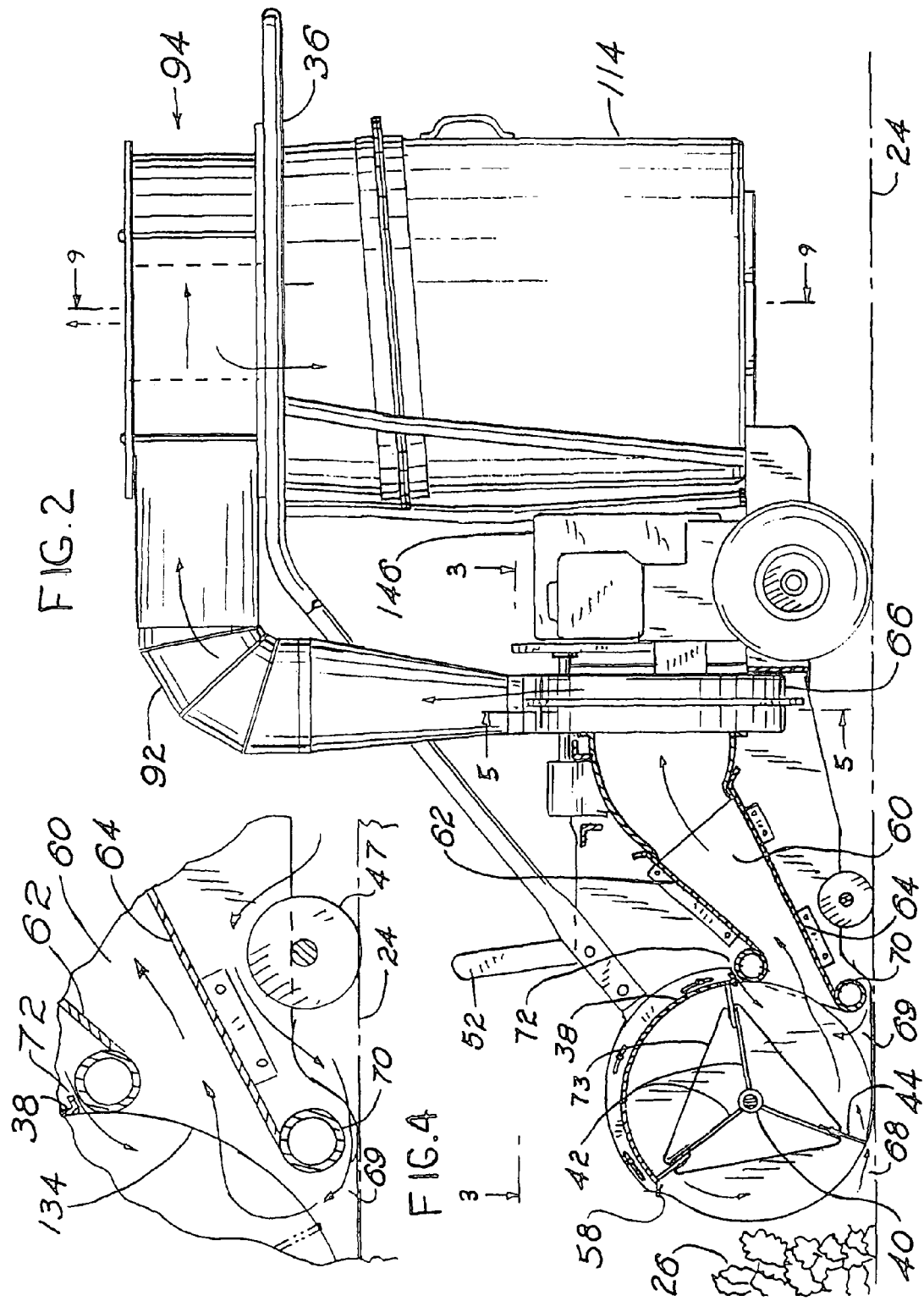
FIG. 4 is a close-up view of the apparatus in FIG. 2 showing airflow around the lower collector lip.

As generally indicated at 68 in FIG. 2, as flexible rotor blade tip 44 moves toward lower collector lip 70 between right side support plate 30 and left side support plate 32, flows of air having substantial components nearly parallel to surface 24 are induced in close proximity to surface 24. As shown in FIG. 4, as lower collector lip 70 is spaced from surface 24, forwardly and upwardly directed air flow generally indicated at 69 around lower collector lip 70 provides enhanced vacuuming effect at surface 24 during the period in which flexible rotor tips 44 are moving from the point of engagement with surface 24 toward lower collector lip 70. Ideally, the lowermost portion of lower collector lip 70 is spaced from surface 24 by a height of about one tenth to about three quarters of the height of the opening to collector duct 60. Particularly enhanced suction at surface 24 and air flow parallel to surface 24 occurs as each flexible rotor blade 44 draws into closest proximity with surface 24.

In some preferred embodiments, suction in collector duct 60 comprises a steady level of suction having superimposed therewith pulsed suction, this combination of steady and pulsed suction providing excellent ability to both induce flow of fine yard debris through collector duct 60 while also impelling heavier yard debris through said collector duct toward chipper-shredder unit 66. Pulsing of the suction applied to collector duct 60 is thought to result from the variable opening created between flexible rotor blade tips 44 and surface 24 as flexible rotor blades 44 sweep rearwardly toward lower collector lip 70, attaining high velocity in collector duct 60 prior to rotor blade 42 and flexible rotor blade tip 44 coming into closest proximity with surface 24, and high suction as rotor blade 42 and flexible rotor blade tip 44 come into closest proximity with lower collector lip 70.

Variable stripping slot 72 defined between upper housing 38 and upper collector shell 62 admits a flow of air into voids between rotor blades 42, aiding in removal of yard debris contained therebetween and reducing cycling of yard debris around rotor shaft 40. Ideally, the width of variable stripping slot 72 is sized to provide enough of an impulse to remove debris which might otherwise be carried around with the rotor, without unduly compromising the vacuum flow used for removal of fine debris from the ground. We have found that a width of from about one tenth to about three quarters of the height of the opening to collector duct 60 is suitable for a 5 HP unit. We have also found that fillets 73 installed between adjacent rotor blades 42 aid in reducing the amount of debris which might otherwise be carried around with the rotor.

Figures 5, 6, 7:
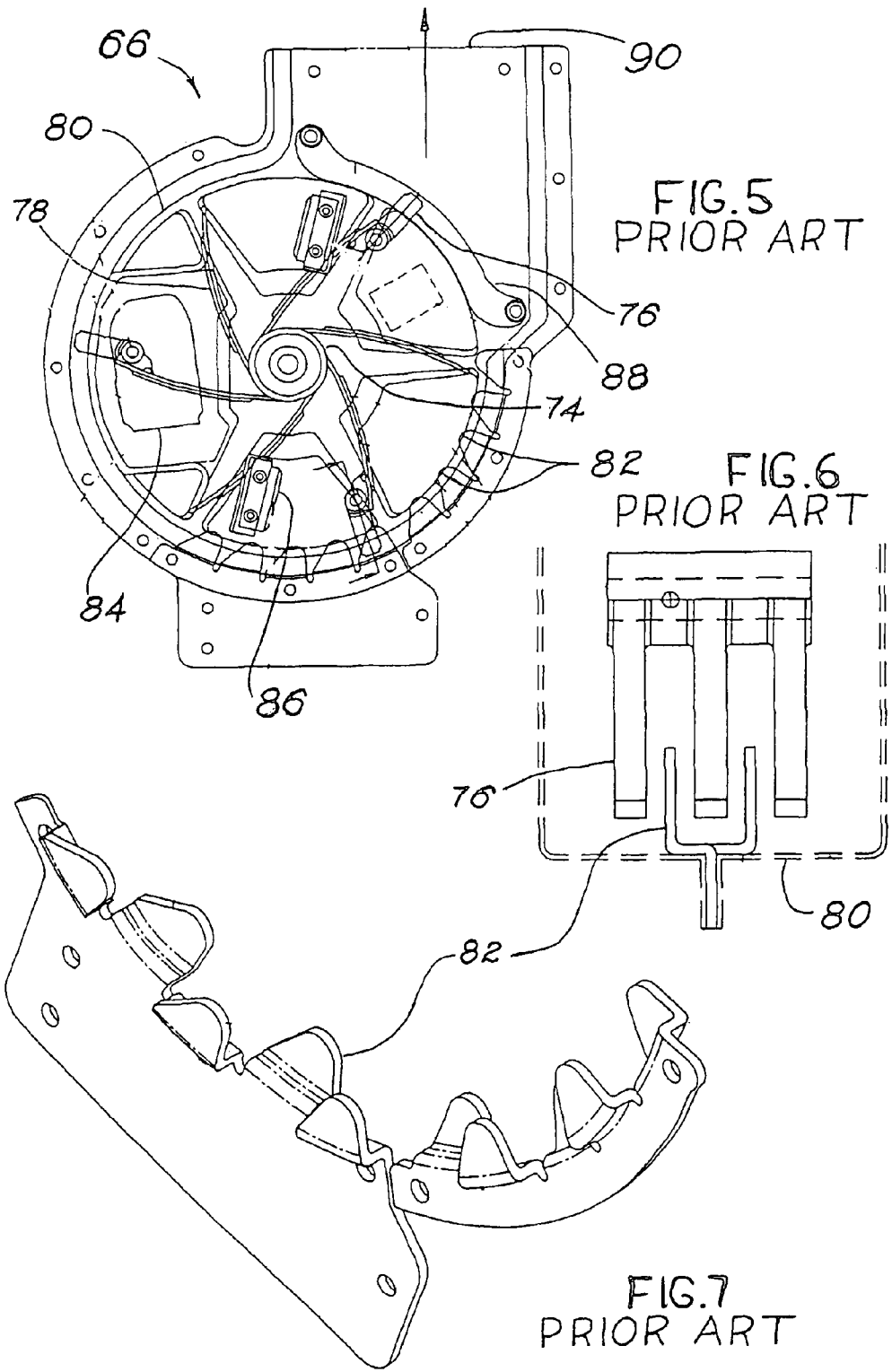
FIG. 5 is a front view of the chipper shredder shown as a cross section view along the lines of 5-5 of FIG. 2.
FIG. 6 is a cross section view of the chipper shredder taken along lines 6-6 in FIG. 5 and showing the interaction of the swing hammers with the inwardly protruding teeth.
FIG. 7 is a perspective isolated view of the inwardly protruding teeth shown at 82 in FIG. 5.

Airflow induced by chipper-shredder unit 66 entrains yard debris 26 and transports said yard debris through collector duct 60 and into chipper-shredder unit 66. FIGS. 5, 6, and 7 show features of a preferred embodiment of chipper-shredder unit 66. A shredder rotor 74 with swing hammers 76 and fan blades 78 rotates in chipper-shredder enclosure 80. Swing hammers 76 swing past inwardly protruding teeth 82, reducing the size of leaves and other entrained debris. An advantage of reducing the volume of the collected leaves and other debris with the invention is to make it possible to store a considerable mass of debris, reducing storage space while reducing the tendency for wind to disperse the leaves. Branches may be introduced into chipper-shredder enclosure 80 through chipper-shredder opening 84 and chipped by chipper knives 86. Reduced debris passes through elongated gaps in swing hammer screen 88 and outward through chipper-shredder exhaust port 90.

Entrained debris from chipper-shredder unit 66 is impelled through transfer duct 92 to separator 94 which separates entrained debris from the entraining air. As shown in FIG. 8, debris entrained in air passes from transfer duct 92 into separator 94 through separator inlet duct 96. Primary separation occurs in primary separation duct 98 as the flow of air is redirected inwardly, while inertial forces urge debris solids toward perimetral wall 100 of primary separation duct 98, thereby forming a solids-depleted inner layer and a solids-enriched outer layer. Primary separation duct 98 directs the flow of air-entrained yard debris downwardly as it enters secondary separation chamber 102 in FIG. 9, impelling downward flow of both solids-depleted inner air layer generally indicated at 104 and solids-enriched outer layer generally indicated at 106 through transfer opening 108 between primary separation duct 98 and secondary separation chamber 102.

As shown in FIG. 9, solids-depleted inner air layer generally indicated at 104 flows downwardly in innermost portion of transfer opening 108, while solids-enriched outer layer generally indicated at 106 flows downwardly along first perimetral wall 100 into secondary separator chamber 102. Rotating airflow indicated generally at 110 swirls around secondary separation chamber 102, further separating debris into solids enriched outer layer 106, which passes along second perimetral wall 112 of secondary separation chamber 102 into hopper 114 below. To be most effective, this rotating airflow moves with a tangential velocity of at least about 2000 feet per minute measured close to second perimetral wall 112, causing the entrained reduced lawn debris to move outwardly toward second perimetral wall 112 of secondary-separation chamber 102 by action of body forces thereupon. Second perimetral wall 112 may consist of some combination of cylindrical and frusto-conical surfaces, and is referred to as a frusto-conical outer wall section. Swirling continues in hopper 114, while infundibulate baffle 116 impedes secondary flows of air containing finely reduced debris fragments from re-entering secondary separation chamber 102. In secondary separation chamber 102, solids-depleted inner air layer generally indicated at 105 migrates upwardly along the axis of secondary separation chamber 118, through exhaust entrance 120, which passes through upper bulkhead 121, and exits through exhaust passage 122 to the atmosphere. Infundibulate baffle 116 is suspended below secondary separation chamber 102 by supporting rods 117 or by other supporting means. If desired, deflector 125 can be placed adjacent to exit 123 of exhaust passage 122 to direct airflow generally indicated at 127 away from person operating apparatus. As illustrated in FIGS. 8 and 9, the axis of secondary separation chamber 102, the center of curvature of primary separation duct 98, the center of curvature of perimetral wall 100, and the center of curvature of second perimetral wall 112, and are all generally coincident As most of the separation is achieved by the action of body forces on the particles of entrained debris, the flow through the separator is substantially unimpeded—in contrast to those units in which filtration is primarily relied upon to remove the particulate debris from the air-stream in which it is entrained. Hence, this separator is referred to as a free-flow apparatus. Even though a minimal filter may be placed in the exhaust stream from the separator if so desired, the flow through the separator is substantially free of obstructions which might limit the flow of air significantly if filtration were relied upon for primary removal of heavy debris. Thus, the invention provides a machine which effectively separates the reduced yard debris from the air in which it is entrained, and which can be operated effectively for an extended period without either stopping to clear a filter in the separator, or experiencing decreased pick-up efficacy because of reduced air flow rate occasioned by partial blockage of a filter area.

Since the apparatus of the invention separates the debris from the air stream without relying primarily on a filter element, another aspect of the invention is to be able to collect the reduced debris in an impervious receptacle. Thus, the receptacle may be a barrel-like container, a fabric bag of limited permeability, a plastic bag, or a paper bag. One may also deploy a flexible container, such as a plastic or paper bag, within a rigid barrel-like container.

Another aspect of the invention is that it provides a machine having a separator and collector container low enough in height that the operator will be able to see over the separator in order to operate the machine effectively, while the collector container still has substantial capacity for accumulating debris. Accordingly, it is preferable that the overall height of the apparatus from the uppermost portion of the apparatus to the outer baffle periphery be less than about 1.2 times the inside diameter of the separation chamber as measured proximate the baffle periphery. It is further preferable that the plane of the baffle periphery be disposed below the lowermost portion of the upper bulkhead by a distance of less than about 0.6 times the inside diameter of the separation chamber. In some configurations, it is preferable that the baffle periphery be disposed below the lowermost portion of the entrance to the exhaust passage by a distance of less than about 0.6 times the inside diameter of the separation chamber.

Further in FIG. 9, upon being filled with retained debris 124, hopper 114 may be opened by sliding apart upper and lower flanges 126, allowing retained debris 124 accumulated therein to be discarded. Thus, another feature of the invention is in providing a debris-collection receptacle which can be emptied quickly and easily.

FIG. 10 further displays construction of collector rotor 128 comprising rotor shaft 40, rotor blades 42, flexible rotor blade tips 44, adjusting nuts 130 for adjusting flexible rotor blade tips 44 for proper engagement with surface 24, and left seal disc 132 and right seal disc 134 for assisting in rigidifying of rotor blades 42 while substantially impeding axial air flow into spaces between rotor blades 42.

FIG. 11 shows a preferred configuration for collector duct 60, having a collector duct entrance 136, a collector duct exit 138, and a convergence angle φ preferably less than about 120°. In preferred embodiments, convergence angle φ will be less than 110°. In more preferred embodiments, convergence angle φ will be less than 100°, most preferably less than 80°. In other preferred embodiments, the cross sectional area of collector duct 60 measured in planes (generally indicated at 140) perpendicular to central flow line (generally indicated at 142) will be approximately constant along length of collector duct 60. In more preferred embodiments, cross sectional area at any point along collector duct 60 will be within about 15 percent of the average of the minimum and maximum values.

FIG. 12 displays optional raking tips 144 which may be attached to rotor blade 42, enabling use of deep collector 22 for raking debris from a grass-covered surface such as a lawn or other crinose surface such as Astroturf®.

Figure 13:
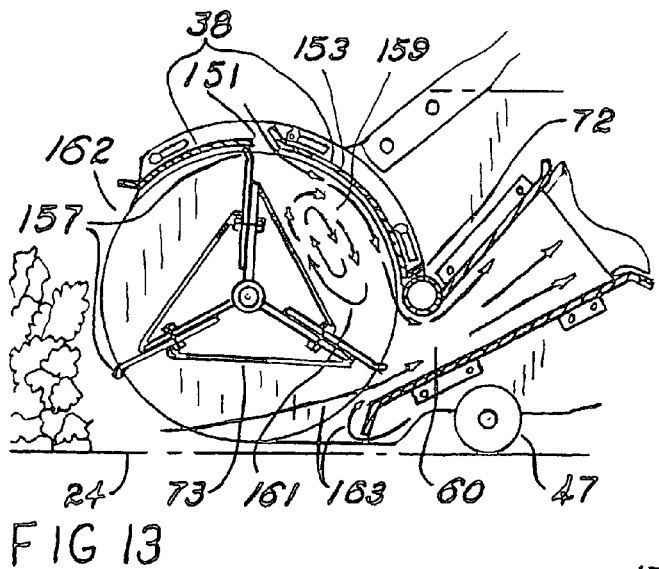
FIG. 13 is a cross-section view similar to a portion of FIG. 2, but showing a forward location of a stripping slot which admits air to strip leaves from the rotor.

FIG. 13 illustrates stripping slot 72 in a closed position and forward stripping slot 151 in upper housing 38 being located in a preferred forward position. The advantage of forward placement of stripping slot 151 is that air bleed into collection duct 60 occurs for only a fraction of the rotor revolution, instead of being almost continuous as with open rear stripping slot 72. Rear upper housing segment 153 spans the equivalent of about two thirds of the arc distance between adjacent rotor tips 157. Rotor blade tips 157 move in individual proximity with rear upper housing segment 153 for about two thirds of the revolution cycle, and air bleeds through forward stripping slot 151 for only about one third of the cycle. It appears that more of the air admitted to collection duct 60 comes from flows 163 along surface 24 and less from stripping slot 151, resulting in believed greater efficiency in collecting debris from surface 24. It also appears that air flow through forward stripping slot 151, through rotor cavity 159, and into collection duct 60 has more action in stripping leaves from rotor cavity 159 than would air flowing through rear stripping slot 72 and into cavity 159. However, even with airflow through forward stripping slot 151, rotational secondary flows were detected as generally indicated at 161. These secondary flows appeared to enable leaves to stay in rotor cavities 159 and carry over to open front 162 of the housing, where they were re-deposited on surface 24.

Figure 14:
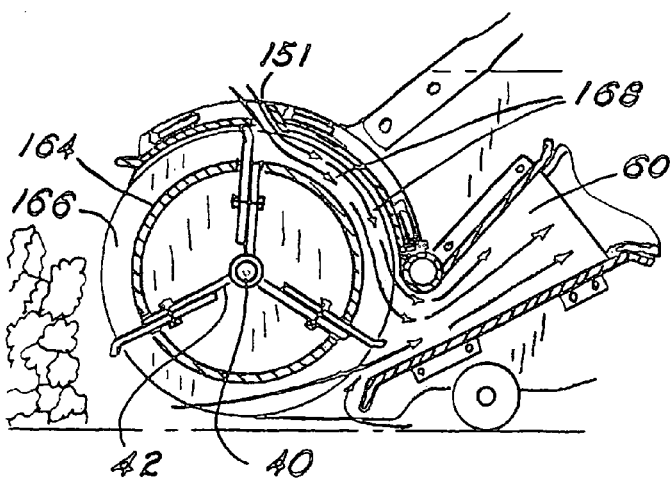
FIG. 14 is a cross-section view of a variation of the collector rotor shown in FIG. 13 in which flat fillets have been replaced with convex fillets.

FIG. 14 illustrates convex fillets 164 being used instead of flat fillets 73 shown in FIG. 2. Convex fillets 164 define thinner rotor cavities 166 that are generally concentric with rotor shaft 40 and which exhibit greatly reduced or no detectable macro-scale eddy flows upon airflow through forward stripping slot 151. One could use fillets having generally concentric, generally convex surfaces having a number of small flat, dimpled, or other shaped surfaces, and still achieve a generally convex cavity space. The shape and dimensions of said convex fillets should be chosen such that any substantial, detectable local flows generally indicated at 168 move rearward from forward stripping slot 151 to collection duct 60. Forward carryover and re-deposition of leaves were greatly reduced with use of convex fillets 164.

Figure 15:
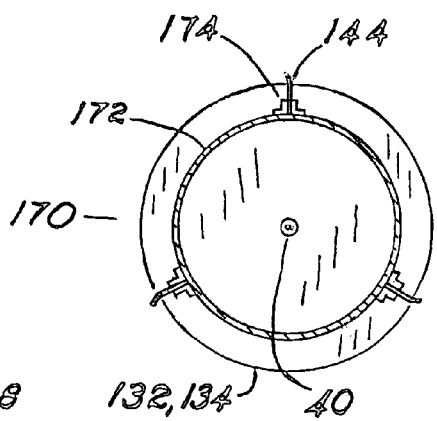
FIG. 15 is a cross-section view of a variation of the collector rotor shown FIG. 14 showing an alternative design for fabricating the collector rotor with convex fillet shapes.

An alternative construction of rotor 170 is illustrated in FIG. 15. One skilled in the art will recognize that as an alternative to constructing rotor 128 with blades 42 as in FIG. 10, and convex fillets 164 as in FIG. 14, one could employ a tubular member 172 concentric with rotor shaft 40 and having means 174 for attaching rotor blade tips 44 (FIG. 10) or raking tips 144 (FIG. 12).

Figure 16:
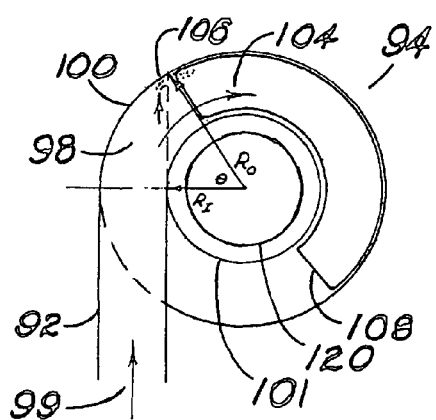
FIG. 16 is a schematic top-view diagram of the primary-separation duct showing mathematical notations for calculating minimal arc of curvature for effective separation of air and lawn debris.

FIG. 16 is a schematic top-view diagram of separator 94 shown in FIGS. 8 and 9. Primary-separation duct 98 has a radius RO of its curvilinear outer surface 100, a radius RI of its curvilinear inner surface 101, and a minimum arc of curvature Θ for effective separation of debris-laden air generally indicated at 99 into a solids-enriched outer layer generally indicated at 106 and a solids-depleted inner layer generally indicated at 104. Both layers pass through transfer opening 108 into secondary separator chamber 102 in FIG. 9, and then solids-depleted inner air layer passes upward through exhaust passage 120 in FIG. 16. Minimum arc of curvature for effective separation Θ is related to the radii of curvature by the expressions:

cosine Θ=RI/RO; and

Θ=arc cosine RI/RO.

Figure 17:
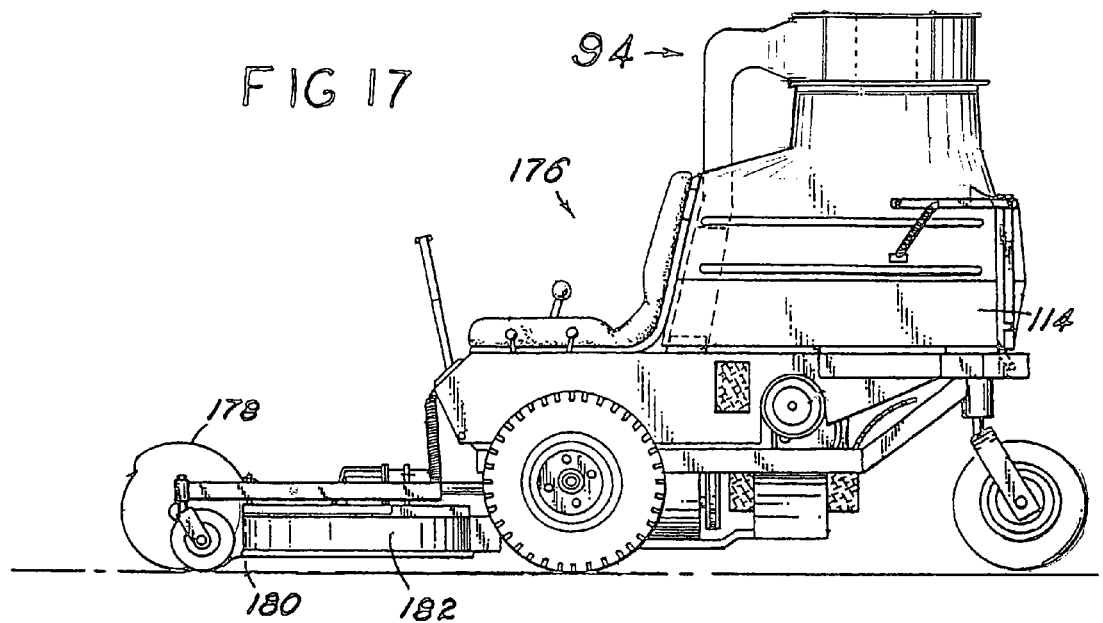
FIG. 17 is a side view of a riding lawnmower having a collector assembly and a separator of this invention.

FIG. 17 illustrates riding lawnmower 176 having collector assembly 178 mounted at advancing entrance 180 of mower deck 182. Leaf fragments and grass clippings are separated from entraining air by separator 94 and retained in hopper 114.

Figure 18:
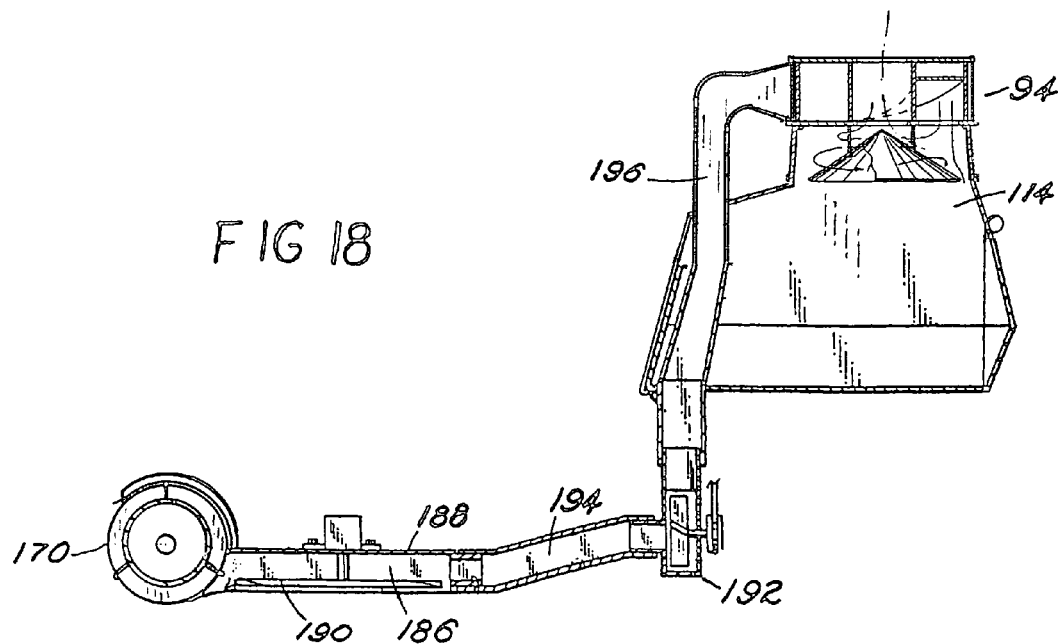
FIG. 18 is a cross-section view of selected portions of the riding lawnmower shown in FIG. 17.

FIG. 18 depicts a cross section view of selected portions of riding lawnmower 176 shown in FIG. 17. Leaves and other debris are impelled by collector rotor 170 into mowing chamber 186 within the mowing enclosure 188, where they are reduced by mower blades 190. Fan 192 induces airflow under collector rotor 170, through mowing chamber 186, first air duct 194, and second air duct 196, and into separator 94, entraining leaf fragments, grass clippings, and other debris into hopper 114.

Figure 19:
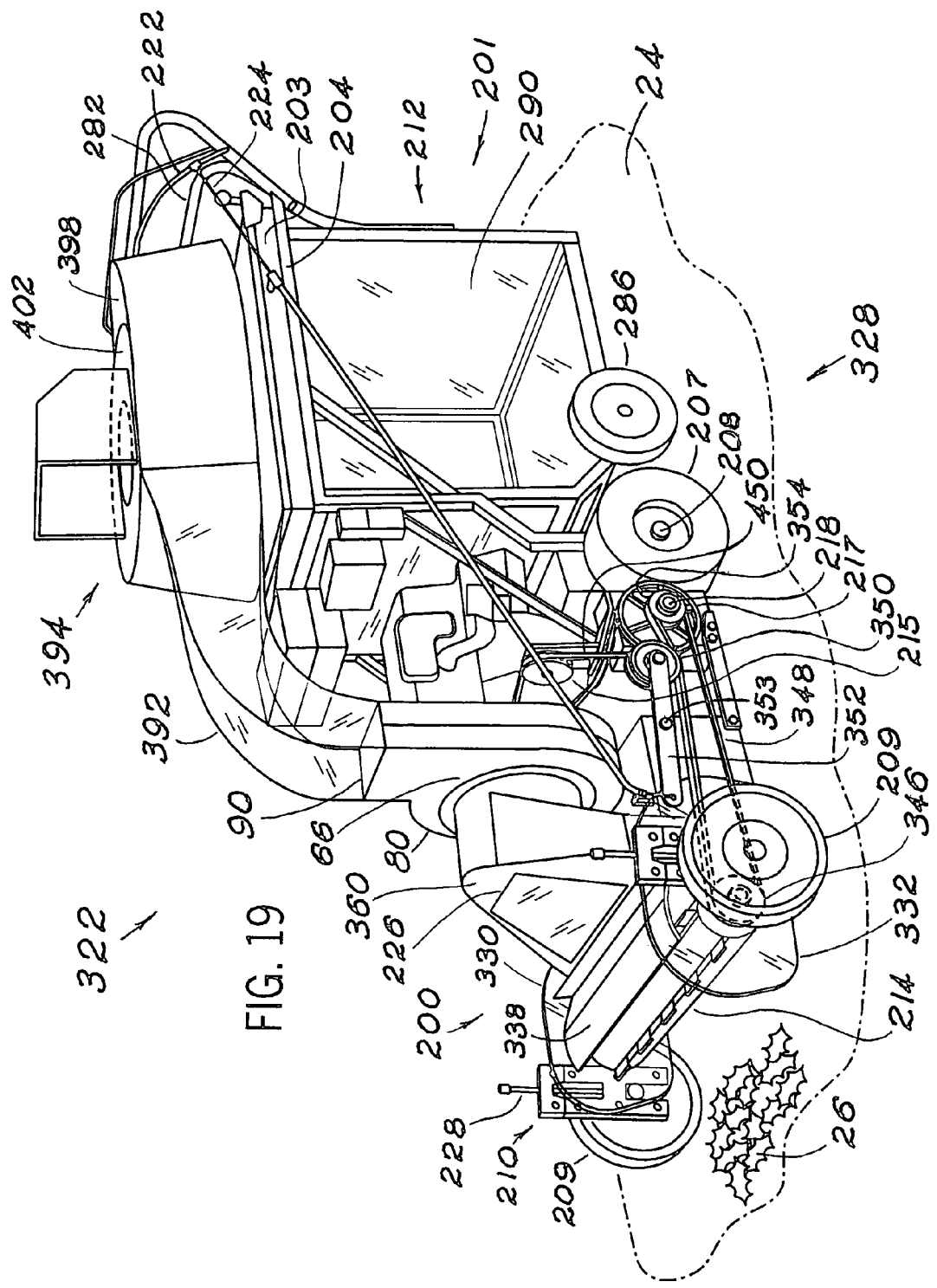
FIG. 19 is a perspective view, partially in phantom, of an improved apparatus made in accordance with the present invention showing certain principal features of the apparatus.
Figure 20:
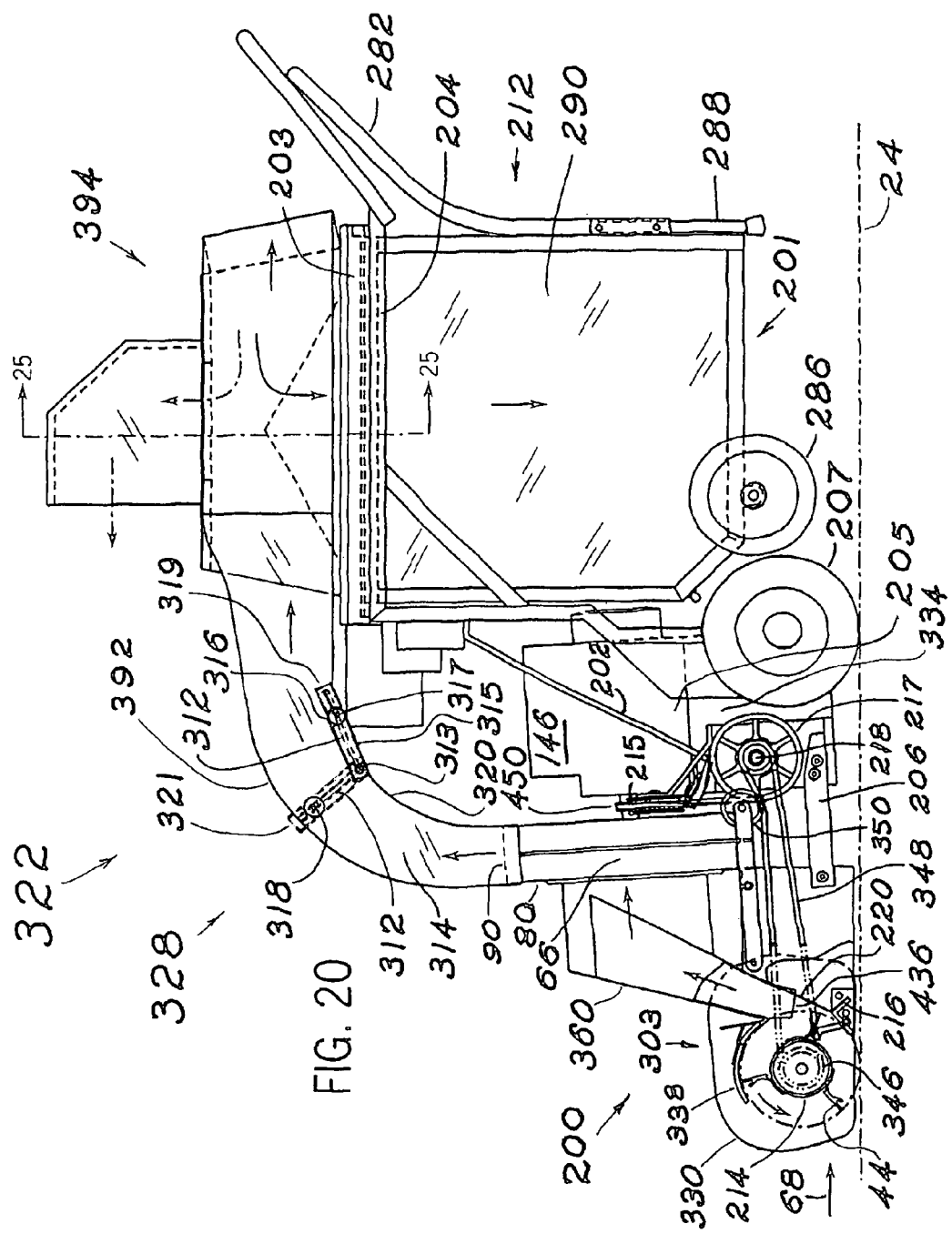
FIG. 20 is a side view of the apparatus of FIG. 19 with a portion of the apparatus broken away and shown in cross-section view, additionally illustrating an optional adjustable duct-closure device.

In FIGS. 19 and 20, compact collector 322 rests on surface 24 bearing deep yard debris 26 comprising primarily leaves, twigs, clippings, and other materials such as usually accumulate on lawns, sidewalks, and patios in the vicinity of trees in the neighborhood. Reference numbers for this embodiment are derived by adding 300 to the comparable reference numbers in FIGS. 1, 2, and 3. Compact frame assembly 328 of compact collector 322 comprises collector frame assembly 200 and motor accumulator frame assembly 201. Collector frame assembly 200 includes compact right side support plate 330, compact left side support plate 332 as well as compact upper housing 338 and compact collector duct 360 spanning the space therebetween. Motor accumulator frame assembly 201 comprises engine base 334, upper reinforcing braces 202, accumulator-support frame 203 and handle frame structure 204. Collector frame assembly 200 is connected to motor accumulator frame assembly 201 via compact collector duct 360 which is also connected to chipper-shredder enclosure 80 borne by engine casting 205 resting on engine base 334 bearing handle frame structure 204. Lower reinforcing braces 206 connect compact left and right side support plates 330 and 332 to engine base 334 while upper reinforcing braces 202 join handle frame structure 204 to engine base 334. Power from engine 146 is transmitted to drive wheels 207 by drive axle 208 borne on engine base 334 by bearings, not shown, and operably connected to the transmission (not shown) in engine base 334. Adjustable-height wheels 209 are adjustably supported on compact left and right side support plates 330 and 332 by height-adjusting mechanisms 210; so that the spacing of flexible rotor blade tips 44 above surface 24 can be adjusted to accommodate varying heights of lawn and thatch above surface 24. Accumulator 212, borne on accumulator-support frame 203, and reduced-height separator 394 are operatively connected to chipper-shredder enclosure 80 as in previous embodiments.

The embodiment shown in FIGS. 19, 20, 21, 22 and 31 comprises twig-breaking-rotor assembly 214, twig-breaker bar 216, seal plate 220 and compact upper housing 338 disposed between compact right side support plate 330 and compact left side support plate 332. Compact collector duct 360 fastened to compact side support plates 330 and 332 may sealingly engage compact upper housing 338. Compact right and left side support plates 330 and 332 are joined to each other by the ends of compact upper housing 338, compact collector duct 360, and twig-breaker bar 216. Right and left compact side support plates 330 and 332, seal plate 220, and compact upper housing 338 constitute compact collector housing 303.

Chipper-shredder exhaust port 90 of chipper-shredder unit 66 is connected to compact transfer duct 392 leading to primary-separation duct 398, and thence to secondary-separation chamber 402 emptying into accumulator 212. Engine drive belt 450 passes around a pulley (not shown) on the engine camshaft (not shown), adjustable idler pulley 215, and around countershaft-input pulley 217 mounted on countershaft 218. Rotor drive belt 348 passes around countershaft drive pulley 354 mounted on countershaft 218, around rotor pulley 346, and under rotor-actuator idler pulley 350. Pulling rotor-actuator handle 222 tightens rotor-actuator cable 224, which pivots lever arm 352 about fulcrum 353, pressing rotor-actuator idler pulley 350 onto rotor drive belt 348 and thereby tightening rotor drive belt 348. Inspection cover 226 closes an opening (not shown) in the front of compact collector duct 360 which can be used for clearing clogs if encountered. Adjustable-height wheels 209 (also illustrated in FIGS. 32 and 33) are supported on sliding support blocks 211 connected to threaded adjustment rods 228 which pass through threaded frame blocks 213. Adjustable-height wheels 209 can be moved up and down by turning threaded adjustment rods 228, thereby adjusting the height of twig-breaking-rotor assembly 214 above surface 24. A shredding rotor (not shown but similar to that illustrated in FIGS. 5-7) inside chipper-shredder enclosure 80 is mounted on the drive shaft (not shown) of engine 146.

Figure 21:
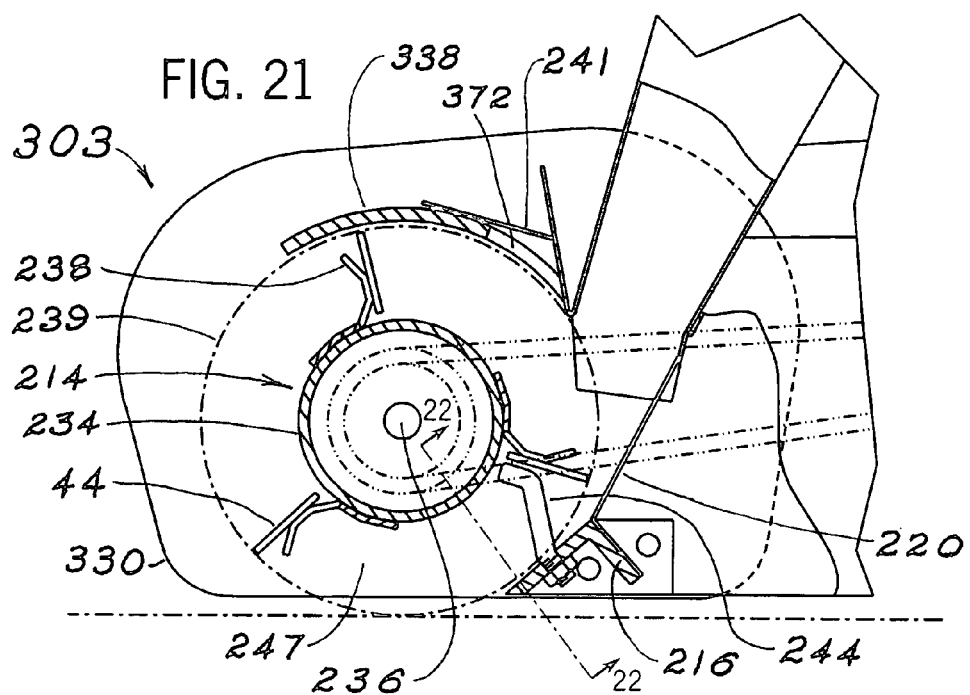
FIG. 21 is a cross-section view of the collector module on the front of the apparatus of FIG. 19.
Figure 22:
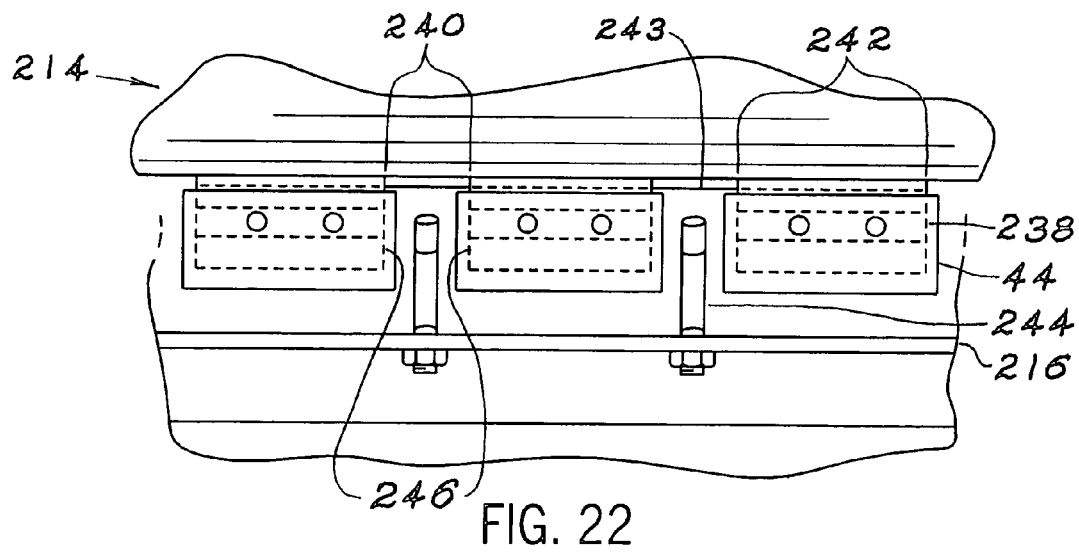
FIG. 22 is a cross-section view along the lines of 22-22 in FIG. 21 showing a close-up view of the twig-breaker components and the interaction of the twig-breaker sweeps with the twig-arrestor elements.

FIGS. 21 and 22 present more-detailed views of twig-breaking-rotor assembly 214, and twig-breaker bar 216. Twig-breaker-rotor body 234 may be formed from any sufficiently rigid structure such as a length of pipe fastened or welded to twig-breaker-rotor shaft 236 and revolving therewith. Fastened to the surface of twig-breaker-rotor body 234 are twig-breaker sweeps 238 fabricated from any suitably rigid material such as heavy-gauge sheet metal having crenels 240 formed therein. Preferably crenels 240 will be about 1½" wide and 1⅜" deep on 5-inch centers, leaving merlons 242 about 3½-inch in length between crenels 240. Crenels may be defined either by a combination of long and short (measured in the radial direction) impellers/sweeps or by absence and presence of impellers/sweeps, with short or absent impellers/sweeps corresponding to crenels. To modify the performance of the twig-breaking-rotor assembly 214 for the variety of conditions that may be encountered, twig-breaker sweeps 238 may be fitted with either flexible rotor blade tips 44 or optional raking tips 144 as illustrated in FIG. 12. Raking tips 144 are well adapted for raking a lawn and for removing thatch from a lawn. Raking tips 144 may be made from a stiff but yieldable sheet material, such as for example, polycarbonate or other plastic sheet material about 1/16" thick, or from spring-steel sheet material about 3/64" thick. Flexible rotor blade tips 44, such as might be made from multi-layer rubberized fabric material about 0.2" thick (as used for conveyor belts), are gentler in treatment of the surface from which debris is to be removed. Stripping slot 372 may be provided in compact upper housing 338 as a means of admitting counter-current inflow of air. It has been found that airflow countercurrent to the direction of rotation of twig-breaking-rotor assembly 214 may reduce the amount of debris carried around the axis of twig-breaking-rotor assembly 214 and propelled forwardly of compact collector 322 by either flexible rotor blade tips 44 or raking tips 144. Variable flow-adjusting plate 241, movable forward and rearward, may be provided as a means of regulating the amount of air inflow. Variable flow-adjusting plate 241, shown in rearward closed position in FIG. 21, may be moved frontward to admit counter-current inflow of air.

Rotor-occluded volume (ROV) 239 is defined as a cylinder swept amongst the twig-breaker sweeps 238 (impellers) having a length generally equal to the axial length of twig-breaker-rotor body 234. Twig-breaker bar 216, formed from a length of metal angle or other sufficiently rigid material, is attached at one end to compact right side support plate 330 and at the other to compact left side support plate 332. Twig-arrestor elements 244 made from rigid material such as threaded rod or cut-off bolts are fastened to twig-breaker bar 216 and are aligned with and protrude into crenels 240 of rotatably moving twig-breaker sweeps 238, twig-arrestor elements 244 preferably being of sufficient length that the bottoms 243 of crenels 240 pass in close proximity to the tips of twig-arrestor elements 244. In operation therefore, as twig-breaking-rotor assembly 214 turns, twigs carried by merlons 242 defined by twig-breaker sweeps 238 on twig-breaker-rotor body 234 encounter twig-arrestor elements 244 and are broken or sheared by combined action of merlons 242 and twig-arrestor elements 244. Accordingly, it can be appreciated that by virtue of twig-arrestor elements 244 protruding into ROV 239, twigs carried by twig-breaker sweeps 238 will engage twig-arrestor elements 244 and be urged against twig-arrestor elements 244 and be comminuted into twig fragments as result of breaking action created between any relevant twig-arrestor elements 244 and two circumjacent crenel edges 246. Multiple twig-breaker sweeps 238 present on twig-breaker-rotor body 234 define crenel furrows 245 in FIG. 34 consisting of circumferentially aligned (as hereinafter defined) sequential crenels 240 disposed around turning twig-breaker-rotor body 234 and coinciding with twig-arrestor elements 244. Alternatively, at least one crenel edge 246 passes at least one twig-arrestor element 244 in shearing proximity, causing a shearing break of the twigs borne by twig-breaker sweep 238. Twig-breaker sweeps 238 are preferably sized to engage twigs found in deep yard debris 26 to be collected, bring them into rotor cavity 247, carry them about the axis of twig-breaking-rotor assembly 214, and present them to twig-arrestor elements 244, causing the twigs to be fractured as twig-breaker sweeps 238 rotate past twig-arrestor elements 244, leaving twig fragments which are suitably sized to pass through compact collector duct 360 to chipper-shredder enclosure 80 without clogging. If constructed of the preferred materials and powered by a 10 HP engine, compact collector 322 is capable of collecting and shredding not only leaves and twigs, but also other lawn debris such as pine needles, pinecones, sweet gum balls, hickory nuts, acorns, nutshells, and even aluminum beverage cans. While the invention is herein illustrated with generally axially aligned twig-breaker sweeps 238; other-shaped rigid twig-breaker impeller elements such as rods, studs, blocks, plates and other forms may be fastened to the surface of twig-breaker-rotor body 234, and other spacings and arrangements of impeller elements such as spirals, "V" shapes, etc. can be used as well, so long as a crenel furrow 245 is "circumferentially aligned" so that crenels 240 span a plane perpendicular to the axis of rotation of twig-breaking-rotor assembly 214 coinciding with each twig-arrestor element 244. Similarly, while a hook-like shape is herein illustrated for each twig-arrestor element 244 protruding into ROV 239 and circumferentially aligned crenel furrows 245, other twig-breaker arrestor shapes such as studs, rods, plates and blocks are also suitable.

For one embodiment of compact collector 322 illustrated in FIGS. 19 and 20 suitable for residential and light commercial applications, the width between compact side support plates 330 and 332 can be about 26 inches, with an airflow rate through the machine of about 865 CFM and twig-breaking-rotor assembly 214 turning at about 400 rpm, which with a 4-inch-radius rotor, achieves an impeller tip velocity of about 9.5 mph. As twig-breaking-rotor assembly 214 approaches layer or pile of leaves 26, impeller velocities of this order are quite effective in agitating the leaves, dispersing them in incoming flows of air generally indicated at 68, and impelling them toward compact collector-duct entrance 436.

Figure 23:
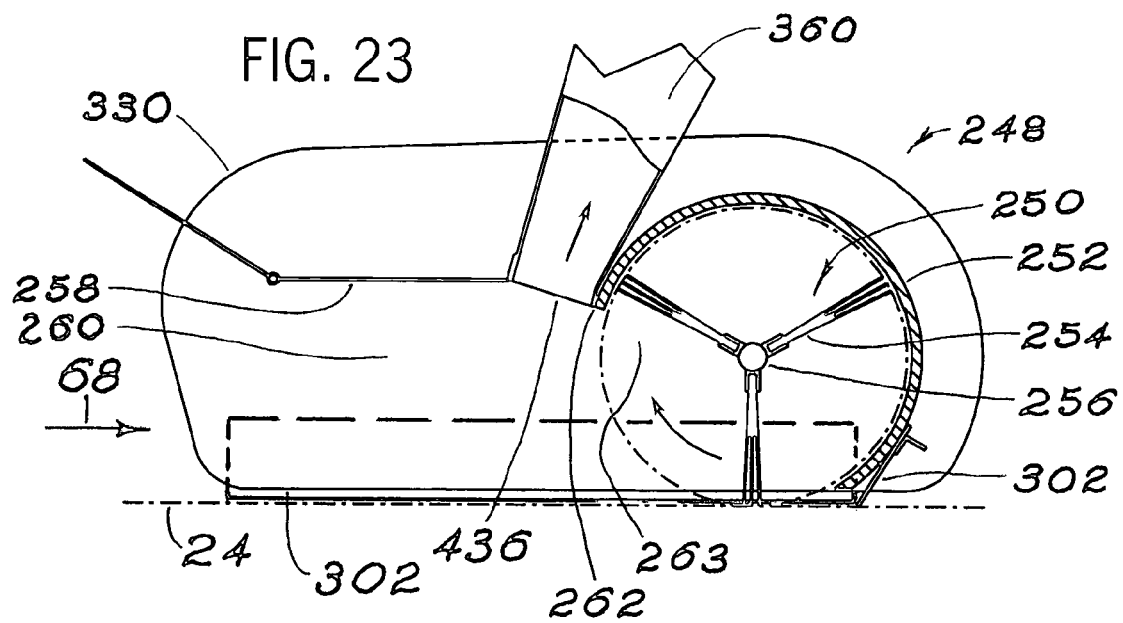
FIG. 23 illustrates an alternative embodiment of the collector module in which a rotary brush is mounted rearward of the collector duct.

FIG. 23 illustrates an embodiment having a compact brush collector 248. Rotary brush 250 is mounted rearwardly of compact collector-duct entrance 436 and is partially encompassed by brush housing 252. Strip brushes 254 attached to brush shaft 256 rotate under power from belt and pulley means not shown. Compact right and left side support plates 330, 332 and cavity roof 258 bound frontally open cavity 260 forward of rotary brush 250. Cavity roof 258 constrains the flow path of incoming air, resulting in flows of air generally indicated at 68 generally parallel to surface 24. Divider vane 262, formed at the junction of brush housing 252 and trailing surface of compact collector duct 360, separates brush cavity 263 from the airflow space in compact collector duct 360. In operation, as compact brush collector 248 moves forward with compact collector 322, debris 26 from surface 24 is swept toward compact collector-duct entrance 436 by clockwise rotating rotary brush 250.

Figure 24:
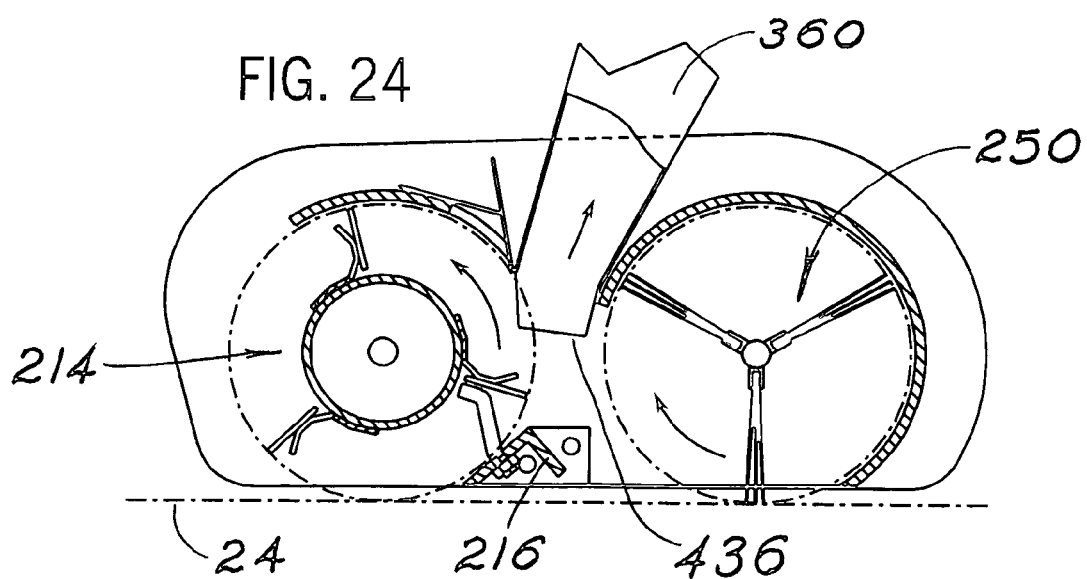
FIG. 24 illustrates still another embodiment of the collector module with a twig-breaking-rotor assembly forward of the collector duct, and a rotary brush rearward of the collector duct.

FIG. 24 illustrates an augmented embodiment of the invention pictured in FIG. 23, in which twig-breaking-rotor assembly 214 comparable to one in FIGS. 21 and 22 is mounted forward of compact collector-duct entrance 436, and twig-breaker bar 216 is mounted rearward of twig-breaking-rotor assembly 214. As twig-breaking-rotor assembly 214 turns counterclockwise and rotary brush 250 turns clockwise, both rotors sweep debris toward compact collector-duct entrance 436. Twig-breaking-rotor assembly 214 reduces twigs that would tend to cause clogging of compact collector duct 360, and rotary brush 250 sweeps residual debris from surface 24.

Figure 25:
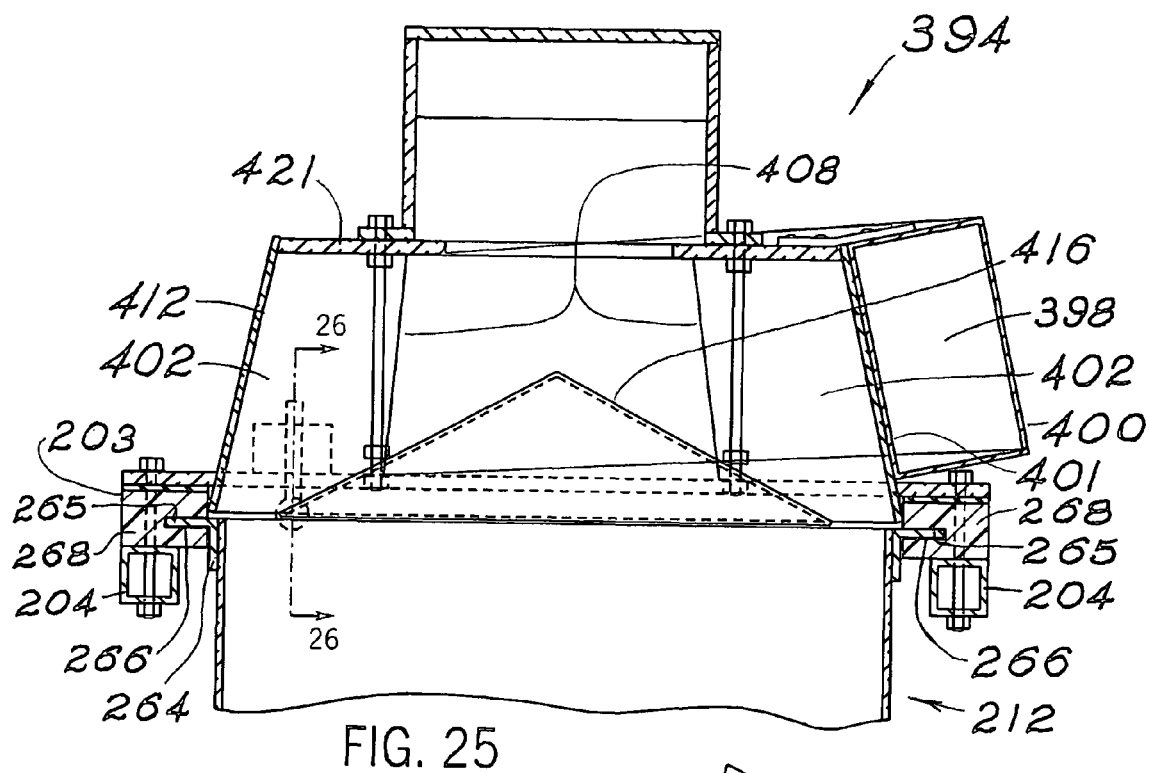
FIG. 25 is a cross-sectional view along the lines of 25-25 in FIG. 20 showing the primary-separation duct, the secondary-separation chamber, the baffle, and the receiver grooves supporting the accumulator.

FIG. 25 illustrates a reduced-height separator 394. Reference numbers for this embodiment are derived by adding 300 to the related reference numbers in FIGS. 8 and 9. Primary-separation duct 398, comparable in function to primary separation duct 98 which was disposed above secondary separation chamber 102 in the embodiment shown in FIG. 9, is reconfigured to partially encompass secondary-separation chamber 402 horizontally, rather than being displaced vertically above it. In the reduced-height embodiment, entrained debris flowing from primary-separation duct 398 enters secondary-separation chamber 402 through transfer opening 408 in chamber perimetral wall 412, instead of through upper bulkhead or roof 421 as in FIGS. 1, 2, 8, and 9. As shown in FIG. 39, outer duct perimetral wall 400 of primary-separation duct 398 approaches chamber perimetral wall 412 of secondary-separation chamber 402 at an acute angle, and preferably is tangent to chamber perimetraf wall 412 at the line of contact. Likewise, inner duct wall 401 of primary-separation duct 398 also approaches chamber perimetral wall 412 at an acute angle, and preferably is tangent to chamber perimetral wall 412 at the line of contact. This reconfiguration into a generally horizontal configuration of primary-separation duct 398 at generally the same level as secondary-separation chamber 402 reduces the height of separator 394 and permits the operator improved forward view to the front of the apparatus.

Advantageously, outer duct perimetral wall 400 of primary-separation duct 398 of reduced-height separator 394, as well as chamber perimetral wall 412 of secondary-separation chamber 402, are both inclined inwardly and upwardly about 12° from the vertical. These inclined walls exert downward force on the air-stream entraining the lawn-debris solids, directing the stream of solids-enriched air to flow toward accumulator 212 below baffle 416. In operation, when constructed in accordance with the parameters preferred herein, after the incoming stream of solids has traveled about 360° around the perimeter of secondary-separation chamber 402, the solids-enriched stream has generally passed below the edge of baffle 416.

With primary-separation duct 398 partially encompassing secondary-separation chamber 402 generally horizontally and having inclined perimetral walls, reduced-height separator 394 achieves very good separation of lawn debris from the air stream. Furthermore, the inclined-sidewall construction of secondary-separation chamber 402 facilitates manufacture of said chamber, as a thermoformed or molded piece with tapered sidewalls releases readily from a mold.

Figure 26:
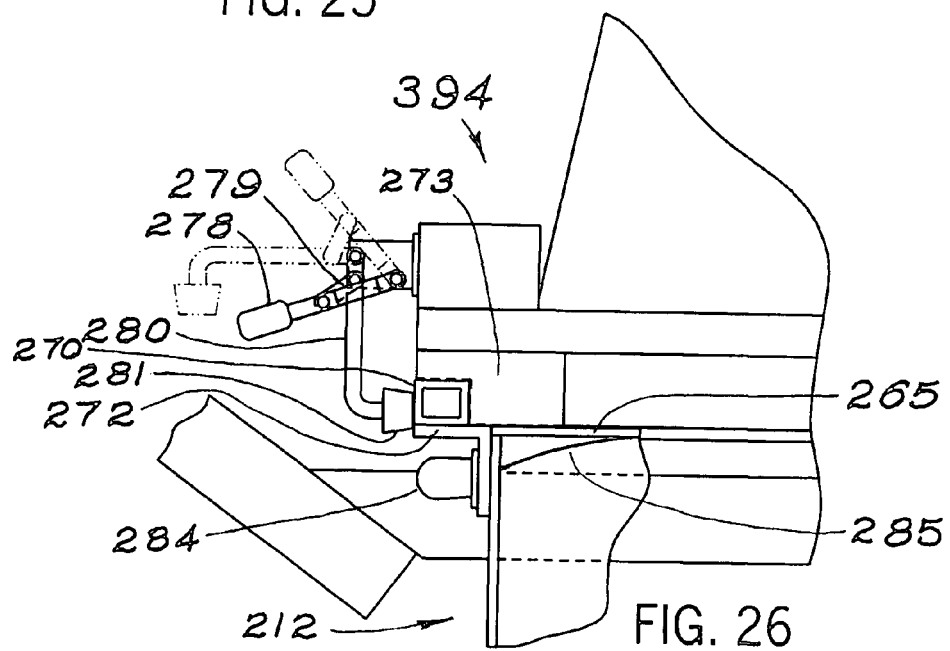
FIG. 26 is a cross-section view along the lines of 26-26 in FIG. 25, showing the hold-down clamp which holds the accumulator in place during operation of the apparatus.
Figure 27:
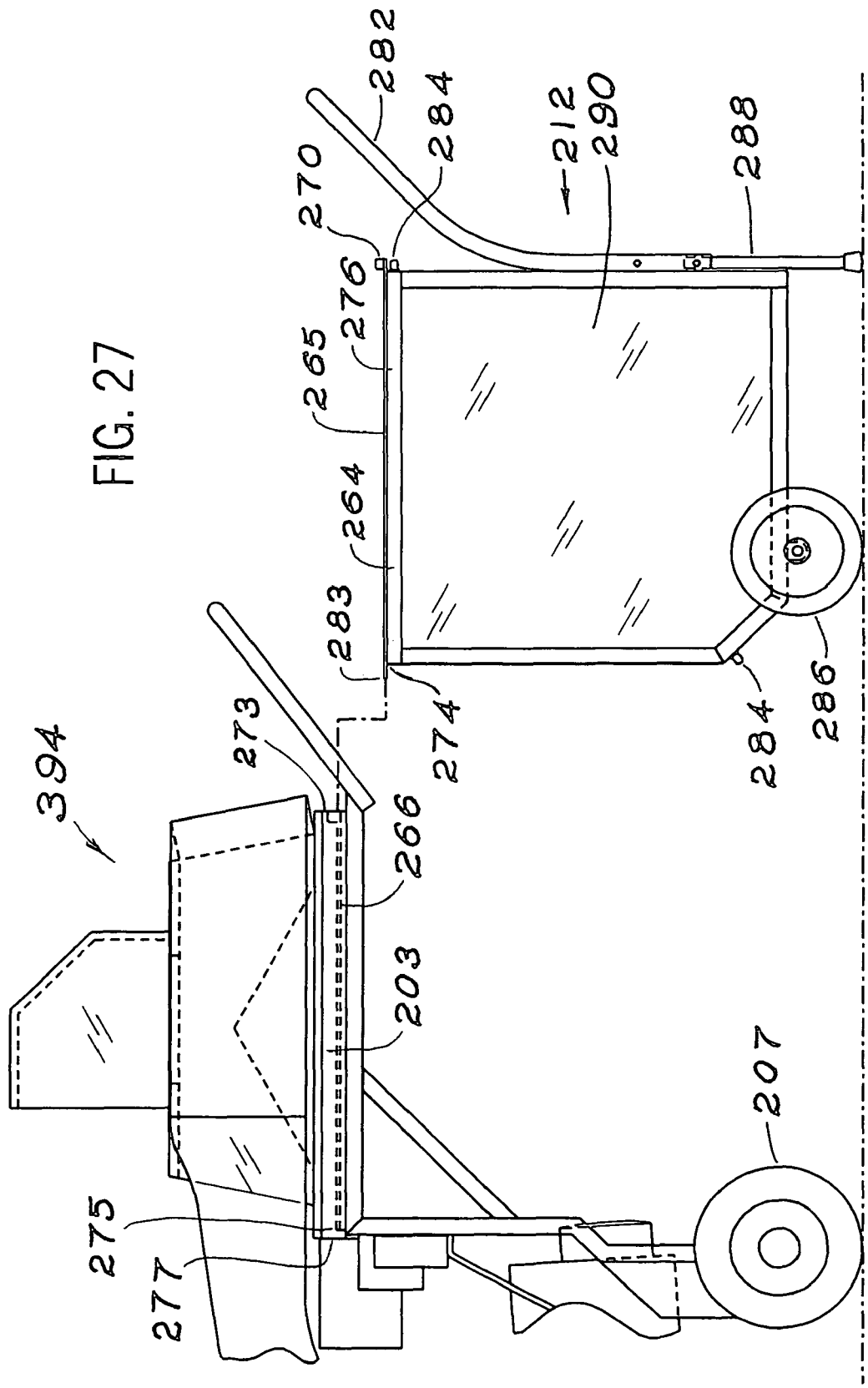
FIG. 27 is a side view of an improved accumulator with attached wheels and an accumulator-maneuvering handle, and a sliding tongue-and groove mount for supporting the accumulator.

In operation, even though the chipper shredder provides a significant reduction in volume of the yard waste collected, the volume of yard waste collected is generally so large that frequent trips to a collection point will be required, such as for example to street side for municipal collection or to a compost heap. The effort involved in removing the accumulator, transporting the contents of the accumulator to the collection point and reattaching the accumulator can be a significant part of the effort involved in the cleanup. FIGS. 25, 26 and 27 illustrate an improved mechanism for engagement of accumulator 212 with reduced-height separator 394, allowing accumulator 212 to be easily removed from and easily replaced on reduced-height separator 394 when dumping the contents. Surrounding the top of accumulator 212 is a rectilinear perimetral frame constructed of four rigid angles 264, which may be integrally molded in the plastic with accumulator 212 or may be a separate fitting made of metal such as aluminum or steel. Horizontal portions (tongue rails) 265 of these rigid angles 264 slip into flared receiver grooves 266 in accumulator-support side bars 268, thus forming a slidable tongue-and-groove arrangement. Horizontal portions 265 thereby define "tongue rails." Accumulator-support side bars 268 may be supported by handle frame structure 204 or may be fastened to the underside of reduced-height separator 394 or may be formed integrally therewith, wherein reduced-height separator 394 may be supported by handle frame structure 204. Accumulator-support side bars 268 may be made from any sufficiently rigid material, preferably a material with low-to-moderate coefficient of friction permitting low-effort sliding of tongue rails 265 in flared receiver grooves 266. To connect accumulator 212 to reduced-height separator 394 for operation, leading edges 283 of tongue rails 265 are aligned with flared receiver grooves 266 on each side of accumulator-support frame 203, and as accumulator 212 is pushed forward, tongue rails 265 slide into flared receiver grooves 266 directing accumulator 212 into position. Concurrently, seal bar 270 fastened to the top of rear frame angle 272 moves forward until it engages accumulator-support rear bar 273. Similarly as shown in FIG. 27, upon closure leading edge 283 of front angle 274 presses against front groove 275 in accumulator-support front bar 277. Thus, accumulator top frame 276 is in close contact with accumulator support bars 268, 273, 277 around its full perimeter, effectively sealing accumulator 212 with reduced-height separator 394 and reducing air and dust leakage from accumulator 212, which in operation may sustain an operating pressure of about 3 to 5 inches of water. Clamp handle 278 is pivotably mounted on reduced-height separator 394 and is pivotably joined to one end of pivotably mounted linking bar 279 intermediate its length. The other end of linking bar 279 is pivotably joined to "L"-shaped presser bar 280 bearing clamp foot 281 at one end, the other end of "L"-shaped presser bar 280 being pivotably joined to reduced-height separator 394. As accumulator 212 comes into close proximity with its operating position under reduced-height separator 394, to urge it into its final sealing position, clamp handle 278 is rotated counter-clockwise forcing linking bar 279 to move downwardly while rotating counterclockwise causing "L"-shaped presser bar 280 to pivot counter-clockwise and thereby pressing clamp foot 281 against seal bar 270 urging accumulator 212 into position. Since this linkage can have considerable mechanical advantage, positioning of accumulator 212 is greatly facilitated, and accumulator 212 is retained securely during operation.

Similarly during operation, accumulator 212 can be quickly removed for dumping. With one motion, the operator opens clamp handle 278, reversing the actions above and releasing accumulator 212. With a second motion, the operator may pull accumulator-maneuvering handle 282 rearward, sliding tongue rails 265 out of flared receiver grooves 266. To facilitate dumping of accumulator 212, auxiliary handles 284 may be fitted generally opposed to each other as illustrated in FIG. 27, one on the rear of accumulator 212, the other on the front. Alternatively, auxiliary handles 284 may be fitted on the sides or bottom of accumulator 212. Accordingly, dumping accumulator 212 is simple, as the operator simply turns accumulator 212 upside down and lifts it away from the accumulated debris contained therein using auxiliary handles 284. As mentioned, replacing accumulator 212 on reduced-height separator 394 is also simple and quickly accomplished, greatly easing the entire process of removing, emptying and replacing accumulator 212 as compared to the cumbersome and time-consuming procedures required with bags and zippers utilized on current commercially available machines, and while greatly alleviating the amount of dust dispersed during the dumping process.

To further ease the process of replacing the accumulator, flared receiver grooves 266 may have downwardly flaring mouths 285 at their rearwardmost extension, as illustrated in FIG. 26, to facilitate entry of the leading edges 283 of rigid angles 264 into flared receiver grooves 266 to enable the operator to simply push the empty accumulator 212 forward and into place under reduced-height separator 394. Ideally the extent of the downward flare 285 will make it possible for the operator to urge accumulator 212 home without lifting as in FIG. 35.

In still another embodiment as illustrated in FIG. 36, accumulator-support frame 203 comprised of accumulator-support side bars 268, accumulator support rear bar 273, and accumulator-support front bar 277, is pivotably mounted on reduced-height separator 394 at forwardly located hinges 267. Flared receiver grooves 266 are formed in accumulator-support frame 203 to receive tongue rails 265 on accumulator 212. Latch 269 is mounted on reduced-height separator 394 and, as illustrated in FIG. 36, is rotatable from a clockwise retaining position to a counterclockwise separation position in which accumulator-support frame 203 may be pivoted downward and tongue rail 265 on accumulator 212 may be slid rearwardly out of flared receiver groove 266 to allow transport of yard waste in accumulator 212 independently of the remainder of compact collector 322, as for example in transport to the curb. When latch 269 is rotated from the clockwise retaining position to the counterclockwise separation position, retaining ledge 271 formed on latch 269 is moved out of engagement with accumulator-support rear bar 273 and/or rear frame angle 272 of accumulator top frame 276, allowing accumulator-support frame 203 to pivot downwardly (clockwise) so that accumulator 212 may be removed as tongue rails 265 on accumulator 212 slide rearwardly out of flared receiver grooves 266. Accumulator wheels 286 move rearward and downward to surface 24 and support the weight of accumulator 212. After emptying, accumulator 212 is remounted by introducing leading edge 283 of tongue rails 265 into flared receiver grooves 266, sliding accumulator 212 frontward, and pivoting accumulator-support frame 203 upwardly (counterclockwise) so that retaining ledge 271 may be moved under the rearmost portion of accumulator-support frame 203 and/or rear frame angle 272 as latch 269 is rotated clockwise, thereby retaining accumulator 212 in position for continued operation.

On a machine sized for residential or light commercial usage, cylindrical hopper (114) illustrated in FIG. 9 might have a height of 22 inches and an average inside diameter of 22.6 inches with a capacity of about 38 gallons, requiring very frequent dumping. To reduce dumping frequency, higher capacity is desirable. However, gaining capacity by increasing the hopper height would diminish the operator's forward view. A marked increase in capacity can be obtained by making accumulator 212 in a generally polyhedral or hexahedral shape and by using only slightly larger dimensions as in FIGS. 19, 20 and 27. If polyhedral accumulator 212 is 24 inches wide, 24 inches front to back, and 24 inches high, with a 4.25×3.75×24-inch wedge eliminated from the lower front corner to achieve clearance for drive wheels 207, a capacity of about 59 gallons can be obtained. Thus, changing from the barrel shape of FIGS. 1 and 2 to the generally hexahedral (or technically, heptahedral) shape of FIGS. 19, 20, and 27 increased the capacity by about 55%, with little increase in the gross utilized volume. This gain in capacity was achieved without increasing either the width or length of compact collector 322. Largely because of the reduced height achieved with reconfigured primary-separation duct 398, operators perceived the overall machine as being significantly smaller and more compact than the earlier embodiment.

In operation, the importance of increased accumulator volume becomes readily apparent. If sized as suggested, polyhedral accumulator 212 may hold about 20 pounds of shredded leaves per batch. For an 8,000-square-foot yard receiving about 1000 pounds of leaves per year, about 78 trips to the curb would be required with barrel-shaped hopper 114, but only about 50 with polyhedral accumulator 212.

To further facilitate transport to the curb or other collection point, accumulator wheels 286 and accumulator-maneuvering handle 282 may be provided on accumulator 212, as illustrated in FIG. 27. Adjustable legs 288 may be added to the end of accumulator 212 opposite accumulator wheels 286 for instances when the operator might want to use accumulator 212 for other transporting purposes. Addition of accumulator wheels 286 and accumulator-maneuvering handle 282 to accumulator 212 greatly eases dumping of the contents. The operator simply separates accumulator 212 from compact collector 322 and rolls it to the dumping area, and then rolls empty accumulator 212 back to compact collector 322.

Damper 312 may be provided in compact transfer duct 392 as illustrated in FIG. 20 to facilitate removing accumulator 212 from compact collector 322 without either stopping rotation of engine 146 on which chipper-shredder unit 66 is mounted, or causing debris to be blown from accumulator 212 by air currents coming from chipper-shredder unit 66 through reduced-height separator 394. Damper 312 is disposed within compact transfer duct 392 and is fastened to pivotable shaft 313 extending through opposing duct walls 314 of compact transfer duct 392. Exteriorly of compact transfer duct 392, one end of damper lever arm 315 is fastened to one end of pivotable shaft 313, while an axially spring-loaded latch pin 316 is mounted on opposing end of damper lever arm 315. Open-position detent 317 and closed-position detent 318 are provided in duct wall 314 of compact transfer duct 392 for engagement by spring-loaded latch pin 316 mounted on damper lever arm 315. In order to alleviate debris buildup on pivotable shaft 313 and damper 312 while damper 312 is pivoted clockwise in open position 319, pivotable shaft 313 may be rotatably supported preferably adjacent concave wall 320 of curvilinear compact transfer duct 392. Damper 312 is adapted to restrict airflow through compact transfer duct 392 upon pivoting damper lever arm 315 counterclockwise into closed position 321. Before removing accumulator 212 from compact collector 322 for dumping, engine 146 may be slowed to idle speed, spring-loaded latch pin 316 is pulled outward in order to release spring-loaded latch pin 316 from engagement with open-position detent 317, damper lever arm 315 is rotated counterclockwise to closed position 321, spring-loaded latch pin 316 is released and engages closed-position detent 318, securing damper 312 in closed position 321. Upon replacement of accumulator 212 on compact collector 322, the reverse steps are followed to rotate damper 312 clockwise to open position 319 in order to resume operating airflow. Use of the damper thus allows repetitive removal and replacement of accumulator 212 from/on compact collector 322 without stopping and restarting engine 146 each time. Alternatively, a sliding-gate closure device (not pictured but well-known for adjusting flow rates in air ducts) or other duct-closure device may be used for similar effect.

Advantageously, accumulator walls 290 may be made at least partially from a transparent substance such as polycarbonate; enabling the operator to see when accumulator 212 is getting full and will need to be dumped. Alternatively, one or more transparent panel(s) may be placed in otherwise translucent or opaque accumulator wall(s) 290, affording visible inspection of fill depth.

Compact collector 322 offers advantages over the earlier embodiment of FIGS. 1 and 2 in being smaller, simpler, and less costly to manufacture. Countershaft 218 and pulleys 354 and 217 provide an appropriate speed of about 400 rpm for twig-breaking-rotor assembly 214 without using an expensive reducing-angle drive. Compact collector duct 360 can be rugged enough to support the weight of twig-breaking-rotor assembly 214, greatly simplifying construction and reducing usage of metal, thereby alleviating the need for the cost and weight of a separate fabricated frame. A 4-inch-radius twig-breaking-rotor assembly 214 can be smaller, less visually obtrusive, lighter-weight, and easier to maneuver than the 7.5-inch-radius collector rotor 128 illustrated in FIG. 10, yet perform very well in collecting deep piles of leaves. Reduced-height separator 394 illustrated in FIG. 25 having primary-separation duct 398 partially encompassing secondary-separation chamber 402 horizontally along with inclined chamber perimetral wall 412, may be less costly to manufacture than the bi-level configuration illustrated in FIGS. 1 and 2.

Figure 28:
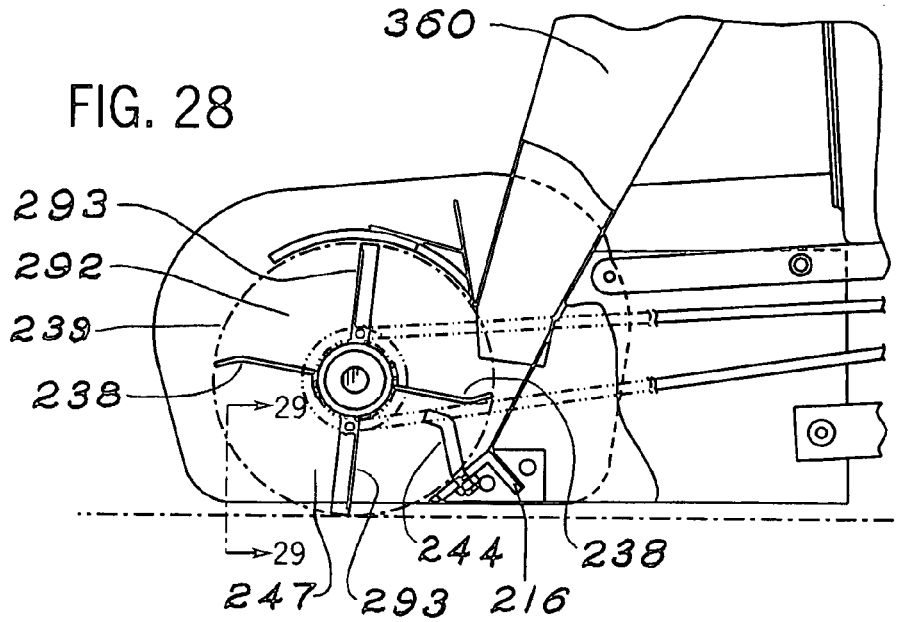
FIG. 28 illustrates yet another embodiment of the collector module in FIG. 19, with the module having a rotor with swinging flails which perform raking and de-thatching functions.
Figure 29:
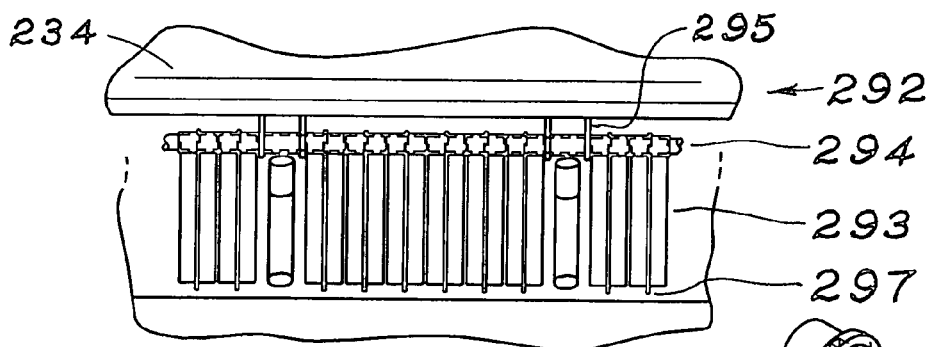
FIG. 29 is a cross-section view along the lines of 29-29 in FIG. 28, illustrating the mounting of the flails on the collector rotor.
Figure 30:
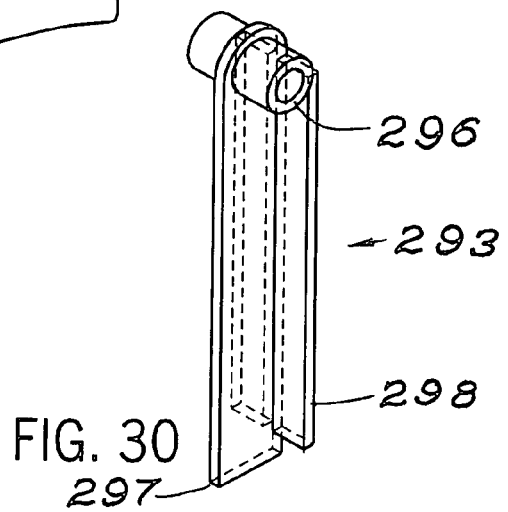
FIG. 30 is a perspective phantom view of a flail, illustrating the bushing and the "T" cross section of the flail.

Severe-service rotor 292 illustrated in FIGS. 28 and 29 is a modification of collector rotor 128 in the embodiment shown in FIGS. 1 and 2 and may be adapted for improved ruggedness in applications involving encounters with hard objects such as large stones, curbs and walks. Severe-service rotor 292 is constructed having the configuration shown, with pivotable flails 293 made from metal or other durable material and which may have "T" cross-sections as shown in FIG. 30. In FIG. 29, pivotable flails 293 are pivotably supported on flail-pivot shaft 294, which is mounted on twig-breaker-rotor body 234 by shaft-retaining brackets 295. Each individual pivotable flail 293 may comprise flail bushing 296 encompassing flail-pivot shaft 294 permitting free pivoting of flail 293 while reducing side-to-side movement of flail tips 297 that could permit flail backing plates 298 of adjacent pivotable flails 293 to interfere with each other. Flails without flail backing plates 298 can be used. However, it is preferred to use flails having flail backing plates 298 or other means to restrict free flow of air between adjacent flails, thereby directing air flow under severe-service rotor 292 to more effectively engage and entrain debris 26 encountered on surface 24. In operation, pivotable flails 293 operate as swing hammers and reduce airflow through rotor-occluded volume (ROV) generally indicated at 239 of the turning severe-service rotor 292, thereby providing thatch-removal action and enhancing the collection of debris.

In FIG. 28, severe-service rotor 292 is fitted with two sets of pivotable flails 293 and two sets of twig-breaker sweeps 238. Such a rotor is well adapted for raking debris and removing thatch when many twigs are present. Alternatively, for removal of thatch along with debris when few twigs are present, a severe service rotor can be made with only pivotable flails 293, omitting both twig-breaker sweeps 238 and also twig-breaker bar 216. Similarly, a machine whose primary purpose is dethatching, i.e., to lift, remove, and accumulate thatch, can optionally employ pivotable flails 293 to the exclusion of twig-breaker sweeps 238 and twig-breaker bar 216, or any convenient combination thereof may be employed, with a preponderance of flails being preferred. Alternatively, coil-connected dethatching/raking tines can be used as dethatching and/or raking members mounted on severe-service rotor 292. Examples of coil-connected dethatching/raking tines are illustrated in U.S. Pat. No. 3,564,823 (FIGS. 3-5 and 7-8), U.S. Pat. No. 3,545,187 (FIGS. 1-3), U.S. Pat. No. 3,512,345 (FIGS. 1-3), and U.S. Pat. No. 2,989,833 (FIGS. 6-7), and are incorporated herein by reference. A machine fitted with a severe-service rotor, a blower, a separator, and an accumulator provides greatly enhanced collection, separation and accumulation capabilities as compared to currently available dethatching machines without a blower assist.

In another embodiment, the function of twig-breaker sweeps 238 can be achieved with flails of sufficient mass such that the flails engage twigs found in deep yard debris 26, bring them into rotor cavity 247, carry them past the axis of severe-service rotor 292, and present them to twig-arrestor elements 244; as pivotable flails 293 pass twig-arrestor elements 244, the twigs are fractured and suitably sized to pass through compact collector duct 360 to chipper-shredder enclosure 80.

Figure 31:
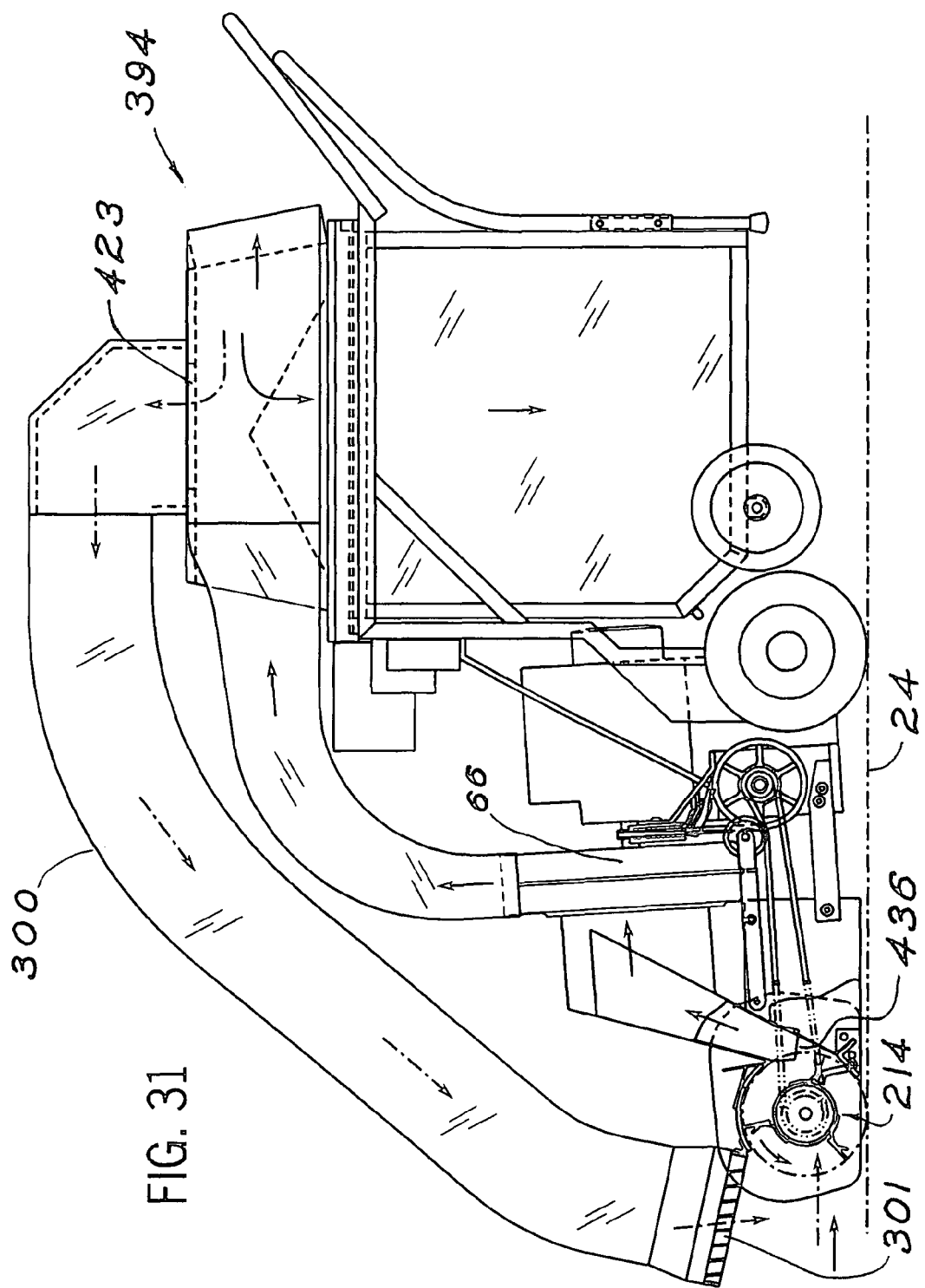
FIG. 31 is a side view of an embodiment of the machine, in which a duct transports the air discharged from the separator forward to the vicinity of the collector rotor.

In many communities, ordinances or other regulations have been enacted restricting use of so-called "leaf blowers," at least partially out of concern that these devices disperse large amounts of fine particulates into the atmosphere. To alleviate possible entrainment of microscopic particles, the embodiment of the machine of the present invention shown in FIG. 31 is fitted with air-recycle duct 300 having diffuser 301 fitted thereto for directing exhaust air discharged from separator exit 423 toward surface 24 forward of compact twig-breaking-rotor assembly 214, where the suction provided by chipper-shredder unit 66 entrains lawn debris and transports it into compact collector-duct entrance 436. By directing exhaust air discharged from separator exit 423 against surface 24 just forward of compact twig-breaking-rotor assembly 214, that is, to a location proximate the compact collector-duct entrance 436, suspension of microscopic particles in the atmosphere (such as might occur if air discharged from reduced-height separator 394 simply were dispersed upward into the atmosphere) can be alleviated.

In some cases, peripheral inflow of air around the sides and rear of compact collector housing 303 might interfere with recycle of the gas stream discharged from air-recycle duct 300 by displacing recycle air and limiting the amount of recycle air that would otherwise enter compact collector housing 303 and compact collector duct 360. To ameliorate this problem, flexible seal strips 302 illustrated in FIG. 37 may be attached to seal plate 220 and/or twig-breaker bar 216 and to compact side support plates 330 and 332 of compact collector housing 303 to restrict or reduce peripheral inflow of air into compact collector duct 360. In FIG. 23 similar flexible seal strips 302 may be attached to brush housing 252 and compact side support plates 330 and 332 in order to restrict peripheral inflow of air into this embodiment of compact collector housing 303.

Reduced-height separator 394 illustrated in FIG. 25 is well suited for use on debris-collecting trucks 305 and trailers used to collect curbside yard debris in many municipalities. As partially illustrated in FIG. 38, current trucks (and trailers not shown) used for this purpose typically have large debris-collecting vacuum hoses 306 connected to large blower fans 307 which impel the collected debris through ducts and/or hoses 308 to an accumulation chamber 309 having an opening covered with a primitive filter 310 such as an expanded-metal screen. In operation, large debris-collecting vacuum hose 306 is suspended above pile of lawn debris 26 to be collected so that air rushing into vacuum hose 306 entrains debris 26, transports it to large blower fan 307, and carries it through subsequent duct or hose 308 into accumulation chamber 309 with the air passing upward through filter 310, typically resulting in a cloud of shredded debris passing through filter 310 into the atmosphere or onto the street and near-by or passing vehicles. In many cases, municipalities will incur significant additional expense dispatching street sweepers to collect the scattered debris after the debris-collecting trucks and trailers pass. In contrast, use of separator 394 of the present invention on a truck or trailer, either in conjunction with chipper-shredder unit 66 or without, can largely alleviate scattering of debris. The air-entrained debris is directed through large duct or hose 308 mounted on debris-collecting truck 305 or trailer, thence through separator 394 into accumulation chamber 309, such that, as described previously, solids-enriched outer layer generally indicated at 406 passes around baffle 416 and into accumulation chamber 309, while the solids-depleted inner layer generally indicated at 405 passes out separator exit 423 and into the atmosphere, thereby greatly alleviating the fine particulates otherwise discharged. Separator 394 separates even relatively fine debris from the entraining air stream, allowing the reduced debris 407 to be retained in accumulation chamber 309, while solids-depleted air 404 exhausted to the atmosphere will exhibit greatly reduced concentration of particulate matter as compared to present practices employing relatively gross mechanical filters. To alleviate passage of debris through filter 310 in this embodiment, filter 310 may be replaced by or augmented with a generally impermeable enclosing material or with a permeable enclosing material having pores sufficiently small that fine particulates are generally retained in accumulation chamber 309. While this embodiment is illustrated and discussed with large trucks and/or trailers used by municipalities, the invention is equally applicable to lighter-weight trucks, such as pickups, and smaller trailers, such as utility trailers, normally purchased for home and farm use.

Example 1

A commercially marketed machine made according to the design shown in U.S. Pat. No. 5,642,864 was used to collect leaves on a lawn and shred them. The machine had an intake opening about 25 inches long and 4 inches wide with the damper at its maximum open position. The opening was inclined forward at about 45 degrees to the ground, giving an effective opening height of about 2.8". The chamber behind the damper was a solid rectangle in shape and about six inches front to back. A straight rectangular duct led from an opening in one end of the chamber to the center of a chipper-shredder-blower having its axis of rotation perpendicular to the direction of forward movement. The blower discharged into a large bag made of thick cloth and having a mesh-covered opening for venting entraining air. A zipper opening was provided for emptying collected debris.

A covering of fresh, dry leaves about three to six inches deep was present on the lawn. In addition, piles of leaves about six to twelve inches thick were also present. The machine was advanced into a pile of leaves, but the front opening pushed the leaves ahead of it instead of drawing the leaves into the opening. The machine was adjusted to raise the front opening to its maximum height, but it still pushed leaves ahead of it. Collection of leaves from the thinnest coverings on the lawn was attempted, but the machine still had a strong tendency to push leaves ahead of it. The damper was disconnected and opened as wide as possible, but still with little improvement in leaf collection.

In the belief that the machine performance was limited by low air flow caused by leaf build-up on the mesh opening and resultant flow restriction, the zipper opening was partially opened in the hope of allowing more air flow. Leaf pick-up by the vacuum slot improved somewhat, but was still unsatisfactory. In addition, a stream of leaf fragments blew through the zipper opening, as expected.

The conclusion was that the machine might work marginally well with a very thin layer one or two leaves thick, up to perhaps about an inch in depth, but this approach would require using the machine multiple times throughout normal leaf fall.

Example 2

Following the experience of example 1, collecting leaves with a conventional 26-inch, two-stage snow blower was attempted to see if the auger-feed mechanism would function with leaves. Indeed, the auger readily fed even the deepest piles of leaves into the second-stage blower, which blew them 10-15 feet away. However, this approach left a thin layer of leaves and other debris on the lawn where the pick-up auger had passed.

The conclusion was that a machine with a similar auger-feed pick-up would collect even deep piles of leaves. However, the user would need to go over the lawn a second time with a different machine to collect the thin layer of residual leaves and other debris.

Example 3

A machine of the current invention was built according to the drawings in FIGS. 1-11. A Yard Man 5-horsepower chipper-shredder-vacuum machine built by MTD Products was purchased; the chipper-shredder unit and attached drive motor were removed from the purchased machine; and then they were mounted on the base plate of the current machine. The machine width between the left side support plate and the right side support plate was 24." The collector rotor diameter was 15", and it turned 65 revolutions per minute. The front, upper edge of the housing over the rotor was about 13½" above the support surface. The lowermost portion of the lower collector lip was about 1" above the supporting surface when measured with the machine sitting on a concrete slab. The collector duct had an entrance opening 2½" high and 24" wide with a cross sectional area of 60 square inches, an exit opening about 6" high and 9" wide with a cross sectional area of about 54 square inches, and a convergence angle of 76°. The stripping slot was closed. The 5-horsepower engine turned 3450 revolutions per minute. The channel of the primary separation loop measured 4" wide and 8" high and ended with a constricted opening 1.75" wide and 8" high upstream of the downward sloping entrance to the secondary separation chamber. The effective curvature of the loop was about 305°, and the outside radius of curvature was about 10⅝". The inside diameter of the secondary separation chamber was about 23". The radial clearance between the perimeter of the baffle and the wall of the secondary chamber was about 1⅜", and the baffle perimeter was about 7" below the transfer opening. The exhaust port was 7" in diameter, and the airflow through the machine was about 540 cubic feet per minute (cfm) (22.5 cfm per inch of machine width). The effective hopper volume (below the baffle) was about 40 gallons.

Leaves were spread on a lawn in thicknesses varying from about 2" to about 10". The machine was set into operation and advanced through the leaves. Leaf overlayers of all thicknesses were readily collected, and no pushing of leaf piles ahead of the machine occurred. The volume of the leaves was reduced, and the leaf fragments were retained in the hopper. The entraining air exited through the separator exhaust passage, carrying with it only fine dust. Some leaves and debris were left in the wake of the machine, meaning that the machine was proving to be exceptionally effective in removing deep piles of leaves but left some finer debris behind. It appeared that the airflow was not quite great enough to get optimum cleaning. Also, it was observed that when the machine was pulled backward, the cleaning was more thorough, suggesting that the collector rotor should be turning faster.

Another observation was that some leaves were remaining with the collector rotor and carrying over the top of the rotor, being impelled onto the grass in front of the machine, or blown by side winds onto part of the lawn which had already been cleaned.

Example 4

The machine of Example 3 was modified as follows: In order to increase the air flow rate, (1) the engine speed was increased from 3450 to 3680 revolutions per minute; (2) the constriction in the primary separation loop was removed, leaving the channel size throughout the loop at 4" wide and 8" high; (3) the transfer opening was enlarged to about 100 square inches; and (4) the separator exhaust port was enlarged from 7" to 9⅛" diameter. The airflow rate was then measured at 1000 cubic feet per minute (41.7 cfm per inch of machine width). The collector rotor speed was increased from 65 to 276 revolutions per minute. In order to reduce the number of leaves carried over the top of the turning collector rotor, the stripping slot was opened to 1". The diameter of the baffle in the separator was reduced, leaving an annular radial clearance of about 2⅜" between the baffle perimeter and the outside wall of the secondary chamber. The perimeter of the baffle was 5¼" below the ceiling of the secondary separation chamber.

The machine was operated in leaf overlayers of 3" to 12" and readily removed the leaves. No leaves and little other debris were left in the path of the machine, and carryover of leaves over the top of the collector rotor was reduced. The separator retained the leaf fragments and exhausted air containing only a small amount of very fine dust, and was judged to operate quite satisfactorily. It was considered remarkable that in the deep piles of leaves the machine could be moved forward into the leaves at a pace and with a concomitant leaf-feed rate that began to overload the shredder, but the collector rotor, collector duct, and separator continued to function well.

Example 5

In order to achieve more aggressive raking action to lift leaves and other debris from the lawn surface, the continuous but flexible rubberized rotor blade tips 44 were replaced with rake-like teeth shown in FIG. 12. To make these teeth, pieces of polycarbonate sheet plastic approximately 6" wide by 23⅜" long and 1/16" thick were sawn with parallel cuts spaced every ½," sawing from the long edge of the sheet 3" to the center of the sheet. The saw kerfs were about 1/32" wide; so that minimal airflow between adjacent teeth would occur. The tips of the "teeth" were bent about 30°. This bending was done with the polycarbonate sheet at room temperature. A strip of raker teeth was bolted to each of the rotor blades such that the teeth extended radially 5/16" beyond the edges of the seal discs on the ends of the rotor. By adjusting the height of the front-support rollers, the tips of the raker teeth were set about 1/16" above a flat concrete surface.

The machine was then operated on a lawn. The raker teeth readily removed leaves, hickory nuts, shells, dead grass, and even some live grass, especially if the machine was allowed to run in one place very long without moving. The conclusion is that one could adjust the machine to rake as aggressively as desired.

Another observation was that carryover of leaves, nuts, etc. over the top of the rotor was increased, perhaps due to the positive rake angle of the teeth.

Example 6

After seeing leaves carried over the top of the collector rotor and discharged frontward in Example 5, an attempt was made to eliminate this carryover. The existing stripping slot was closed, and a new forward slot was cut in the arcuate housing as shown in FIG. 13. The slot was about 1 1/16" wide and began about 9⅝" forward of the closed stripping slot, as measured along the arc of the housing cover. Since the remaining continuous housing spanned approximately two thirds of the arc between two adjacent sets of raker teeth, a substantially impervious blade would be in close proximity to the housing two thirds of the time of each revolution of the rotor (Two ninths of the time for each individual blade; two thirds of the time cumulative for the three blades through one rotation). Thus, the blades moving under the housing would prevent significant reverse flow of air from occurring for roughly ⅔ of the time during a rotor revolution. Conversely, reverse flow (from the new slot to the collecting duct) was permitted for about ⅓ of a rotor revolution. Furthermore, the slot was placed such that when one rotor tip (or row of raker teeth) had just passed the new stripper slot and allowed reverse air flow through the slot and into the collector duct, the following rotor tip would be in general proximity to the lower collector lip 70. Thus, flow through the stripping slot occurred during a phase of the rotor revolution when diminished airflow would have been passing into the collector duct from the supporting surface anyway. The intent of this design was to minimize lost vacuuming effectiveness by trying to maintain as much airflow as possible along the lawn surface and into the collector duct.

Unfortunately, this change achieved little reduction in the amount of leaf carryover.

Example 7

With the machine fan operating, and with the collection rotor stopped in the position shown in FIG. 13, a thread on the end of a wire was used as a "tell tale" to detect the directions of air movement in the space between the two blades forming a flow space adjacent to the new stripping slot and the collector duct. The airflow directions are sketched approximately in FIG. 13, showing there was a very strong reverse eddy. The presence of this eddy may help explain how there could still be strong carryover of the leaves, as this secondary air flow probably prevented stripping the leaves out of the cavity between the adjacent blades, even with the flat fillets in place.

To overcome the leaf carryover in the eddies, convex fillets were substituted for the flat ones, as shown in FIG. 14. The outer surfaces of the fillets were about 1½" radially inward of the tips of the raker teeth and about 1¼" radially inward of the perimeters of the rotor seal discs. Testing with the "tell tale" showed that the eddy flow had been eliminated, and that all of the detectable localized airflows in the reduced cavity were in the rearward direction—from the new stripping slot and toward the collection-duct entrance. Operation of the machine on a lawn showed that leaf carryover had in fact been greatly reduced. However, there was still some carryover of nuts and shells.

Example 8

In an attempt to stop the carryover of nuts and shells, raker blades were made having teeth bent with a negative rake angle. The intent was to make sure the positive rake angles of the first raker teeth were not responsible for retaining the nuts on the rotor and enhancing carryover. However, upon operation of the machine on the lawn, carryover of nuts and shells with forward discharge continued. Notably, leaf pickup was not as effective as with the positive rake angle.

In the possibility that the carryover was simply a momentum effect, the collector rotor speed was reduced in half—from 276 to 138 rpm (with a rotor peripheral velocity of 433 feet per minute, or 4.9 miles per hour. The carryover of nuts, shells, and other dense debris almost completely stopped. The raker blades with positive rake angle were re-installed, and the carryover was still absent, while virtually complete removal of leaves and other debris from the lawn was achieved.

Example 9

The bag-holder assembly of a Simplicity riding lawnmower model 12FCH42 was removed, and the hopper and separator were removed from the machine described in Examples 3 and 4. The hopper and separator were set on the back base plate of the Simplicity machine and were connected to the air duct which had been connected to the lawnmower bag-holder assembly. The Simplicity machine had a blower mounted on the right end of the 42-inch mower deck, and the duct transported air, clippings, and leaf debris from the blower to the entrance of the separator inlet duct. The blower delivered 770 cfm of entraining air, and the separator exhaust port was 9⅛" in diameter.

The lawnmower was operated on a lawn having a thin covering of leaves, and the grass had grown about 1½ inch since its previous cutting. The mower blades cut the grass and did some chopping of the leaves, and the blower directed the debris to the separator. The separator performed well, retaining the debris in the hopper and exhausting the air virtually free of debris fragments.

Example 10

To evaluate the possibility that the machine could also function as a snow blower, the elbow in the transfer duct 92 was disconnected from the separator 94 and directed to one side of the machine. Without making any further changes, the machine was started and advanced into fresh snow about 3 to 4" deep. The combination rotor and vacuuming action successfully lifted the snow, which passed through the collector duct, into the shredder-blower, and out the discharge (transfer) duct.

Example 11

FIG. 23 illustrates a compact brush/collector module which can be mounted on the front of a self-propelled chipper-blower unit such as that illustrated in FIG. 19 to produce a smaller, more compact, and less expensive embodiment of the invention. In this particular example, the engine, mounting platform, self-propelled drive, and rear wheels were adapted from a 10 horsepower DR® LAWN VAC sold by Country Home Products in Vergennes, Vt., and the unit was fitted with a chipper/shredder from a model VCB 258 Mighty Mac® Vacuum-Chipper-Bagger supplied by MacKissic in Parker Ford, Pa.

Rearwardly of the collector duct, a brush rotor was fitted with the brush housing as illustrated in FIG. 23. The rotor was constructed as a 4-inch-radius brush in which three strip brushes were mounted along a ⅝-inch-diameter shaft. Each strip brush consisted of a metal "U" strip clamped around a wire on which crimped propylene bristles of about 0.030- to 0.045-inch diameter had been looped. Each resulting strip brush had about fifty-two 3⅜-inch and fifty-two 1½-inch bristles per inch. The resulting rotor was similar to the rotary brush used in Precision Pro 26" Push Sweeper (Model SW 26PUSHD) supplied by Gleason Consumer Products, Milwaukee Wis. When used to clean a lawn surface having a leaf covering between three and six inches deep, the operator found the machine easy to handle and maneuver, leaving a thoroughly cleaned surface. However, in those cases when long twigs mixed with leaves were encountered, the collector duct sometimes plugged. In cases where twigs were especially numerous, the machine could clog as frequently as every few feet. This clogging could be at least partially alleviated by removing most of the larger twigs beforehand, but even this removal still left the machine somewhat susceptible to clogging. In many cases, the number of twigs encountered may be so excessive that it is impractical to remove a sufficient number of twigs to achieve substantially unhindered operation.

It had been anticipated that by placing the frontally open cavity ahead of the brush, air rushing into the cavity might have high enough velocity to entrain leaves and impel them into the collector duct, the air flow rate through the machine being over 800 cfm. However, videotape of the machine approaching a tall pile of leaves surprisingly showed that very few leaves were dislodged by the air stream.

Example 12

The machine of Example 11 was fitted with the new rotor mounted ahead of the collector duct as illustrated in FIG. 24. The rotor was constructed from a length of heavy iron pipe to which twig-breaker sweeps were bolted. The sweeps were formed as illustrated in FIGS. 21 and 22 from sheet metal having crenels 1½ inches wide and 1⅜ inches deep on five-inch centers formed therein leaving 3½-inch merlons between crenels. As illustrated in FIGS. 21 and 22, a breaker bar having iron hooks formed from ⅜-inch rods was fastened on the side support plates rearward of the rotor such that the hooks on the breaker bar coincided with the crenels in the twig-breaker sweeps. Accordingly, as the rotor turned, the merlons passed between the hooks creating a breaking or shearing action between each hook and two adjacent edges for shortening the twigs borne by the twig breaker sweeps. In operation, the sweeps on the rotor engaged twigs found in the pile of yard waste to be addressed, brought them into the rotor housing, carried them about the axis of the rotor, and presented them to the hooks so that the twigs fractured and were suitably sized to freely pass through the collector duct to the chipper shredder.

In operation, when a nest of about a dozen representative twigs of roughly a quarter inch in diameter by 6 to 15 inches long was laid on a pile of leaves, this embodiment equipped with the twig-breaking rotor, the twig-breaker bar, and the brush advanced easily into the pile of leaves, readily breaking the twigs into short pieces which passed up the collector duct without clogging. When used to address typical yard waste including numerous brittle twigs up to about two feet in length and up to approximately half an inch in diameter, the machine operated quite successfully without clogging, cleaning the overall lawn quite thoroughly.

When tested on an area covered with pine needles to a depth of about 4 to 6 inches, the machine was quite effective in removing these needles and shredding them into fragments about half an inch to 3 inches in length, which were easily separated from the air stream by the separator in FIG. 19. This achievement is considered particularly significant, as pine needles present a significant challenge to most, if not all, previously known lawn-vacuuming machines. Further, the machine proved quite capable of collecting and shredding pinecones as well as mixtures of twigs, leaves, pinecones, and pine needles. In some cases, particularly with wet flexible leaves, leaves wrapped around the rearward lip of the collector duct, causing partial clogging of the duct and requiring the machine to be advanced more slowly than would otherwise have been desired.

Example 13

The machine of Example 12 was modified as illustrated in FIGS. 20 and 21 by removing the brush and providing a steel plate extending from the top edge of the twig-breaker bar to the rearward lip of the collector duct and from the left side support plate to the right side support plate; so that in operation, the flow of air was channeled through the frontal rotor opening, past the twig-breaker bar, and into the collector duct. Surprisingly, it was found that the machine with only a twig-breaker rotor was fully capable of removing leaves even to a depth of 10 inches or more at a forward speed of approximately ⁷⁄₁₀ of a mile per hour, cleaning the lawn thoroughly. As before, this embodiment of the invention remained fully capable of gathering and shredding loblolly pinecones up to four inches in length and three inches in diameter, and could even pick up and shred aluminum soft-drink cans.

Example 14

A compact collector machine was constructed by reconfiguring the separator such that the primary-separation duct 398 wrapped around the separation chamber in a coplanar arrangement as illustrated in FIGS. 25 and 39, lowering the overall height of the separator by eight inches and thereby giving the operator an improved forward view. As discussed previously, the perimetral walls of the primary-separation duct and of the separation chamber were inclined upwardly and inwardly by about 12 degrees. The performance of this reduced-height separator was at least fully comparable to that of the larger embodiment.

Example 15

Height-adjusting wheels were fitted to the side support plates close to the ends of the collector rotor, as shown in FIGS. 32 and 33. Turning the threaded rods moved the slide blocks up and down, raising and lowering the attached wheels and permitting incrementally variable adjustment of the collector rotor height above the lawn surface. Height adjustment made it possible to adjust the degree of engagement between the impeller elements and the surface to accommodate varying lawn conditions and tasks. For instance, when the machine was used to rake leaves on a taller, thicker lawn, the collector rotor tips were raised to about two to three inches above ground level. For removing thatch from around the grass shoots, the collector rotor was set low enough for raker teeth mounted on the collector rotor to engage and lift the thatch. While the machine was initially envisioned for raking leaves and other debris, an unexpected benefit was that the machine was quite effective in cleanly lifting thatch, separating it from the entraining air stream, and retaining it in the accumulator.

Example 16

In operation, the embodiment shown in FIGS. 1 and 2, when equipped with raker teeth made as described in Example 5 and configured as illustrated in FIG. 12, had a limited service life, particularly when hard objects were encountered. A severe-service rotor is constructed having the configuration shown in FIGS. 28 and 29, with pivotable flails made from metal or other extremely durable material and having "T" cross-sections as shown in FIG. 30. In operation, the suitable flails operate as swing hammers and reduce airflow through the occluded volume of the turning rotor while providing both collecting and dethatching action.

Example 17

An air-recycling-duct attachment as illustrated in FIG. 31 is fitted to the compact collector to direct the exhaust stream from the separator to the collector rotor. By virtue of the recycling action and direction of the exhaust stream groundwardly, there is achieved reduced upward ejection of particulates into the environment.

As our invention, we claim:

1. A free-flow apparatus for separating entrained yard debris from a transporting air stream by action of body forces thereupon comprising:
   a. a curvilinear primary-separation duct having an outer wall, an interior wall, an entrance for accepting a stream of air bearing entrained yard debris and an exit; said curvilinear primary-separation duct being adapted for conducting said stream of air bearing entrained yard debris from said entrance to said exit;
   b. a vessel having a roof, a bottom, and a generally frusto-conical outer peripheral wall section flaring downwardly and outwardly and an opening thereinto, a portion of said outer wall of said curvilinear primary-separation duct adjacent to said exit being generally tangential to a portion of said generally frusto-conical outer peripheral wall section of said vessel in a first location adjacent to said opening, a portion of said interior wall of said curvilinear primary-separation duct adjacent to said duct exit defining an acute angle with another portion of said generally frusto-conical outer peripheral wall section at a second location generally opposed to said first location adjacent to said opening;

c. a secondary-separation zone in said vessel being defined proximate said opening into said vessel and being adapted to receive said stream of air bearing entrained yard debris from said exit of said curvilinear primary-separation duct;

d. said secondary-separation zone in said vessel being at least partially wrapped by said curvilinear primary-separation duct, the curvature and arc length of said curvilinear primary-separation duct being sufficient to separate said stream of air bearing entrained yard debris into an inwardly located debris-depleted stream and an outwardly located debris-enriched stream;

e. said generally frusto-conical outer peripheral wall section of said vessel being adapted to further enrich the debris content of said outwardly located debris-enriched stream while further depleting the debris content of said inwardly located debris-depleted stream by action of body forces upon the debris as said streams of air bearing entrained yard debris pass tangentially thereto;

f. an accumulator located below said secondary-separation zone for receiving debris from said outwardly located debris-enriched stream; and g. said roof of said vessel having defined therein a generally centrally located passage adapted to exhaust air from said inwardly located debris-depleted stream to the atmosphere.

2. The apparatus of claim 1 wherein the height of the uppermost extent of said curvilinear primary-separation duct above the uppermost extent of said secondary-separation zone is no more than 50% of the height of said secondary-separation zone.

3. The separator of claim 1 wherein said vessel is thermoformed.

4. The apparatus of claim 1 wherein the center of curvature of a portion of said outer wall of said curvilinear primary-separation duct and the center of curvature of a portion of said generally frusto-conical outer peripheral wall section of said vessel are generally coincident.

5. The apparatus of claim 1 wherein a portion of said debris-enriched stream proximate said generally frusto-conical outer peripheral wall section has a tangential velocity of at least about 2,000 feet per minute.

6. A free-flow apparatus for separating entrained yard debris from a transporting air stream by action of body forces thereupon comprising:

a. means for delivering a stream of air bearing entrained yard debris;

b. a vessel having
  i. an outer vessel wall having at least one inwardly curving portion flaring downwardly and outwardly,
  ii. means defining an opening through said outer vessel wall, and
  iii. a roof,
  iv. a separation zone being defined in an upper portion of said vessel;

c. a curvilinear duct having an outer duct wall, an interior duct wall, a duct entrance and a duct exit; said curvilinear duct being disposed about an upper portion of said vessel;

d. a portion of said outer duct wall adjacent said duct exit being generally tangential to said inwardly curving portion of said outer vessel wall in a first location adjacent to said opening, another portion of said interior duct wall adjacent to said duct exit defining an acute angle with another portion of said outer vessel wall at a second location generally opposed to said first location adjacent said opening;

e. said duct entrance being adapted to receive said stream of air bearing entrained yard debris, said duct being adapted for conducting said stream of air bearing entrained yard debris from said duct entrance to said duct exit, and to direct said stream of air bearing entrained yard debris into said vessel primarily tangentially along said inwardly curving portion of said outer vessel wall, the curvature and arc length of said curvilinear duct being sufficient to separate said stream of air bearing entrained yard debris into a debris-enriched outer stream and a debris-depleted inner stream;

f. said separation zone being adapted to further enrich the debris content of said debris-enriched outer stream into a further enriched outerly located debris-enriched stream while further depleting the debris content of said debris-depleted inner stream into a further depleted innerly located debris-depleted stream as said stream of air passes along said inwardly curving portion of said outer vessel wall;

g. said roof having defined therein a generally centrally located passage with a passage entrance and a passage exit;

h. said generally centrally located passage being adapted for receiving said further depleted innerly located debris-depleted stream from said separation zone through said passage entrance, and discharging air from said further depleted innerly located debris-depleted stream into the atmosphere; and i. an accumulator below said separation zone being adapted to receive debris from said further enriched outerly located debris-enriched stream of air bearing entrained yard debris.

7. The apparatus of claim 6 wherein said outer vessel wall adjacent said separation zone is generally frusto-conical.

8. The apparatus of claim 6 wherein said outer vessel wall adjacent said separation zone is generally downwardly and outwardly flaring and generally vertical.

9. The apparatus of claim 6 wherein a portion of said outer vessel wall surrounding said separation zone generally flares downwardly and outwardly at from about 5 degrees to about 25 degrees from the vertical.

10. The apparatus of claim 6 wherein said outer duct wall of said curvilinear duct leans inwardly toward said separation zone at from about 5 degrees to about 25 degrees from the vertical.

11. The apparatus of claim 6 wherein a portion of said outer vessel wall surrounding said separation zone flares downwardly and outwardly and said outer duct wall of said curvilinear duct leans inwardly toward said separation zone.

12. The apparatus of claim 6 wherein the height of the uppermost extent of said curvilinear duct above the uppermost extent of said separation zone is no more than 50% of the height of said separation zone.

13. The apparatus of claim 6 wherein said curvilinear duct further comprises an adjustable duct-closure device for reducing airflow through said duct.

14. The apparatus of claim 6 wherein said separation zone and said accumulator are adapted for mounting on an apparatus for collecting and reducing yard debris.

15. The apparatus of claim 6 wherein said separation zone and said accumulator are adapted for towing with a riding lawnmower.

16. The apparatus of claim 6 wherein said separation zone and said accumulator are adapted for mounting on a riding lawnmower.

17. The apparatus of claim 6 wherein said means for delivering a stream of air bearing entrained yard debris comprises a blower.

18. The apparatus of claim 6 wherein said means for delivering a stream of air bearing entrained yard debris comprises a chipper shredder.

19. The apparatus of claim 6 wherein said means for delivering a stream of air bearing entrained yard debris comprises a shredder blower.

20. The apparatus of claim 6 wherein a portion of said outer duct wall and a portion of said outer vessel wall are each inwardly curvilinear and wherein the center of curvature of said portion of said inwardly curvilinear outer duct wall and the center of curvature of said inwardly curvilinear portion of said outer vessel wall are generally coincident.

21. The apparatus of claim 6 wherein a portion of said debris-enriched stream close to said outer vessel wall in said separation zone has a tangential velocity of at least about 2,000 feet per minute.

22. The apparatus of claim 6 wherein said outer duct wall of said curvilinear duct spans an arc of at least about $$\text{arc cosine } RI/RO$$

circumferentially along its length, adapted to direct said stream of air bearing entrained yard debris to flow along its length, wherein
RI=radius of curvature for the generally curvilinear interior duct wall of said curvilinear duct, and
RO=radius of curvature for said outer duct wall.

23. An apparatus for separating entrained yard debris from a transporting air stream by action of body forces thereupon, comprising: a curvilinear separation duct for accepting a flow of air bearing entrained yard debris; said apparatus having a perimetral wall with a generally inwardly curvilinear surface defining a separation zone; said curvilinear separation duct opening into said separation zone adjacent to said generally inwardly curvilinear surface of said perimetral wall, said duct and said perimetral wall being disposed to direct said flow of air bearing entrained yard debris swirling downward along said generally inwardly curvilinear surface of said perimetral wall, said curvilinear separation duct being configured to separate debris from said flow of air bearing entrained yard debris thereby forming a debris-enriched outer layer and a debris-depleted inner layer wherein each layer flows into said separation zone, said generally inwardly curvilinear surface being disposed to further enrich the debris content of said debris-enriched outer layer while further depleting the debris content of said debris-depleted inner layer; an accumulator below said separation zone adapted to receive debris from said debris-enriched outer layer; a generally centrally located exhaust opening out of said separation zone adapted to discharge air from said debris-depleted inner layer into the atmosphere.

24. The apparatus of claim 23 wherein said curvilinear separation duct and said separation zone are configured to guide said debris-enriched outer layer from said curvilinear separation duct along said generally inwardly curvilinear surface of said separation zone, while flowing said debris-depleted inner layer inwardly thereof.

25. The apparatus of claim 23 wherein said curvilinear separation duct partially wraps generally horizontally about said separation zone.

26. The apparatus of claim 23 wherein said generally centrally located exhaust is disposed above said separation zone.

27. The apparatus of claim 23 wherein said perimetral wall defining said separation zone flares downwardly and outwardly.

28. The apparatus of claim 23 wherein said perimetral wall defining said separation zone is generally frusto-conical.

29. The apparatus of claim 23 wherein said perimetral wall defining said separation zone is generally vertical.

30. The apparatus of claim 23 wherein said perimetral wall defining said separation zone flares downwardly and outwardly at from about 5 degrees to about 25 degrees from the vertical.

31. The apparatus of claim 23 wherein the outer wall of said curvilinear separation duct flares downwardly and outwardly at from about 5 degrees to about 25 degrees from the vertical.

32. The apparatus of claim 23 wherein said perimetral wall of said separation zone flares downwardly and outwardly and the outer wall of said curvilinear separation duct flares downwardly and outwardly.

33. The apparatus of claim 23 wherein said curvilinear separation duct is disposed about said separation zone.

34. The apparatus of claim 23 wherein said curvilinear separation duct at least partially encompasses said separation zone horizontally.

35. The apparatus of claim 23 wherein said curvilinear separation duct further comprises an adjustable duct-closure device for reducing airflow through said duct.

36. The apparatus of claim 23 wherein said perimetral wall and said accumulator are adapted for mounting on an apparatus for collecting and reducing yard debris.

37. The apparatus of claim 23 wherein said perimetral wall and said accumulator are adapted for towing with a riding lawnmower.

38. The apparatus of claim 23 wherein said perimetral wall and said accumulator are adapted for mounting on a riding lawnmower.

39. The separator of claim 23 wherein said perimetral wall is thermoformed.

40. The apparatus of claim 23 further having means for delivering said flow of air bearing entrained yard debris comprising: (A) a frame adapted to be advanced over a surface; (B) a conduit mounted on said frame and having a conduit entrance and a conduit exit; (C) a blower unit operatively connected to said conduit exit and adapted to induce a flow of air through said conduit and provide suction at said conduit entrance; said conduit exit being operatively connected to said duct entrance.

41. The apparatus of claim 40 further comprising an exhaust passage operatively connected to said generally centrally located exhaust and adapted to direct said air from said debris-depleted inner layer to a location proximate said conduit entrance.

42. The apparatus of claim 23 wherein the outer wall of said curvilinear separation duct is inwardly curvilinear and the center of curvature of a portion of said inwardly curvilinear outer wall and the center of curvature of a portion of said generally inwardly curvilinear surface of said perimetral wall are generally coincident.

43. The apparatus of claim 23 wherein said perimetral wall flares downwardly and outwardly and the center of curvature of a portion of said curvilinear separation duct and the center of curvature of a portion of said generally inwardly curvilinear surface of said perimetral wall are generally coincident.

44. The apparatus of claim 23 wherein said perimetral wall of said separation zone is inclined downwardly and outwardly and is adapted to urge said debris-enriched outer layer to swirl downwardly toward said accumulator.

45. The apparatus of claim 23 wherein a portion of a stream in said debris-enriched outer layer close to said generally inwardly curvilinear surface in said separation zone has a tangential velocity of at least about 2,000 feet per minute.

46. The apparatus of claim 23 wherein said curvilinear separation duct having an entrance and an exit, said entrance being adapted to receive said flow of air bearing entrained yard debris, said curvilinear separation duct being adapted for conducting said flow of air bearing entrained yard debris from said entrance to said exit, said curvilinear separation duct having a generally curvilinear outer surface spanning an arc of at least about $$\text{arc cosine RI/RO}$$

circumferentially along its length, adapted to direct said flow of air bearing entrained yard debris to flow along its length, wherein
RI=radius of curvature for the generally curvilinear inner surface of said curvilinear separation duct, and
RO=radius of curvature for said generally curvilinear outer surface of said curvilinear separation duct.

47. A free-flow apparatus for separating entrained yard debris from a transporting air stream by action of body forces thereupon comprising:
a. means for delivering a stream of air bearing entrained yard debris;
b. a vessel having
  i. an outer vessel wall having at least one inwardly curving portion,
  ii. means defining an opening through said outer vessel wall, and
  iii. a roof,
  iv. a separation zone being defined in an upper portion of said vessel;
c. a curvilinear separation duct having an outer duct wall, an interior duct wall, a duct entrance and a duct exit; said curvilinear duct being disposed about an upper portion of said vessel;
d. a portion of said outer duct wall adjacent said duct exit being generally tangential to said inwardly curving portion of said outer vessel wall at a first location adjacent to said opening, another portion of said interior duct wall adjacent to said duct exit being generally tangential to another portion of said outer vessel wall at a second location generally opposed to said first location adjacent said opening;
e. said duct entrance being adapted to receive said stream of air bearing entrained yard debris, said duct being adapted for conducting said stream of air bearing entrained yard debris from said duct entrance to said duct exit, and to direct said stream of air bearing entrained yard debris into said vessel primarily tangentially along said inwardly curving portion of said outer vessel wall;
f. said separation zone being adapted to direct air flow swirling downward while inertial forces urge the debris content outwardly forming an outerly located debris-enriched stream and an innerly located debris-depleted stream as said stream of air passes along said inwardly curving portion of said outer vessel wall;
g. said roof having defined therein a generally centrally located exhaust;
h. said generally centrally located exhaust being adapted for receiving said innerly located debris-depleted stream from said separation zone through said passage entrance, and discharging air from said innerly located debris-depleted stream into the atmosphere; and
i. an accumulator below said separation zone being adapted to receive debris from said outerly located debris-enriched stream of air bearing entrained yard debris.

48. The free-flow apparatus of claim 47 wherein the curvature and arc length of said curvilinear duct are sufficient to separate said stream of air bearing entrained yard debris into a debris-enriched outer stream and a debris-depleted inner stream by action of inertial forces on debris entrained therein, said debris-depleted and debris-enriched streams passing into said separation zone and being respectively further depleted and enriched therein.

49. The free-flow apparatus of claim 47 wherein said outer duct wall of said curvilinear duct is generally curvilinear and spans an arc of at least about $$\text{arc cosine RI/RO}$$

circumferentially along its length and is adapted to direct said stream of air bearing entrained yard debris to flow along its length and initiate separation of said stream of air bearing entrained yard debris into an outerly located debris-enriched stream and an innerly located debris-depleted stream, wherein
RI=radius of curvature for the generally curvilinear interior duct wall of said curvilinear duct, and
RO=radius of curvature for said generally curvilinear outer duct wall of said curvilinear duct.

50. An apparatus for separating entrained yard debris from a transporting air stream by action of body forces thereupon comprising:
a. a curvilinear primary-separation duct for accepting a stream of air bearing entrained yard debris, said duct having an outer wall, an interior wall, a duct entrance and a duct exit, said curvilinear primary-separation duct being adapted for conducting said stream of air bearing entrained yard debris from said entrance to said exit;
b. a roof and an inwardly curving outer peripheral wall defining a secondary-separation zone having an opening thereinto, a portion of said outer wall of said curvilinear primary-separation duct adjacent to said duct exit being generally tangential to a portion of said inwardly curving outer peripheral wall of said secondary-separation zone in one location adjacent said opening, another portion of said interior wall of said curvilinear primary-separation duct adjacent to said duct exit defining an acute angle with another portion of said inwardly curving outer peripheral wall at a location generally opposed to said one location adjacent to said opening;
c. said secondary-separation zone and said curvilinear primary-separation duct being adapted to direct said stream of air bearing entrained yard debris from said duct exit of said curvilinear primary-separation duct to flow downwardly around said inwardly curving outer peripheral wall;
d. said secondary-separation zone being at least partially encompassed by said curvilinear primary-separation duct, the curvature and arc length of said curvilinear primary-separation duct being sufficient to enrich the debris content of an outerly located layer of the flow through said curvilinear primary-separation duct while depleting the debris content of an innerly located layer of said flow through said curvilinear primary-separation duct;

e. said secondary-separation zone being configured to further enrich the debris content of said outerly located layer of said stream of air entering said secondary-separation zone while further depleting the debris content of said innerly located layer of said stream of air entering said secondary-separation zone, as said stream of air bearing entrained yard debris passes tangentially downward along said inwardly curving outer peripheral wall; and f. an accumulator located below said separation zone for receiving debris from said outerly located debris-enriched layer;

g. said roof of said secondary-separation zone having defined therein a generally centrally located passage adapted to exhaust air from said innerly located debris-depleted layer to the atmosphere.

51. The apparatus of claim 50 wherein said inwardly curving outer peripheral wall is generally frusto-conical.

52. The apparatus of claim 50 wherein said inwardly curving outer peripheral wall flares generally outwardly and downwardly.

53. The apparatus of claim 50 wherein the center of curvature of a portion of said curvilinear primary-separation duct and the center of curvature of a portion of said inwardly curving outer peripheral wall are generally coincident.

54. The apparatus of claim 50 wherein a portion of a stream in said outerly located debris-enriched layer close to said inwardly curving outer peripheral wall in said secondary-separation zone has a tangential velocity of at least about 2,000 feet per minute.

55. The apparatus of claim 50 wherein a portion of said outer wall of said curvilinear primary-separation duct adjacent to said duct exit being generally tangential to a portion of said inwardly curving outer peripheral wall of said secondary-separation zone in one location adjacent said opening, another portion of said interior wall of said curvilinear primary-separation duct adjacent to said duct exit being generally tangential to another portion of said inwardly curving outer peripheral wall at a location generally opposed to said one location adjacent to said opening.

56. The free-flow apparatus of claim 50 wherein said outer wall of said curvilinear primary-separation duct is generally curvilinear and spans an arc of at least about arc cosine RI/RO circumferentially along its length, wherein
RI=radius of curvature for the generally curvilinear interior wall of said curvilinear primary-separation duct, and
RO=radius of curvature for said generally curvilinear outer duct wall of said curvilinear primary-separation duct.

57. A free-flow apparatus for separating entrained yard debris from a transporting air stream by action of body forces thereupon comprising:

a. means for delivering a stream of air bearing entrained yard debris;

b. means defining a primary-separation duct having an entrance and an exit, said entrance being adapted to receive said stream of air bearing entrained yard debris, said primary-separation duct being adapted for conducting said stream of air bearing entrained yard debris from said entrance to said exit; said primary-separation duct having a generally curvilinear outer surface spanning an arc of at least about arc cosine RI/RO circumferentially along its length, adapted to direct said stream of air bearing entrained yard debris to flow along its length and initiate separation of said stream of air bearing entrained yard debris into an outerly located debris-enriched stream and an innerly located debris-depleted stream, wherein
RI=radius of curvature for the generally curvilinear inner surface of said primary-separation duct, and
RO=radius of curvature for said generally curvilinear outer surface;

c. means defining a secondary-separation zone connected to said exit from said primary-separation duct and having a peripheral wall with a generally annular outer wall portion, said secondary-separation zone further comprising means for:
  i. receiving and directing said streams of air bearing entrained yard debris from said primary-separation duct in a downwardly swirling direction generally tangential to said generally annular outer wall portion of said secondary-separation zone,
  ii. directing said outerly located debris-enriched stream from said primary-separation duct adjacent to said generally annular outer wall portion of said secondary-separation zone,
  iii. directing said innerly located debris-depleted stream from said primary-separation duct radially inward of said debris-enriched stream, and
  iv. further enriching the debris content of said outerly located debris-enriched stream while further depleting the debris content of said innerly located debris-depleted stream;

d. means defining a generally centrally located exhaust, said generally centrally located exhaust being adapted for exhausting air from said debris-depleted stream from said secondary-separation zone into the atmosphere; and e. means defining an accumulation zone below said secondary-separation zone being adapted to receive debris from said debris-enriched stream.

58. The apparatus of claim 57 wherein said means defining an accumulation zone comprises a flexible bag-like container.

59. The apparatus of claim 57 wherein said means for delivering a stream of air bearing entrained yard debris comprises a lawnmower having a discharge duct operatively connected to said entrance of said primary-separation duct.

60. The apparatus of claim 57 wherein said means for delivering a stream of air bearing entrained yard debris comprises a shredder blower.

61. The apparatus of claim 57 wherein a portion of said debris-enriched stream close to said peripheral wall in said secondary-separation zone has a tangential velocity of at least about 2,000 feet per minute.

62. A free-flow apparatus for separating entrained yard debris from a transporting air stream by action of body forces thereupon comprising:

a. means for delivering a stream of air bearing entrained yard debris;

b. means defining a primary-separation duct having an entrance and an exit, said entrance being adapted to receive said stream of air bearing entrained yard debris, said primary-separation duct being adapted for conducting said stream of air bearing entrained yard debris from said entrance to said exit; said primary-separation duct having a generally curvilinear outer surface spanning an arc of at least about arc cosine RI/RO circumferentially along its length, adapted to direct said stream of air bearing entrained yard debris to flow along its length and initiate separation of said stream of air bearing entrained yard debris into an outerly located debris-enriched stream and an innerly located debris-depleted stream, wherein RI=radius of curvature for the generally curvilinear inner surface of said primary-separation duct, and
RO=radius of curvature for said generally curvilinear outer surface;

c. a vessel defining a secondary-separation zone connected to said exit from said primary-separation duct and having an inwardly curving outer wall, said vessel defining said secondary-separation zone further comprising means for:
  i. receiving and directing said streams of air bearing entrained yard debris from said primary-separation duct in a downwardly swirling direction generally tangential to said inwardly curving outer wall of said secondary-separation zone,
  ii. directing said outerly located debris-enriched stream from said primary-separation duct adjacent to said inwardly curving outer wall of said secondary-separation zone,
  iii. directing said innerly located debris-depleted stream from said primary-separation duct radially inward of said debris-enriched stream, and
  iv. further enriching the debris content of said outerly located debris-enriched stream while further depleting the debris content of said innerly located debris depleted stream;

d. means defining a generally centrally located exhaust, said generally centrally located exhaust being adapted for receiving air from said debris-depleted stream from said secondary-separation zone and discharging it into the atmosphere; and e. means defining an accumulation zone below said secondary-separation zone being adapted to receive debris from said debris-enriched stream.

63. The apparatus of claim 62 wherein said means defining an accumulation zone comprises a flexible bag-like container.

64. The apparatus of claim 62 wherein said means for delivering a stream of air bearing entrained yard debris comprises a lawnmower having a discharge duct operatively connected to said entrance of said primary-separation duct.

65. The apparatus of claim 62 wherein said means for delivering a stream of air bearing entrained yard debris comprises a shredder blower.

66. The apparatus of claim 62 wherein a portion of said debris-enriched stream close to said inwardly curving outer wall in said secondary-separation zone has a tangential velocity of at least about 2,000 feet per minute.

67. A free-flow apparatus for separating entrained yard debris from a transporting air stream by action of body forces thereupon comprising: means for delivering a stream of air bearing entrained yard debris; means defining a primary-separation zone adapted to receive said stream of air bearing entrained yard debris, said primary-separation zone having a generally curvilinear outer surface adapted to direct said stream of air bearing entrained yard debris generally circumferentially along said generally curvilinear outer surface and initiate separation of said stream of air bearing entrained yard debris into an outerly located debris-enriched stream and an innerly located debris-depleted stream; a vessel defining a secondary-separation zone connected to said primary-separation zone, said secondary-separation zone being defined by a generally inwardly curvilinear outer wall thereof, said apparatus further comprising means for: receiving and directing said streams of air bearing entrained yard debris from said primary-separation zone swirling downwardly around the generally inwardly curvilinear outer wall of said secondary-separation zone, while directing said outerly located debris-enriched stream from said primary-separation zone adjacent to said generally inwardly curvilinear outer wall of said secondary-separation zone, and directing said innerly located debris-depleted stream from said primary-separation zone radially inward of said debris-enriched stream, and further enriching the debris content of said outerly located debris-enriched stream while further depleting the debris content of said innerly located debris depleted stream; means defining a generally centrally located exhaust, said generally centrally located exhaust being adapted for receiving air from said debris-depleted stream from said secondary-separation zone and discharging it into the atmosphere; and means defining an accumulation zone below said secondary-separation zone being adapted to receive debris from said debris-enriched stream.

68. The apparatus of claim 67 wherein said accumulation zone comprises a flexible bag-like container.

69. The apparatus of claim 67 wherein said means for delivering a stream of air bearing entrained yard debris comprises a lawnmower having a discharge duct operatively connected to said primary-separation zone.

70. The apparatus of claim 67 wherein said means for delivering a stream of air bearing entrained yard debris comprises a shredder blower.

71. The apparatus of claim 67 wherein a portion of said debris-enriched stream close to said generally inwardly curvilinear outer wall of said vessel has a tangential velocity of at least about 2,000 feet per minute.

72. The apparatus of claim 67 wherein said primary-separation zone is adapted to direct said stream of air bearing entrained yard debris into said secondary-separation zone in a direction primarily tangential to said outer wall.

73. The apparatus of claim 67 wherein the curvature and arc length of said generally curvilinear outer surface of said primary-separation zone is sufficient to separate said stream of air bearing entrained yard debris into a debris-depleted inner stream and a debris-enriched outer stream.

* * * * *